United States Patent
Wang et al.

(10) Patent No.: US 12,189,499 B2
(45) Date of Patent: Jan. 7, 2025

(54) SELF-SERVICE RESTORE (SSR) SNAPSHOT REPLICATION WITH SHARE-LEVEL FILE SYSTEM DISASTER RECOVERY ON VIRTUALIZED FILE SERVERS

(71) Applicant: Nutanix, Inc., San Jose, CA (US)

(72) Inventors: Eric Wang, San Jose, CA (US); Kalpesh Ashok Bafna, Fremont, CA (US)

(73) Assignee: Nutanix, Inc., San Jose, CA (US)

( * ) Notice: Subject to any disclaimer, the term of this patent is extended or adjusted under 35 U.S.C. 154(b) by 76 days.

(21) Appl. No.: 17/877,769

(22) Filed: Jul. 29, 2022

(65) Prior Publication Data

US 2024/0045774 A1  Feb. 8, 2024

(51) Int. Cl.
    *G06F 11/14* (2006.01)
(52) U.S. Cl.
    CPC ...... *G06F 11/1471* (2013.01); *G06F 11/1451* (2013.01); *G06F 11/1469* (2013.01)
(58) Field of Classification Search
    CPC ............. G06F 11/1471; G06F 11/1451; G06F 11/1469
    See application file for complete search history.

(56) References Cited

U.S. PATENT DOCUMENTS

| | | |
|---|---|---|
| 5,276,867 A | 1/1994 | Kenley et al. |
| 5,664,144 A | 9/1997 | Yanai et al. |
| 5,870,555 A | 2/1999 | Pruett et al. |
| 5,873,085 A | 2/1999 | Enoki et al. |
| 5,924,096 A | 7/1999 | Draper et al. |
| 6,044,367 A | 3/2000 | Wolff |
| 6,055,543 A | 4/2000 | Christensen et al. |
| 6,085,234 A | 7/2000 | Pitts et al. |

(Continued)

FOREIGN PATENT DOCUMENTS

| | | |
|---|---|---|
| CN | 103746997 A | 4/2014 |
| CN | 105100210 A | 11/2015 |

(Continued)

OTHER PUBLICATIONS

US 11,048,595 B2, 06/2021, Venkatesh et al. (withdrawn)

(Continued)

*Primary Examiner* — Masud K Khan
(74) *Attorney, Agent, or Firm* — Stoel Rives LLP

(57) ABSTRACT

Examples of systems described herein provide for share-level disaster recovery on, for example, virtualized file servers by enabling additional snapshots, including self-service recovery (SSR) snapshot migration in addition to replication snapshot migration to a disaster recovery location. In examples, a disaster recovery location may receive a replication of a share of a file system, the snapshot configured for recovery of the share at the disaster recovery location. The replication snapshot may include one or more additional snapshots, each taken since a time of a previous replication snapshot. At least one of the one or more additional snapshots may include an SSR snapshot, identifiable based at least on a tag associated with a process used to create the SSR snapshot at a primary location. The at least one additional snapshot may be extracted for use by another instance of the process at the disaster recovery location.

33 Claims, 10 Drawing Sheets

(56) References Cited

U.S. PATENT DOCUMENTS

| | | |
|---|---|---|
| 6,101,508 A | 8/2000 | Wolff |
| 6,212,531 B1 | 4/2001 | Blea et al. |
| 6,289,356 B1 | 9/2001 | Hitz et al. |
| 6,341,340 B1 | 1/2002 | Tsukerman et al. |
| 6,442,602 B1 | 8/2002 | Choudhry |
| 6,539,381 B1 | 3/2003 | Prasad et al. |
| 6,963,914 B1 | 11/2005 | Breitbart et al. |
| 6,968,345 B1 | 11/2005 | Muhlestein |
| 7,120,631 B1 | 10/2006 | Vahalia et al. |
| 7,159,056 B2 | 1/2007 | Goldick |
| 7,162,467 B2 | 1/2007 | Eshleman et al. |
| 7,356,679 B1 | 4/2008 | Le et al. |
| 7,366,738 B2 | 4/2008 | Yorke et al. |
| 7,409,511 B2 | 8/2008 | Edwards et al. |
| 7,606,868 B1 | 10/2009 | Le et al. |
| 7,702,843 B1 | 4/2010 | Chen et al. |
| 7,707,618 B1 | 4/2010 | Cox et al. |
| 7,725,671 B2 | 5/2010 | Prahlad et al. |
| 7,752,492 B1 | 7/2010 | Armangau et al. |
| 7,774,391 B1 | 8/2010 | Le et al. |
| 7,805,469 B1 | 9/2010 | Nagaralu et al. |
| 7,805,511 B1 | 9/2010 | Panicker et al. |
| 7,840,533 B2 | 11/2010 | Prahlad et al. |
| 7,890,529 B1 | 2/2011 | Srinivasan et al. |
| 7,937,453 B1 | 5/2011 | Hayden et al. |
| 8,095,810 B2 | 1/2012 | Matsuzawa et al. |
| 8,095,931 B1 | 1/2012 | Chen et al. |
| 8,352,482 B2 | 1/2013 | Hansen |
| 8,352,608 B1 | 1/2013 | Keagy et al. |
| 8,359,594 B1 | 1/2013 | Davidson et al. |
| 8,365,167 B2 | 1/2013 | Beaty et al. |
| 8,407,448 B1 | 3/2013 | Hayden et al. |
| 8,447,728 B2 | 5/2013 | Prahlad et al. |
| 8,473,462 B1 | 6/2013 | Banerjee |
| 8,484,163 B1 | 7/2013 | Yucel et al. |
| 8,484,356 B1 | 7/2013 | Douglis et al. |
| 8,539,076 B2 | 9/2013 | Nakano et al. |
| 8,543,790 B2 | 9/2013 | Chen et al. |
| 8,549,518 B1 | 10/2013 | Aron et al. |
| 8,601,473 B1 | 12/2013 | Aron et al. |
| 8,635,351 B2 | 1/2014 | Astete et al. |
| 8,646,089 B2 | 2/2014 | Jayanthi et al. |
| 8,688,660 B1 | 4/2014 | Sivasubramanian et al. |
| 8,700,573 B2 | 4/2014 | Enko et al. |
| 8,719,522 B1 | 5/2014 | Chait et al. |
| 8,725,679 B2 | 5/2014 | Nair et al. |
| 8,751,515 B1 | 6/2014 | Xing et al. |
| 8,762,335 B2 | 6/2014 | Prahlad et al. |
| 8,805,951 B1 | 8/2014 | Faibish et al. |
| 8,838,923 B2 | 9/2014 | Prahlad et al. |
| 8,850,130 B1 | 9/2014 | Aron et al. |
| 8,863,124 B1 | 10/2014 | Aron |
| 8,909,753 B2 | 12/2014 | Nakamura et al. |
| 8,914,429 B2 | 12/2014 | Pitts |
| 8,935,563 B1 | 1/2015 | Rajaa et al. |
| 8,949,557 B2 | 2/2015 | Kamei et al. |
| 8,966,188 B1 | 2/2015 | Bardale |
| 8,983,952 B1 | 3/2015 | Zhang et al. |
| 8,996,783 B2 | 3/2015 | Huang et al. |
| 9,009,106 B1 | 4/2015 | Aron et al. |
| 9,043,567 B1 | 5/2015 | Modukuri et al. |
| 9,060,014 B2 | 6/2015 | Crowley |
| 9,069,708 B2 | 6/2015 | Gill et al. |
| 9,152,628 B1 | 10/2015 | Stacey et al. |
| 9,154,535 B1 | 10/2015 | Harris |
| 9,165,003 B1 | 10/2015 | Tummala et al. |
| 9,201,698 B2 | 12/2015 | Ashok et al. |
| 9,201,704 B2 | 12/2015 | Chang et al. |
| 9,201,887 B1 | 12/2015 | Earl et al. |
| 9,208,210 B2 | 12/2015 | Erofeev |
| 9,213,513 B2 | 12/2015 | Hartz et al. |
| 9,244,674 B2 | 1/2016 | Waterman et al. |
| 9,244,969 B1 | 1/2016 | Love et al. |
| 9,256,475 B1 | 2/2016 | Aron et al. |
| 9,256,612 B1 | 2/2016 | Bhatt et al. |
| 9,268,586 B2 | 2/2016 | Voccio et al. |
| 9,274,817 B1 | 3/2016 | Fan et al. |
| 9,286,298 B1 | 3/2016 | Gillett |
| 9,292,327 B1 | 3/2016 | Von Thenen et al. |
| 9,336,132 B1 | 5/2016 | Aron et al. |
| 9,348,702 B2 | 5/2016 | Hsu et al. |
| 9,405,566 B2 | 8/2016 | Chawla et al. |
| 9,411,628 B2 | 8/2016 | Bezbaruah et al. |
| 9,448,887 B1 | 9/2016 | Dayan et al. |
| 9,495,478 B2 | 11/2016 | Hendrickson et al. |
| 9,497,257 B1 | 11/2016 | Love et al. |
| 9,513,946 B2 | 12/2016 | Sevigny et al. |
| 9,519,596 B2 | 12/2016 | Coppola et al. |
| 9,535,907 B1 | 1/2017 | Stringham |
| 9,563,555 B2 | 2/2017 | Flynn et al. |
| 9,571,561 B2 | 2/2017 | Jang |
| 9,619,257 B1 | 4/2017 | Aron et al. |
| 9,634,990 B2 | 4/2017 | Lee |
| 9,639,428 B1 | 5/2017 | Boda et al. |
| 9,652,265 B1 | 5/2017 | Narayanasamy et al. |
| 9,658,899 B2 | 5/2017 | Jenkins |
| 9,690,670 B1 | 6/2017 | Paulzagade et al. |
| 9,733,958 B2 | 8/2017 | Cui et al. |
| 9,740,436 B2 | 8/2017 | Fiebrich-Kandler et al. |
| 9,740,472 B1 | 8/2017 | Sohi et al. |
| 9,740,723 B2 | 8/2017 | Prahlad et al. |
| 9,747,287 B1 | 8/2017 | Bhardwaj et al. |
| 9,772,866 B1 | 9/2017 | Aron et al. |
| 9,832,136 B1 | 11/2017 | Gibson |
| 9,846,706 B1 | 12/2017 | Basov et al. |
| 9,853,978 B2 | 12/2017 | Tellvik et al. |
| 9,870,291 B2 | 1/2018 | Bezbaruah et al. |
| 9,886,215 B1 | 2/2018 | Ramachandran et al. |
| 9,893,988 B2 | 2/2018 | Agarwal et al. |
| 9,940,154 B2 | 4/2018 | Ramani et al. |
| 9,946,573 B2 | 4/2018 | McDermott |
| 9,952,782 B1 | 4/2018 | Chandrasekaran et al. |
| 10,009,215 B1 | 6/2018 | Shorey |
| 10,050,862 B2 | 8/2018 | Nambiar et al. |
| 10,083,022 B2 | 9/2018 | Fukui et al. |
| 10,084,873 B2 | 9/2018 | Dornemann |
| 10,095,506 B2 | 10/2018 | Venkatesh et al. |
| 10,101,989 B2 | 10/2018 | Sinha et al. |
| 10,114,706 B1 | 10/2018 | Chougala et al. |
| 10,127,059 B2 | 11/2018 | Astete et al. |
| 10,140,115 B2 | 11/2018 | Fukui et al. |
| 10,152,233 B2 | 12/2018 | Xu et al. |
| 10,210,048 B2 | 2/2019 | Sancheti |
| 10,248,657 B2 | 4/2019 | Prahlad et al. |
| 10,310,953 B2 | 6/2019 | Vijayan et al. |
| 10,311,153 B2 | 6/2019 | Mason, Jr. et al. |
| 10,367,753 B2 | 7/2019 | Schultze et al. |
| 10,394,547 B2 | 8/2019 | Fukui et al. |
| 10,419,426 B2 | 9/2019 | Bakshan et al. |
| 10,484,894 B2 | 11/2019 | Gonzalez et al. |
| 10,523,592 B2 | 12/2019 | Byers et al. |
| 10,530,742 B2 | 1/2020 | Shah et al. |
| 10,540,164 B2 | 1/2020 | Bafna et al. |
| 10,540,165 B2 | 1/2020 | Bafna et al. |
| 10,540,166 B2 | 1/2020 | Arikatla et al. |
| 10,541,064 B2 | 1/2020 | Lee et al. |
| 10,594,730 B1 | 3/2020 | Summers et al. |
| 10,719,305 B2 | 7/2020 | Sinha et al. |
| 10,719,306 B2 | 7/2020 | Deshmukh et al. |
| 10,719,307 B2 | 7/2020 | Kanada et al. |
| 10,728,090 B2 | 7/2020 | Deshmukh et al. |
| 10,809,998 B2 | 10/2020 | Venkatesh et al. |
| 10,824,455 B2 | 11/2020 | Arikatla et al. |
| 10,831,465 B2 | 11/2020 | Sharpe et al. |
| 10,838,708 B2 | 11/2020 | Sinha et al. |
| 10,949,192 B2 | 3/2021 | Venkatesh et al. |
| 11,025,626 B1 | 6/2021 | Todd et al. |
| 11,086,826 B2 | 8/2021 | Thummala et al. |
| 11,106,447 B2 | 8/2021 | Gupta et al. |
| 11,281,484 B2 | 3/2022 | Bafna et al. |
| 11,288,239 B2 | 3/2022 | Bafna |
| 11,294,777 B2 | 4/2022 | Venkatesh et al. |
| 11,347,601 B1 | 5/2022 | Nachiappan et al. |
| 2001/0047400 A1 | 11/2001 | Coates et al. |

(56) References Cited

U.S. PATENT DOCUMENTS

| | | |
|---|---|---|
| 2002/0069196 A1 | 6/2002 | Betros et al. |
| 2002/0120763 A1 | 8/2002 | Miloushev et al. |
| 2003/0014442 A1 | 1/2003 | Shiigi et al. |
| 2003/0115218 A1 | 6/2003 | Bobbitt et al. |
| 2003/0163597 A1 | 8/2003 | Hellman et al. |
| 2003/0195942 A1 | 10/2003 | Muhlestein et al. |
| 2004/0054777 A1 | 3/2004 | Ackaouy et al. |
| 2004/0199734 A1 | 10/2004 | Rajamani et al. |
| 2004/0210591 A1 | 10/2004 | Hirschfeld et al. |
| 2004/0225742 A1 | 11/2004 | Loaiza et al. |
| 2004/0267832 A1 | 12/2004 | Wong et al. |
| 2005/0120160 A1 | 6/2005 | Plouffe et al. |
| 2005/0120180 A1 | 6/2005 | Schornbach et al. |
| 2005/0125503 A1 | 6/2005 | Iyengar et al. |
| 2005/0193221 A1 | 9/2005 | Yoneyama |
| 2005/0193245 A1 | 9/2005 | Hayden et al. |
| 2005/0226059 A1 | 10/2005 | Kavuri et al. |
| 2005/0228798 A1 | 10/2005 | Shepard et al. |
| 2006/0010227 A1 | 1/2006 | Atluri |
| 2006/0047685 A1 | 3/2006 | Dearing et al. |
| 2006/0080445 A1 | 4/2006 | Chang et al. |
| 2006/0167921 A1 | 7/2006 | Grebus et al. |
| 2006/0206901 A1 | 9/2006 | Chan |
| 2006/0224918 A1 | 10/2006 | Koike |
| 2006/0225065 A1 | 10/2006 | Chandhok et al. |
| 2006/0271510 A1 | 11/2006 | Harward et al. |
| 2006/0271931 A1 | 11/2006 | Harris et al. |
| 2007/0022129 A1 | 1/2007 | Bahar et al. |
| 2007/0038913 A1 | 2/2007 | Allen et al. |
| 2007/0100905 A1 | 5/2007 | Masters et al. |
| 2007/0171921 A1 | 7/2007 | Wookey et al. |
| 2007/0179995 A1 | 8/2007 | Prahlad et al. |
| 2007/0300220 A1 | 12/2007 | Seliger et al. |
| 2008/0040483 A1 | 2/2008 | Nakatani et al. |
| 2008/0071997 A1 | 3/2008 | Loaiza et al. |
| 2008/0098194 A1 | 4/2008 | Hashimoto et al. |
| 2008/0104349 A1 | 5/2008 | Maruyama et al. |
| 2008/0104589 A1 | 5/2008 | Mccrory et al. |
| 2008/0114854 A1 | 5/2008 | Wong et al. |
| 2008/0133486 A1 | 6/2008 | Fitzgerald et al. |
| 2008/0134178 A1 | 6/2008 | Fitzgerald et al. |
| 2008/0189468 A1 | 8/2008 | Schmidt et al. |
| 2008/0201414 A1 | 8/2008 | Amir et al. |
| 2008/0201457 A1 | 8/2008 | London |
| 2008/0229142 A1* | 9/2008 | Anand ............... G06F 11/1438 714/6.12 |
| 2008/0263113 A1 | 10/2008 | Krishnaiyer et al. |
| 2008/0270677 A1 | 10/2008 | Kolakowski |
| 2008/0320499 A1 | 12/2008 | Suit |
| 2008/0320583 A1 | 12/2008 | Sharma et al. |
| 2009/0006801 A1 | 1/2009 | Shultz et al. |
| 2009/0100248 A1 | 4/2009 | Kami |
| 2009/0150885 A1 | 6/2009 | Safari et al. |
| 2009/0158082 A1 | 6/2009 | Jain et al. |
| 2009/0171971 A1 | 7/2009 | Goddard et al. |
| 2009/0193272 A1 | 7/2009 | Matsuzawa et al. |
| 2009/0216975 A1 | 8/2009 | Halperin et al. |
| 2009/0248870 A1 | 10/2009 | Kamei et al. |
| 2009/0249470 A1 | 10/2009 | Litvin et al. |
| 2009/0254572 A1 | 10/2009 | Redlich et al. |
| 2009/0271412 A1 | 10/2009 | Lacapra et al. |
| 2009/0287887 A1 | 11/2009 | Matsuki et al. |
| 2009/0288084 A1 | 11/2009 | Astete et al. |
| 2010/0023521 A1 | 1/2010 | Arcese et al. |
| 2010/0070725 A1 | 3/2010 | Prahlad et al. |
| 2010/0082716 A1 | 4/2010 | Agetsuma et al. |
| 2010/0082774 A1 | 4/2010 | Pitts |
| 2010/0095289 A1 | 4/2010 | Nguyen et al. |
| 2010/0138921 A1 | 6/2010 | Na et al. |
| 2010/0174745 A1 | 7/2010 | Ryan et al. |
| 2010/0214908 A1 | 8/2010 | Ralev |
| 2010/0241785 A1 | 9/2010 | Chen et al. |
| 2010/0250824 A1 | 9/2010 | Belay |
| 2010/0275205 A1 | 10/2010 | Nakajima |
| 2011/0022694 A1 | 1/2011 | Dalal et al. |
| 2011/0022695 A1 | 1/2011 | Dalal et al. |
| 2011/0022812 A1 | 1/2011 | van der Linden et al. |
| 2011/0022883 A1 | 1/2011 | Hansen |
| 2011/0047340 A1 | 2/2011 | Olson et al. |
| 2011/0078318 A1 | 3/2011 | Desai et al. |
| 2011/0119668 A1 | 5/2011 | Calder et al. |
| 2011/0119763 A1 | 5/2011 | Wade et al. |
| 2011/0125835 A1 | 5/2011 | Soltis |
| 2011/0137879 A1 | 6/2011 | Dubey et al. |
| 2011/0161299 A1 | 6/2011 | Prahlad et al. |
| 2011/0179414 A1 | 7/2011 | Goggin et al. |
| 2011/0184993 A1 | 7/2011 | Chawla et al. |
| 2011/0185292 A1 | 7/2011 | Chawla et al. |
| 2011/0225574 A1 | 9/2011 | Khalidi et al. |
| 2011/0239213 A1 | 9/2011 | Aswani et al. |
| 2011/0251992 A1 | 10/2011 | Bethlehem et al. |
| 2011/0252208 A1 | 10/2011 | Ali et al. |
| 2011/0255538 A1 | 10/2011 | Srinivasan et al. |
| 2011/0265076 A1 | 10/2011 | Thorat et al. |
| 2011/0271279 A1 | 11/2011 | Pate |
| 2011/0276578 A1 | 11/2011 | Allalouf et al. |
| 2011/0276963 A1 | 11/2011 | Wu et al. |
| 2011/0283277 A1 | 11/2011 | Castillo et al. |
| 2011/0289561 A1 | 11/2011 | Ivanov et al. |
| 2011/0307729 A1 | 12/2011 | Matsuzawa et al. |
| 2011/0320690 A1 | 12/2011 | Petersen et al. |
| 2012/0017114 A1 | 1/2012 | Timashev et al. |
| 2012/0023495 A1 | 1/2012 | Machida |
| 2012/0030456 A1 | 2/2012 | Wu et al. |
| 2012/0054736 A1 | 3/2012 | Arcese et al. |
| 2012/0081395 A1 | 4/2012 | Adi et al. |
| 2012/0084381 A1 | 4/2012 | Alladi et al. |
| 2012/0166866 A1 | 6/2012 | Rao et al. |
| 2012/0209983 A1 | 8/2012 | Bronner et al. |
| 2012/0233463 A1 | 9/2012 | Holt et al. |
| 2012/0254445 A1 | 10/2012 | Kawamoto et al. |
| 2012/0254567 A1 | 10/2012 | Umbehocker |
| 2012/0266162 A1 | 10/2012 | Baron |
| 2012/0272237 A1 | 10/2012 | Baron |
| 2012/0290630 A1 | 11/2012 | Aizman et al. |
| 2012/0304247 A1 | 11/2012 | Badger et al. |
| 2012/0310881 A1 | 12/2012 | Shadmon |
| 2012/0310892 A1 | 12/2012 | Dam et al. |
| 2012/0324183 A1 | 12/2012 | Chiruvolu et al. |
| 2013/0046740 A1 | 2/2013 | Li et al. |
| 2013/0047160 A1 | 2/2013 | Conover |
| 2013/0055018 A1 | 2/2013 | Joshi et al. |
| 2013/0061110 A1 | 3/2013 | Zvibel |
| 2013/0061167 A1 | 3/2013 | Rhodes et al. |
| 2013/0066930 A1 | 3/2013 | Kamei et al. |
| 2013/0117744 A1 | 5/2013 | Klein et al. |
| 2013/0132674 A1 | 5/2013 | Sundrani |
| 2013/0144921 A1 | 6/2013 | Nakamura et al. |
| 2013/0151888 A1 | 6/2013 | Bhattiprolu et al. |
| 2013/0152085 A1 | 6/2013 | D'Amore et al. |
| 2013/0185716 A1 | 7/2013 | Yin et al. |
| 2013/0198738 A1 | 8/2013 | Reddin et al. |
| 2013/0212345 A1 | 8/2013 | Nakajima |
| 2013/0227379 A1 | 8/2013 | Gupta et al. |
| 2013/0227552 A1 | 8/2013 | Reddin et al. |
| 2013/0227566 A1 | 8/2013 | Higuchi et al. |
| 2013/0232491 A1 | 9/2013 | Radhakrishnan et al. |
| 2013/0246705 A1 | 9/2013 | Diare |
| 2013/0247036 A1 | 9/2013 | Fujiwara |
| 2013/0262396 A1 | 10/2013 | Kripalani et al. |
| 2013/0283267 A1 | 10/2013 | Cooper et al. |
| 2013/0297869 A1 | 11/2013 | Mills et al. |
| 2013/0318229 A1 | 11/2013 | Bakre et al. |
| 2014/0006708 A1 | 1/2014 | Huynh et al. |
| 2014/0013398 A1 | 1/2014 | Hotti |
| 2014/0025796 A1 | 1/2014 | Mbhor et al. |
| 2014/0059392 A1 | 2/2014 | Ren et al. |
| 2014/0095544 A1 | 4/2014 | Eshel et al. |
| 2014/0095555 A1 | 4/2014 | Kim et al. |
| 2014/0095816 A1 | 4/2014 | Hsu et al. |
| 2014/0108587 A1 | 4/2014 | Goldberg et al. |
| 2014/0115182 A1 | 4/2014 | Sabaa et al. |
| 2014/0122547 A1 | 5/2014 | Agetsuma et al. |
| 2014/0123138 A1 | 5/2014 | Lee et al. |

(56) References Cited

U.S. PATENT DOCUMENTS

| | | |
|---|---|---|
| 2014/0146055 A1 | 5/2014 | Bala et al. |
| 2014/0149794 A1 | 5/2014 | Shetty et al. |
| 2014/0149983 A1 | 5/2014 | Bonilla et al. |
| 2014/0173199 A1 | 6/2014 | Gupta et al. |
| 2014/0181116 A1 | 6/2014 | Wang |
| 2014/0188808 A1 | 7/2014 | Wolf et al. |
| 2014/0189429 A1 | 7/2014 | Gill et al. |
| 2014/0189677 A1 | 7/2014 | Curzi et al. |
| 2014/0189685 A1 | 7/2014 | Kripalani |
| 2014/0189686 A1 | 7/2014 | Masters et al. |
| 2014/0196038 A1 | 7/2014 | Kottomtharayil et al. |
| 2014/0201725 A1 | 7/2014 | Tian et al. |
| 2014/0207824 A1 | 7/2014 | Brandwine et al. |
| 2014/0230024 A1 | 8/2014 | Uehara et al. |
| 2014/0237464 A1 | 8/2014 | Waterman et al. |
| 2014/0250300 A1 | 9/2014 | Runkis et al. |
| 2014/0279909 A1 | 9/2014 | Sudarsanam et al. |
| 2014/0298185 A1 | 10/2014 | Chen et al. |
| 2014/0310710 A1 | 10/2014 | Lubsey et al. |
| 2014/0359612 A1 | 12/2014 | D'Amato et al. |
| 2014/0365811 A1 | 12/2014 | Veiga et al. |
| 2015/0006707 A1 | 1/2015 | Malik et al. |
| 2015/0006788 A1 | 1/2015 | Liu et al. |
| 2015/0007180 A1 | 1/2015 | Sharp et al. |
| 2015/0026682 A1 | 1/2015 | Singh et al. |
| 2015/0032690 A1 | 1/2015 | Hoque et al. |
| 2015/0039735 A1 | 2/2015 | Zeyliger et al. |
| 2015/0039837 A1 | 2/2015 | Quan et al. |
| 2015/0081644 A1 | 3/2015 | Pitts |
| 2015/0095788 A1 | 4/2015 | Thiele et al. |
| 2015/0106802 A1 | 4/2015 | Ivanov et al. |
| 2015/0142745 A1 | 5/2015 | Tekade et al. |
| 2015/0142747 A1 | 5/2015 | Zou |
| 2015/0143164 A1 | 5/2015 | Veerla et al. |
| 2015/0172412 A1 | 6/2015 | Escriva et al. |
| 2015/0178019 A1 | 6/2015 | Hegdal et al. |
| 2015/0205639 A1 | 7/2015 | Matsumoto et al. |
| 2015/0213032 A1 | 7/2015 | Powell et al. |
| 2015/0215389 A1 | 7/2015 | Spencer |
| 2015/0220324 A1 | 8/2015 | Arcese et al. |
| 2015/0242291 A1 | 8/2015 | Chang et al. |
| 2015/0278046 A1 | 10/2015 | Zellermayer et al. |
| 2015/0293830 A1 | 10/2015 | Bhide et al. |
| 2015/0293896 A1 | 10/2015 | Runkis et al. |
| 2015/0301903 A1 | 10/2015 | Mutha et al. |
| 2015/0309891 A1 | 10/2015 | Saika |
| 2015/0032653 A1 | 11/2015 | Cui |
| 2015/0324217 A1 | 11/2015 | Shilmover et al. |
| 2015/0326531 A1 | 11/2015 | Cui et al. |
| 2015/0331757 A1 | 11/2015 | Durge et al. |
| 2015/0355862 A1 | 12/2015 | Hayes et al. |
| 2015/0378761 A1 | 12/2015 | Sevigny et al. |
| 2015/0378853 A1 | 12/2015 | Sevigny |
| 2016/0004693 A1 | 1/2016 | Chen et al. |
| 2016/0011898 A1 | 1/2016 | Lee et al. |
| 2016/0070492 A1 | 3/2016 | Cherubini et al. |
| 2016/0077988 A1 | 3/2016 | Tipton et al. |
| 2016/0078068 A1 | 3/2016 | Agrawal et al. |
| 2016/0085480 A1 | 3/2016 | Chiu et al. |
| 2016/0085574 A1 | 3/2016 | Dornemann et al. |
| 2016/0087861 A1 | 3/2016 | Kuan et al. |
| 2016/0110214 A1 | 4/2016 | Vincent et al. |
| 2016/0110267 A1 | 4/2016 | Earl et al. |
| 2016/0124665 A1 | 5/2016 | Jain et al. |
| 2016/0162371 A1 | 6/2016 | Prabhu et al. |
| 2016/0171241 A1 | 6/2016 | Yun |
| 2016/0179416 A1 | 6/2016 | Mutha et al. |
| 2016/0179419 A1 | 6/2016 | Yamaguchi et al. |
| 2016/0188232 A1 | 6/2016 | Ramachandran et al. |
| 2016/0188407 A1 | 6/2016 | Bronnikov et al. |
| 2016/0202916 A1 | 7/2016 | Cui et al. |
| 2016/0203008 A1 | 7/2016 | Cui et al. |
| 2016/0216993 A1 | 7/2016 | Beckwith et al. |
| 2016/0224363 A1 | 8/2016 | Joy |
| 2016/0274926 A1 | 9/2016 | Narasimhamurthy et al. |
| 2016/0301766 A1 | 10/2016 | Ionescu et al. |
| 2016/0316003 A1 | 10/2016 | Snider et al. |
| 2016/0328226 A1 | 11/2016 | Arya et al. |
| 2016/0335108 A1 | 11/2016 | Ryu et al. |
| 2016/0335134 A1 | 11/2016 | Gupta et al. |
| 2016/0359697 A1 | 12/2016 | Scheib et al. |
| 2016/0378528 A1 | 12/2016 | Zamir |
| 2016/0378616 A1 | 12/2016 | Wigmore et al. |
| 2017/0004131 A1 | 1/2017 | Ben Dayan et al. |
| 2017/0005990 A1 | 1/2017 | Birger et al. |
| 2017/0012904 A1 | 1/2017 | Matzek et al. |
| 2017/0024152 A1 | 1/2017 | Bhagi et al. |
| 2017/0024224 A1 | 1/2017 | Bakke et al. |
| 2017/0039078 A1 | 2/2017 | Chen et al. |
| 2017/0039218 A1 | 2/2017 | Prahlad et al. |
| 2017/0048223 A1 | 2/2017 | Anantha Padmanaban et al. |
| 2017/0068469 A1 | 3/2017 | Shankar et al. |
| 2017/0075921 A1 | 3/2017 | Benton et al. |
| 2017/0090776 A1 | 3/2017 | Kowles |
| 2017/0091047 A1 | 3/2017 | Bangalore et al. |
| 2017/0109184 A1 | 4/2017 | Ramani et al. |
| 2017/0160983 A1 | 6/2017 | Fiske et al. |
| 2017/0177638 A1 | 6/2017 | Bhosale et al. |
| 2017/0193021 A1 | 7/2017 | Deng et al. |
| 2017/0206074 A1 | 7/2017 | Arcese et al. |
| 2017/0206207 A1 | 7/2017 | Bondurant et al. |
| 2017/0220661 A1 | 8/2017 | Cao et al. |
| 2017/0228300 A1 | 8/2017 | Thomas et al. |
| 2017/0235507 A1 | 8/2017 | Sinha et al. |
| 2017/0235562 A1 | 8/2017 | Bafna et al. |
| 2017/0235563 A1 | 8/2017 | Bafna et al. |
| 2017/0235589 A1 | 8/2017 | Gopalapura Venkatesh et al. |
| 2017/0235590 A1 | 8/2017 | Sinha et al. |
| 2017/0235591 A1 | 8/2017 | Kanada et al. |
| 2017/0235653 A1 | 8/2017 | Arikatla et al. |
| 2017/0235654 A1 | 8/2017 | Deshmukh et al. |
| 2017/0235751 A1 | 8/2017 | Gupta et al. |
| 2017/0235758 A1 | 8/2017 | Gopalapura Venkatesh et al. |
| 2017/0235760 A1 | 8/2017 | Sharpe et al. |
| 2017/0235761 A1 | 8/2017 | Bafna et al. |
| 2017/0235762 A1 | 8/2017 | Sharpe et al. |
| 2017/0235763 A1 | 8/2017 | Ventatesh et al. |
| 2017/0235764 A1 | 8/2017 | Sharpe et al. |
| 2017/0235950 A1 | 8/2017 | Gopalapura Venkatesh et al. |
| 2017/0242599 A1 | 8/2017 | Patnaik et al. |
| 2017/0262346 A1 | 9/2017 | Pradhan et al. |
| 2017/0264684 A1 | 9/2017 | Spillane et al. |
| 2017/0277556 A1 | 9/2017 | Ishii et al. |
| 2017/0277903 A1 | 9/2017 | Christodorescu et al. |
| 2017/0279674 A1 | 9/2017 | Zhu |
| 2017/0286228 A1 | 10/2017 | Redko et al. |
| 2017/0302589 A1 | 10/2017 | Leafe et al. |
| 2017/0302731 A1 | 10/2017 | Cui |
| 2018/0004766 A1 | 1/2018 | Darling |
| 2018/0011766 A1 | 1/2018 | Lee et al. |
| 2018/0062993 A1 | 3/2018 | Wu et al. |
| 2018/0113623 A1 | 4/2018 | Sancheti |
| 2018/0129426 A1 | 5/2018 | Aron et al. |
| 2018/0143845 A1 | 5/2018 | Chawla et al. |
| 2018/0143880 A1 | 5/2018 | Dornemann |
| 2018/0145960 A1 | 5/2018 | Bakshan et al. |
| 2018/0157521 A1 | 6/2018 | Arikatla et al. |
| 2018/0157522 A1 | 6/2018 | Bafna et al. |
| 2018/0157561 A1 | 6/2018 | Venkatesh et al. |
| 2018/0157677 A1 | 6/2018 | Bafna et al. |
| 2018/0157752 A1 | 6/2018 | Arikatla et al. |
| 2018/0157860 A1 | 6/2018 | Nair et al. |
| 2018/0159729 A1 | 6/2018 | Deshmukh et al. |
| 2018/0159826 A1 | 6/2018 | Msan et al. |
| 2018/0173731 A1 | 6/2018 | Nazari et al. |
| 2018/0196719 A1 | 7/2018 | Glass |
| 2018/0205787 A1 | 7/2018 | Ben Dayan et al. |
| 2018/0278602 A1 | 9/2018 | Koushik et al. |
| 2018/0332105 A1 | 11/2018 | Huang et al. |
| 2018/0357251 A1 | 12/2018 | Kumarasamy et al. |
| 2019/0026101 A1 | 1/2019 | Venkatesh et al. |
| 2019/0034240 A1 | 1/2019 | Nabi et al. |
| 2019/0079747 A1 | 3/2019 | Sinha et al. |
| 2019/0129808 A1 | 5/2019 | Acharya et al. |

(56) References Cited

U.S. PATENT DOCUMENTS

| | | |
|---|---|---|
| 2019/0179918 A1 | 6/2019 | Singh et al. |
| 2019/0196718 A1 | 6/2019 | Pai et al. |
| 2019/0207925 A1 | 7/2019 | Anantha Padmanaban et al. |
| 2019/0228147 A1* | 7/2019 | Formato .............. H04L 63/145 |
| 2019/0243703 A1 | 8/2019 | Rooney et al. |
| 2019/0332683 A1 | 10/2019 | Thummala et al. |
| 2019/0339883 A1 | 11/2019 | Aron et al. |
| 2020/0007530 A1 | 1/2020 | Mohamad Abdul et al. |
| 2020/0034069 A1 | 1/2020 | Batra et al. |
| 2020/0036647 A1 | 1/2020 | Gupta et al. |
| 2020/0081704 A1 | 3/2020 | Bafna et al. |
| 2020/0081733 A1 | 3/2020 | Buck et al. |
| 2020/0106669 A1 | 4/2020 | Dhillon et al. |
| 2020/0125580 A1 | 4/2020 | Shao |
| 2020/0137157 A1 | 4/2020 | Joseph et al. |
| 2020/0193059 A1 | 6/2020 | Narayanswamy et al. |
| 2020/0274869 A1 | 8/2020 | Tahenakos et al. |
| 2021/0141630 A1 | 5/2021 | Sharpe et al. |
| 2021/0157690 A1 | 5/2021 | Wexler et al. |
| 2021/0200641 A1 | 7/2021 | Bafna et al. |
| 2021/0224233 A1 | 7/2021 | Bafna et al. |
| 2021/0247973 A1 | 8/2021 | Gupta et al. |
| 2021/0318938 A1 | 10/2021 | Benke et al. |
| 2021/0326358 A1 | 10/2021 | Seelemann et al. |
| 2021/0334178 A1 | 10/2021 | Yang et al. |
| 2021/0342237 A1 | 11/2021 | Polimera et al. |
| 2021/0344772 A1 | 11/2021 | Arikatla et al. |
| 2021/0349859 A1 | 11/2021 | Bafna et al. |
| 2021/0365257 A1 | 11/2021 | Venkatesh et al. |
| 2021/0373815 A1* | 12/2021 | Kumar .................... G06F 3/067 |
| 2021/0390080 A1 | 12/2021 | Tripathi et al. |
| 2021/0397587 A1 | 12/2021 | Thummala et al. |
| 2021/0406136 A1 | 12/2021 | Venkatesh et al. |
| 2022/0004377 A1 | 1/2022 | Sharpe et al. |
| 2022/0091947 A1 | 3/2022 | Kothari et al. |
| 2022/0147342 A1 | 5/2022 | Sharpe et al. |
| 2022/0147495 A1 | 5/2022 | Sharpe et al. |
| 2022/0156107 A1 | 5/2022 | Bafna et al. |
| 2022/0283708 A1 | 9/2022 | Grunwald et al. |
| 2022/0292002 A1* | 9/2022 | Kumar ................ G06F 11/1484 |
| 2023/0056217 A1 | 2/2023 | Rathi et al. |
| 2023/0056425 A1 | 2/2023 | Gopalapura Venkatesh et al. |
| 2023/0066137 A1 | 3/2023 | Mjjapurapu et al. |
| 2023/0068262 A1 | 3/2023 | Bafna et al. |
| 2023/0101337 A1 | 3/2023 | Ahmad et al. |
| 2023/0237022 A1 | 7/2023 | Thomas et al. |
| 2023/0237170 A1 | 7/2023 | Thummala et al. |
| 2024/0070032 A1 | 2/2024 | Wang et al. |

FOREIGN PATENT DOCUMENTS

| | | |
|---|---|---|
| CN | 110516005 A | 11/2019 |
| CN | 110519112 A | 11/2019 |
| CN | 110569269 A | 12/2019 |
| EP | 1062581 B1 | 10/2003 |
| EP | 1214663 B1 | 6/2006 |
| EP | 1979814 A2 | 10/2008 |
| WO | 2010050944 A1 | 5/2010 |
| WO | 2012126177 A2 | 9/2012 |
| WO | 2016018446 A1 | 2/2016 |
| WO | 2018014650 A1 | 1/2018 |

OTHER PUBLICATIONS

U.S. Appl. No. 17/581,418 titled "File Server Managers and Systems for Managing Virtualized File Servers" filed Jan. 21, 2022.

Isilon OneFS, Version 8.0.1; Web Administration Guide, Oct. 2016.

Dell EMC; Dell EMC Isilon OneFS Operating System; Scale-out NAS to maximize the data capital and business value of your unstructured data, 2020, pp. all.

Dell EMC; White Paper; Dell EMC Isilon Onefs Operating System; Powering the Isilon Scale-Out Storage Platform, Dec. 2019, pp. all.

"Administering VMware vSAN—VMware vSphere 7.0", 2015-2020, pp. 1-114.

"Architecture for Continuous Replication", Commvault, May 7, 2020, pp. 1-4.

"Backup vSAN 7 File Share with Veeam Backup & Replication 10", Sysadmin Stories, https://www.sysadminstories.com/2020/06/backup-vsan-7-file-share-with-veeam.html, Jun. 2, 2020, pp. 1-7.

"Best practices for disaster recovery with Azure File Sync", Microsoft Docs https://docs.microsoft.com/en-us/azure/storage/file-sync/file-sync-disaster-recovery-best-practices, Retrieved Jun. 1, 2022, pp. 1-6.

"Characteristics of a vSAN Cluster", May 31, 2019, pp. 1-2.

"Clustered Data Ontap 8.2 File Access Management Guide for Cifs", NetApp; (year 2014), Feb. 2014, pp. all.

"Data Restore Using Restore Portal", Veeam | Microsoft 365, Feb. 25, 2022, pp. 1.

"Designing and Sizing Virtual SAN Fault Domains", Administering VMware Virtual SAN; VMware vSphere 6.5; vSAN 6.6; https://docs.vmware.com/en/VMware-vSphere/6.5/virtual-san-66-administration-guide.pdf, captured Aug. 20, 2021, 2017, pp. 34.

"Disaster Recovery of Workloads on AWS: Recovery in the Cloud", AWS, Feb. 12, 2021, pp. 1-33.

"EMC Isilon OneFS Operating System; Powering scale-out storage for the new world of Big Data in the enterprise", www.EMC.com, Feb. 2020, pp. all.

"Enabling or disabling SMB automatic node referrals", NetApp https://docs.netapp.com/ontap-9/index.jsp?topic=%2Fcom.netapp.doc.cdot-famg-cifs%2FGUID-AC7E8515-3A4C-4BB5-A8C8-38B565C952E0.html, Sep. 19, 2019, pp. all.

"End User Access", Commvault, 2019, pp. 1-4.

"Enterprise file shares with disaster recovery", Microsoft Docs https://docs.microsoft.com/en-us/azure/architecture/example-scenario/file-storage/enterprise-file-shares-disaster-recovery, Retrieved May 31, 2022, pp. 1-6.

"General Share Properties", Oracle ZFS Storage Application Administration Guide, 2013, pp. 1-5.

"Guaranteeing throughput with QoS", NetApp https://docs.netapp.com/ontap-9/index.jsp?topic=%2Fcom.netapp.doc.pow-perf-mon%2FGUID-77DF9BAF-4ED7-43F6-AECE-95DFB0680D2F.html, Sep. 19, 2019, pp. all.

"High Availability and Data Protection With Dell EMC Isilon Scale-Out Nas", Dell: Dell Inc., Jul. 2019, pp. all.

"How to troubleshoot the 'Autolocation' feature in Clustered Data ONTAP", NetApp https://kb.netapp.com/app/answers/answer_view/a_id/1030857/loc/en_US#_highlight, Sep. 19, 2019, pp. all.

"How to Troubleshoot the 'Autolocation' feature in Clustered Data ONTAP—Results", NetApp https://kb.netapp.com/app/results/kw/autolocation/, Sep. 19, 2019, pp. all.

"Hybrid Cloud Storage with Cloudian HyperStore and Amazon S3", Cloudian Inc.; www.cloudian.com, 2014, pp. all.

"Improving client response time by providing SMB automatic node referrals with Auto Location", NetApp https://library.netapp.com/ecmdocs/ECMP1196891/html/GUID-0A5772A4-A6D7-4A00-AC2A-92B868C5B3B5.html, Sep. 19, 2019, pp. all.

"Introducing HPE Cloud Volumes Backup Chalk Talk", HPE Technology, 2020, pp. 1-5.

"Managing Workloads", NetApp https://docs.netapp.com/ontap-9/index.jsp?topic=%2Fcom.netapp.doc.pow-perf-mon%2FGUID-13D35FC5-AF37-4BBD-8A8E-B10B41451A16.html, Sep. 19, 2019, pp. all.

"Neverfail User Guide", Neverfail HybriStor v2.3 | https://neverfail.com/, 2017, pp. 1-58.

"Nutanix AFS—Introduction & Steps for Setting Up", Retrieved from https://virtual building blocks.com/2 0 1 8/01 /03/nutanix-afs-introduction-steps-for-setting-up/ (Year: 2018), Jan. 3, 2018, 1-23.

"Nutanix Files Guide", Nutanix, Sep. 14, 2018, pp. all.

"Oracle ZFS Storage Appliance: How to Optimize Replication Performance", Oracle System Handbook—ISO 7.0, Aug. 1, 2018, pp. 1-3.

"Path Failover and Virtual Machines", vSphere Storage; Update 2; VMware vSphere 7.0; VMware ESXi 7.0; vCenter Server 7.0;

(56) References Cited

OTHER PUBLICATIONS https://docs.vmware.com/en/VMware-vSphere/7.0/vsphere-esxi-vcenter-server-702-storage-guide.pdf, Jun. 25, 2021, pp. 238.
"Preparing Storage Systems for Snapmirror Replication", NetApp ; NetApp, Apr. 2005, pp. all.
"Protect Your Data With Netapp Element Software", Solution Brief; NetApp, 2018, pp. all.
"Quantum User Essentials", Quantum, 2013, pp. 1-2.
"Replication for File Systems", Commvault, January 4, 2022, pp. 1.
"Replication: Remote Replication Introduction", Oracle Sun ZFS Storage 7000 System Administration Guide, 2012, pp. 1-6.
"Reversing the Direction of Replication", Oracle ZFS Storage Appliance Administration Guide, 2014, pp. 1-2.
"Self Service Backup and Restoration(TrilioVault) Service Scope", UKCloud https://docs.ukcloud.com/articles/openstack/ostack-sco-triliovault.html, Retrieved Jun. 1, 2022, pp. 1-3.
"Setting Up and Using Acropolis File Services (AFS) on Nutanix AOS 5.0", Virtual Dennis—Sharing Technical Tips Learned the Hard Way, Dec. 30, 2016, pp. all.
"Tech TopX: AHV One Click Upgrade", Screen captures from YouTube video clip, 13 pages, uploaded on Dec. 8, 2015 by user "Nutanix University". Retrieved from Internet: https://www.youtube.com/watch?v=3dALdzw6qZM, Dec. 8, 2015, pp. all.
"Technical Overview and Best Practices", VMware vSphere VMFS ; a VMware Technical White Paper updated for VMware vSphere 5.1, Version 3.0, Nov. 27, 2012, pp. all.
"Understanding Multipathing and Failover", vSphere Storage; VMware vSphere 7.0; VMware ESXi 7.0; vCenter Server 7.0 https://docs.vmware.com/en/VMware-vSphere/7.0/vsphere-esxi-vcenter-server-702-storage-guide.pdf, Jun. 25, 2021, pp. 234-268.
"Virtual Disk Manager User's Guide: Virtual Disk Development Kit", vmware.com, 2008, 1-12.
"VMware vCenter Server: Centrally Mananged Virtual Infrastructure Delivered with Confidence", VMWare Datasheet; https://www.vmware.com/content/dam/digitalmarketing/vmware/en/pdf/products/vCenter/vmware-vcenter-server-datasheet.pdf, captured Aug. 20, 2021, 2015, 2015, pp. 1-2.
"VMware VSAN 7.0 Release Notes", VMware; https://docs.vmware.com/en/VMware-vSphere/7.0/rn/vmware-vsan-70-release-notes.html, Mar. 8, 2021, pp. 1-12.
"VSAN 7.0 U2 Proof of Concept Guide", VMwareStorage; https://images.core.vmware.com/sites/default/files/resource/vsan_70_u2_proof_of_concept_guide_noindex.pdf, printed May 18, 2021, Apr. 2021, pp. 1-267.
"VSAN File Services Tech Note | VMware", Aug. 2021, 1-7.
"VSAN Health Service—File Service—File Server Health (77165)", VMware, Knowledge Base; https://kb.vmware.com/s/article/77165, May 15, 2021, pp. 1-5.
"VSAN Monitoring and Troubleshooting—VMware vSphere 7.0", https://docs.vmware.com/, Sep. 2018, 1-61.
"VSAN Performance Graphs in the vSphere Web Client (2144493)", Nov. 9, 2020, 1-42.
"VSan Planning and Deployment", Update 2 VMWare vSphere 6.7; VMware vSAN 6.7; https://docs.vmware.com/en/VMware-vSphere/6.7/vsan-673-planning-deployment-guide.pdf, Aug. 20, 2019, pp. 1-85.
"VSan Stretched Cluster Guide", VMwareStorage; https://images.core.vmware.com/sites/default/files/resource/vsan_stretched_cluster_guide_noindex.pdf, printed Jun. 24, 2021, Jun. 2020, pp. 1-62.
"VSphere Availability—VMware vSphere 6.7", https://docs.vmware.com/, Jan. 11, 2019, 1-105.
"VSphere Storage—VMware vSphere 6.7", https://docs.vmware.com/, Jan. 4, 2021, 1-382.
Bessette, Karinne , "Self-service and Backup Copy in NEW Veeam Backup for Microsoft 365 v6", Veeam https://www.veeam.com/blog/self-service-backup-copy-microsoft-365.html, Mar. 9, 2022, pp. 1-6.
Bhardwaj, Rishi , "The Wonderful World of Distributed Systems and the Art of Metadata Management", Nutanix, Inc., https://www.nutanix.com/blog/the-wonderful-world-of-distributed-systems-and-metadata-management; captured Aug. 19, 2021, Sep. 24, 2015, pp. 1-8.
Birk, Ryan , "How it Works: Understanding vSAN Architecture Components", altaro.com, Feb. 28, 2018, 1-10.
Bounds, Jay , "High-Availability (HA) Pair Controller Configuration Overview and Best Practices", NetApp, Feb. 2016, pp. all.
Cano, Ignacio et al., "Curator: Self-Managing Storage for Enterprise Clusters", University of Washington, Mar. 2017, pp. all.
Cormac, , "Native File Services for vSAN 7", CormacHogan.com, Mar. 11, 2020, 1-23.
Costa, Jorge , "High Availability Setup Using Veritas Cluster Server and NetApp Synchronous SnapMirror—One button Failover/Failback with SnapMirror Sync and Veritas Cluster Server", NetApp Community, Nov. 18, 2010, pp. all.
Feroce, Danilo , "Leveraging VMware vSAN for Highly Available Management Clusters", VMware, Inc., Version 2.9, VMware, Inc., Jan. 2018, 1-22.
Fojta, Tomas , "Quotas and Quota Policies in VMware Cloud Director—Tom Fojta's Blog", Nov. 6, 2020, 1-4.
Fojta, Tomas , "vSAN File Services with vCloud Director—Tom Fojta's Blog", (wordpress.com) ("Fojta Blog"), Feb. 11, 2021, pp. 1-8.
Hogan, Cormac , "New updates from Nutanix—NOS 3.0 and NX-3000", https://cormachogan.com/2012/12/20/new-from-nutanix-nos-3-0-nx-3000/, Dec. 20, 2012, pp. 1-7.
Jeffrey, Hemmes et al., "Cacheable Decentralized Groups for Grid Resource Access Control", 2006 7th IEEE/ACM International Conference on Grid Computing Department of Computer Science and Engineering, University of Notre Dame, doi: 10.1109/ICGRID.2006.311015, Sep. 2006, pp. 192-199.
Jung, Young-Woo et al., "Standard-Based Vitrual Infrastructure Resource Management for Distributed and Heterogeneous Servers", ICACT, Feb. 15, 2009, pp. all.
Kaam, Bas V. , "New in AOS 5.0: Nutanix Acropolis File Services", basvankaam.com, Jan. 5, 2017, pp. all.
Kemp, Erik , "NetApp SolidFire SnapMirror Architecture and Configuration", Technical Report, NetApp, Dec. 2017, pp. all.
Kleyman, Bill , "How Cloud Computing Changes Storage Tiering", https://www.datacenterknowledge.com ; captured Jun. 4, 2019, Nov. 12, 2015, pp. all.
Leibovici, Andre , "Nutanix One-Click Upgrade now takes care of Firmware and Hypervisor too!", myvirtualcloud.net https://myvirtualcloud.net/nutanix-one-click-upgrade-now-takes-care-of-firmware-and-hypervisor-too/, Jul. 31, 2014, pp. 1-4.
Nemnom, Charbel , "How to Enable Self-Service Restore in Azure File Sync", charbelnemnom.com, Jan. 22, 2022, pp. 1-7.
Poitras, Steven , "The Nutanix Bible", http://stevenpoitras.com/the-nutanix-bible/ (Publication date based on indicated capture date by Archive.org; first publication date unknown), Jan. 11, 2014, pp. all.
Poitras, Steven , "The Nutanix Bible", https://nutanixbible.com/, Jan. 12, 2016, pp. all.
Poitras, Steven , "The Nutanix Bible", https://nutanixbible.com/, Jan. 3, 2017, pp. all.
Poitras, Steven , "The Nutanix Bible", https://nutanixbible.com/, Jan. 3, 2018, pp. all.
Poitras, Steven , "The Nutanix Bible", http://stevenpoitras.com/the-nutanix-bible/ (Publication date based on indicated capture date by Archive.org; first publication date unknown), Jan. 7, 2015, pp. all.
Poitras, Steven , "The Nutanix Bible", https://nutanixbible.com/, Jan. 8, 2019, pp. all.
Poitras, Steven , "The Nutanix Bible", https://nutanixbible.com/, Jul. 25, 2019, pp. all.
Poitras, Steven , "The Nutanix Bible", http://stevenpoitras.com/the-nutanix-bible/ (Publication date based on indicated capture date by Archive.org; first publication date unknown), Jun. 20, 2014, pp. all.
Poitras, Steven , "The Nutanix Bible", https://nutanixbible.com/, Jun. 25, 2018, pp. all.
Poitras, Steven , "The Nutanix Bible", https://nutanixbible.com/, Jun. 8, 2017, pp. all.
Poitras, Steven , "The Nutanix Bible", http://stevenpoitras.com/the-nutanix-bible/ (Publication date based on indicated capture date by Archive.org; first publication date unknown), Jun. 9, 2015, pp. all.

(56) References Cited

OTHER PUBLICATIONS

Poitras, Steven, "The Nutanix Bible", https://nutanixbible.com/, Jun. 9, 2016, pp. all.
Poitras, Steven, "The Nutanix Bible", https://nutanixbible.com/, Mar. 2, 2020, pp. all.
Poitras, Steven, "The Nutanix Bible", https://nutanixbible.com/, Mar. 2, 2021, pp. all.
Poitras, Steven, "The Nutanix Bible", http://stevenpoitras.com/the-nutanix-bible/ (Publication date based on indicated capture date by Archive.org; first publication date unknown), Oct. 15, 2013, pp. all.
Poitras, Steven, "The Nutanix Bible", https://nutanixbible.com/, Sep. 1, 2020, pp. all.
Poitras, Steven, "The Nutanix Bible", https://nutanixbible.com/, Sep. 17, 2019, pp. all.
Poitras, Steven, "The Nutanix Bible", https://nutanixbible.com/, Sep. 3, 2021, pp. all.
Poitras, Steven, "The Nutanix Bible", https://nutanixbible.com/, Sep. 4, 2015, pp. all.
Rajendran, Cedric, "Working with vSAN Health Checks", VMware vSan Virtual Blocks Blog; https://blogs.vmware.com/virtualblocks/2019/07/18/working-with-vsan-health-checks/, Jul. 18, 2019, pp. 1-6.
Ruth, Paul, "Autonomic Live Adaption of Virtual Computational Environments in a Multi-Domain Infrastructure", 2006 IEEE International Conference on Autonomic Computing, 2006, pp. 5-14.
Seget, Vladan, "VMware vSAN 7 now with native file services and quotas", May 1, 2020.
Seget, Vladan, "VMware vSphere 7.0 and vSAN storage improvements", Apr. 1, 2020, pp. 1-12.
Sturniolo, Andy, "VMware vSAN File Services and Veeam", Veeam Blog, https://www.veeam.com/blog/veeam-backup-vsan-file-services.html, Jul. 22, 2020, 1-9.
Poitras, Steven, "The Nutanix Bible", https://nutanixbible.com/, Apr. 9, 2019, pp. all.
U.S. Appl. No. 18/178,400 titled "Application Level to Share Level Replication Policy Transition for File Serverdisaster Recovery Systems" filed Mar. 3, 2023.
"Common Tasks—Remote Replication", Arcserve htttps://support.storagecraft/com/s/article/common-tasks-remote-replication-ox?language=en_US, Oct. 20, 2021, pp. 1-11.
"DFS Namespaces and DFS Replication Overview", Microsoft Learn, Aug. 31, 2016, pp. 9.
"DFS Namespaces Overview", Microsoft Learn, Jan. 5, 2023, pp. 6.
"Introduction to Oracle Data Guard", Oracle https://docs.oracle.com/en/database/oracle/oracle-database/19/sbydb/introduction-to-oracle-data-guard-concepts.html#GUID-5E73667D-4A56-445E-911 F-1 E99092DD8D7, pp. 1-20.
"Nutanix Files Guide", Nutanix Files 3.7, Nov. 23, 2021, pp. 1-174.
"Nutanix-Files", Nutanix, Inc. v7.0 https://download.nutanix.com/solutionsDocs/TN-2041-Nutanix-Files.pdf, Oct. 2021, pp. 1-89.
"Server-to-Server Storage Replication with Storage Replica", Microsoft https://docs.microsoft.com/en-us/windows-server/storage/storage-replica/server-to-server-storage-replication,, Jul. 29, 2021, pp. 1-20.
"Storage Replica Overview", Microsoft thttps://docs.microsoft.com/en-us/windows-server/storage/storage-replica/storage-replica-overview, Jul. 29, 2021, pp. 1-11.
U.S. Appl. No. 18/410,903 titled "Systems and Methods for Generating Consistent Global Identifiers Within Adistributed File Server Environment Including Examples of Global Identifiersacross Domains" filed Jan. 11, 2024.
"Carbonite Availability for Windows User's Guide Version 8.1.0", Carbonite, Inc. (United States), Feb. 27, 2018, pp. 1-391.
"IBM Storwize V7000 Unified", https://www.ibm.com/docs/en/flashsystem-v7000u/1.6.2?topic=maim-best-practices-authentication-id-mapping-configurations-while-using-asynchronous-replication-remote-caching, Mar. 31, 2021, pp. 1-3.
"ID mapping basic concepts", https://www.ibm.com/docs/en/flashsystem-v7000u/1.6.2?topic=mapping-id-basic-concepts, Feb. 27, 2021, pp. 1-8.

\* cited by examiner

US 12,189,499 B2

SELF-SERVICE RESTORE (SSR) SNAPSHOT REPLICATION WITH SHARE-LEVEL FILE SYSTEM DISASTER RECOVERY ON VIRTUALIZED FILE SERVERS

BACKGROUND

During operation of a file server, such as a distributed file server, a variety of processes may generate snapshots of all or portions of the file server. These snapshots may include replication snapshots, as well as additional snapshots such as self-service restore (SSR) snapshots, backup snapshots, among others. During disaster recovery, a snapshot taken by a process for the purpose of disaster recovery may be used to prepare a remote site. The remote site may not accordingly receive replication of other snapshots related to the file server. Accordingly, when a disaster recovery event occurs, recovery based only on replication snapshots at a disaster recovery location may be limited.

SUMMARY

An example computer readable medium disclosed herein is encoded with executable instructions which, when executed, cause a system to perform operations including receiving a replication snapshot of a share of a file system at a disaster recovery location, where the replication snapshot is configured for recovery of the share at the disaster recovery location, and where the replication snapshot includes an additional snapshot taken since a time of a previous replication snapshot. The operations further include identifying the additional snapshot as a self-service recovery (SSR) snapshot based on a tag associated with a process used to create the additional snapshot. The operations further include extracting the additional snapshot for use by another instance of the process at the disaster recovery location.

An example method disclosed herein includes generating a replication snapshot of a share of a file system at a first location, where the replication snapshot comprises one or more additional snapshots, each taken since a time of a previous replication snapshot. The method further includes transmitting the replication snapshots, including the one or more additional snapshots, to a second location. The method further includes extracting a first additional snapshot, from the replication snapshot, at the second location, for use by an instance of a process at the second location, where the extracting is based at least on a tag associated with the process used to create the first additional snapshot.

An example system disclosed herein includes a primary file server, the primary file server including a virtualized computing instance configured to form a cluster with other virtualized computing instances, the virtualized computing instance further configured to present a namespace of storage items. The primary file server further including a storage pool, the storage pool accessible to the virtualized computing instance and configured to store the namespace of storage items, where the virtualized computing instance is configured to manage access requests for a particular storage item in the namespace of storage items. The primary file server further including a secondary file server, the secondary file server configured to host a replication snapshot of a share of a file system of the primary file server, and at least one additional snapshot taken since a time of a previous replication snapshot, where the replication snapshot is configured for recovery of the share at the secondary file server.

DETAILED DESCRIPTION

Figure 1:
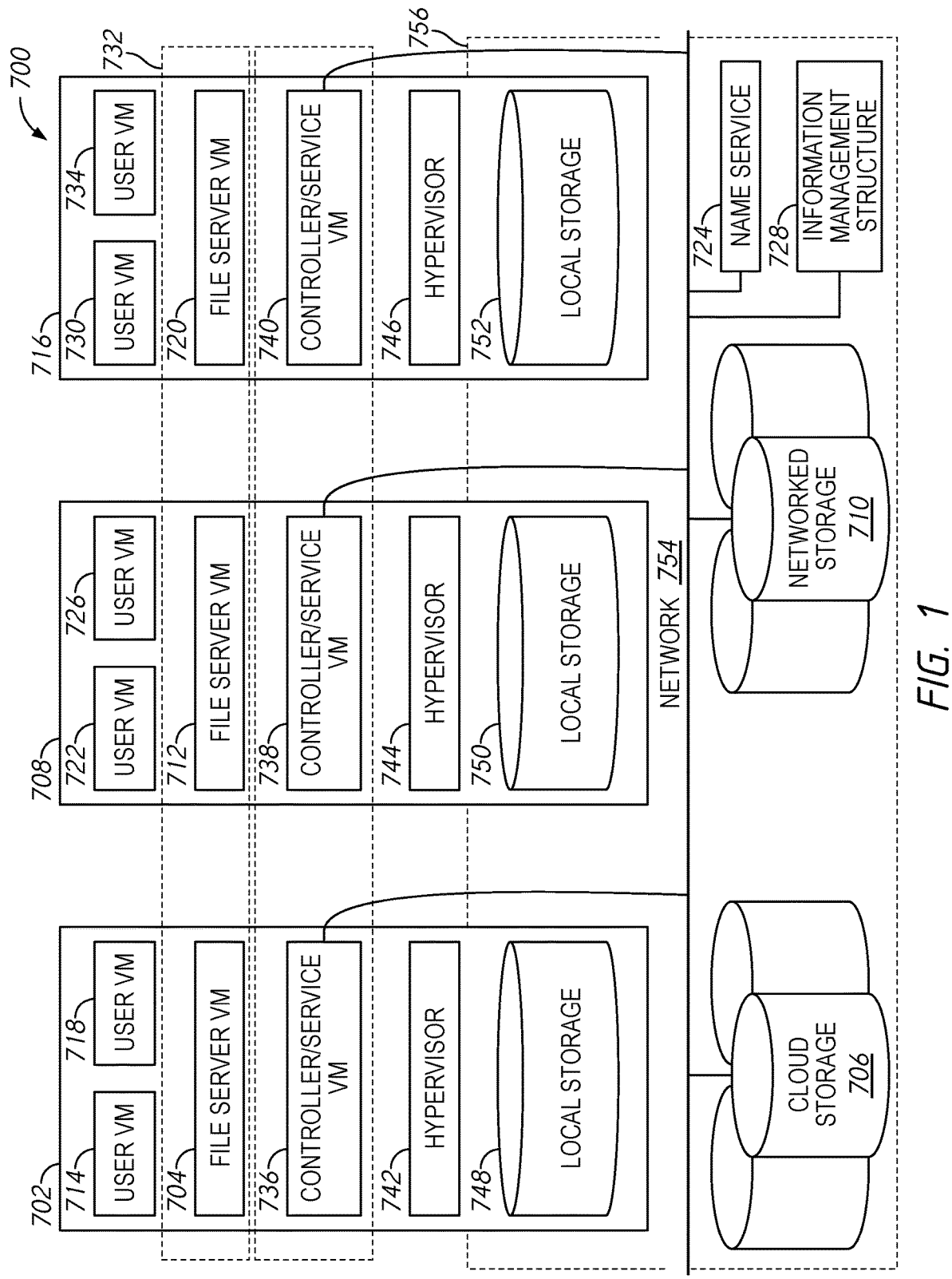
FIG. 1 is a schematic illustration of a clustered virtualization environment 700 implementing a virtualized file server in accordance with examples described herein.

Various embodiments of the present disclosure will be explained below in detail with reference to the accompanying drawings. Other embodiments may be utilized, and structural, logical and electrical changes may be made without departing from the scope of the present disclosure.

Certain details are set forth herein to provide an understanding of described embodiments of technology. However, other examples may be practiced without various of these particular details. In some instances, well-known computing system components, virtualization operations, and/or software operations have not been shown in detail in order to avoid unnecessarily obscuring the described embodiments. Other embodiments may be utilized, and other changes may be made, without departing from the spirit or scope of the subject matter presented here.

Examples described herein include replication of one or more virtualized file servers or portions of virtualized file servers as part of a disaster recovery process. Replication may be performed such that a secondary virtualized file server in a disaster recovery location is prepared as a fail-over site for a primary virtualized file server, such as a primary location. The secondary virtualized file server may host or otherwise make available a file system which may include one or more shares. There may be various mechanisms for protecting the secondary virtualized file server or implementing replication policies for the secondary virtualized file server.

In some embodiments, the disaster recovery process may include share-level replication from the primary virtualized file server to the secondary virtualized file server. The share-level replication allows replication policies, etc., to be set and implemented on a per-share basis for a file system. The share-based disaster recovery system makes use of a shared snapshot (e.g., a replication snapshot) at the primary and remote sites, and the replication snapshot may be periodically updated and/or replicated. Accordingly, replication snapshots may be generated by disaster recovery processes described herein for the purpose of replicating all or portions of the virtualized file server to a secondary site.

In some embodiments, on the primary virtualized file server, multiple processes may create (e.g., generate) various types of snapshots in addition to replication snapshots, such as additional snapshots. These additional snapshots may include but are not limited to self-service restore (SSR) snapshots and backup (CFT) snapshots, among others. Self-service restore (SSR) snapshots may be generated by one or more self-service restore processes executing on or in communication with the primary file server. SSR snapshots may be used by the primary file server to perform SSR. Backup snapshots may be generated by one or more backup processes executing on or in communication with the primary file server. Backup snapshots may be used to perform backup functions at the primary file server. In some embodiments, these snapshots may be in addition to snapshots created for the purpose of replication for disaster recovery. In some examples, some or all of these snapshots may be additional snapshots, created at a time in between one or more replication snapshots used for disaster recovery. The different kinds of snapshots may have different protection domains and/or data inclusion policies. That is, different sets of virtual machines or other virtual computing instances, and different sets of data may be captured in the particular snapshot based on the process used to create the snapshots. In some embodiments, snapshots, including but not limited to replication snapshots and/or additional snapshots, may be created and/or replicated by processes other than disaster recovery processes, and processes other than disaster recovery processes are contemplated to be within the scope of this disclosure.

In some systems, these additional types of snapshots may not be created, and in some systems, if created, these additional types of snapshots may not be replicated to the remote site, such as a disaster recovery location. This may compromise functionality at the disaster recovery location. For example, without the ability to have accurate SSR or backup snapshots at the disaster recovery location (e.g., secondary virtualized file server), it may be difficult, complex, or impossible to continue to perform SSR and/or backup on the secondary virtualized file server as it was being performed on the primary. Accordingly, examples of systems and methods described herein provide for snapshot management and the replication of multiple types of snapshots, which may be created by multiple processes, to a secondary site in accordance with a disaster recovery process.

Generally, SSR snapshots are file system snapshots used to restore user data locally, from the time the snapshots were taken. SSR snapshots are typically used protect and recover data in the event that a file, folder, or other storage (or other) item gets corrupted or modified with unwanted data, and users want to restore from the previous version. In some systems, when a disaster recovery policy is configured on a primary virtualized file server for shares that have SSR enabled, the SSR snapshots may not be replicated onto the secondary virtualized file server (e.g., a remote site, a disaster recovery location, etc.). Further, due to computational and technical limitations regarding taking snapshot and in-progress replications together, secondary virtualized file server shares, such as shares at disaster recovery locations, may be unable to generate SSR snapshots independently. Accordingly, when performing share-level replication, there may be no option to support SSR snapshots on secondary virtualized file servers (e.g., remote sites, disaster recovery locations, etc.).

Accordingly, example systems and methods described herein describe replication processes that include SSR and/or other snapshots, in addition to replication snapshots, that provide share-level disaster recovery on, for example, virtualized file servers.

Embodiments described herein include a replication engine (e.g., a share replicator) configured to identify additional snapshots (e.g., SSR or backup snapshots) between the last base snapshot for replication/disaster recovery and a current snapshot for replication/disaster recovery. The replication engine may be further configured to replicate those additional snapshots to a target file server, such as a secondary virtualized file server.

Embodiments described herein also include a scheduler component configured to handle the replication policies, as well as SSR snapshots.

In some embodiments, on the secondary virtualized file server (e.g., disaster recovery location), the SSR or other snapshot that gets replicated, will be tagged accordingly to comply with the retention policies. In some embodiments, a dedicated scheduler retention thread may be configured to monitor and purge the SSR snapshot as per the retention policy. In some embodiments, the SSR or other snapshots that get replicated to the secondary virtualized file server may comprise different retention policies than their corresponding snapshots on the primary virtualized file server. After migration, disaster recovery policies with SSR enabled shares will start replicating the additional SSR snapshots as well. The snapshots which are not replicable will be marked accordingly so that these snapshots will be skipped during replication In some embodiments, a secondary snapshot (e.g., SSR or backup snapshot) may be the same as a replication snapshot. For example, an SSR snapshot may be taken at a same time as a replication snapshot, and accordingly may be identical. In such cases, the single snapshot may be tagged as both a replication and an SSR snapshot, and may be used for both purposes. Only one snapshot (tagged as both SSR and replication) may need to be replicated to the remote site in that example. In some embodiments, retention policies may be different on the source and remote sites.

Examples described herein are concerned with virtualized file servers. Examples of virtualized file servers described herein may include a cluster of virtualized computing instances. Virtualized computing instances may generally refer to one or more virtual machines, containers, or other instances that virtualize computing resources (e.g., compute resources such as processor(s), memory, and/or storage). Examples herein may be described with reference to virtual machines, but it should be understood that the virtual machines represent virtualized computing instances that could be implemented with containers, or a combination of virtual machines and containers. Hypervisors may or may not be used accordingly.

Examples of systems and methods described herein may include one or more virtualized file servers. Examples of virtualized file servers are described in, for example, U.S. Published Patent Application 2017/0235760, entitled "Virtualized file server," published Aug. 17, 2017 on U.S. application Ser. No. 15/422,220, filed Feb. 1, 2017, both of which documents are hereby incorporated by reference in their entirety for any purpose.

FIG. 1 is a schematic illustration of a clustered virtualization environment 700 implementing a virtualized file server (VFS 732) according to particular embodiments. In particular embodiments, the VFS 732 provides file services to user VMs 714, 718, 722, 726, 730, and 734. Each user VM may be a client as used herein. The file services may include storing and retrieving data persistently, reliably, and efficiently. The user virtual machines may execute user processes, such as office applications or the like, on host machines 702, 708, and 716. The stored data may be represented as a set of storage items, such as files organized in a hierarchical structure of folders (also known as directories), which can contain files and other folders, and shares, which can also contain files and folders. VFS 732 is depicted as including a plurality of file server VMs. In some examples, other components may additionally be included in what is referred to as VFS, such as storage pool 756 and/or one or more hypervisors and controller/service VMs shown in FIG. 1.

The architectures of FIG. 1 can be implemented for a distributed platform that contains multiple host machines 702, 716, and 708 that manage multiple tiers of storage. The multiple tiers of storage may include storage that is accessible through network 754, such as, by way of example and not limitation, cloud storage 706 (e.g., which may be accessible through the Internet), network-attached storage 710 (NAS) (e.g., which may be accessible through a LAN), or a storage area network (SAN). Examples described herein also permit local storage 748, 750, and 752 that is incorporated into or directly attached to the host machine and/or appliance to be managed as part of storage pool 756. Examples of such local storage include Solid State Drives (henceforth "SSDs"), Hard Disk Drives (henceforth "HDDs" or "spindle drives"), optical disk drives, external drives (e.g., a storage device connected to a host machine via a native drive interface or a serial attached SCSI interface), or any other direct-attached storage. These storage devices, both direct-attached and network-accessible, collectively form storage pool 756. Virtual disks (or "vDisks") may be structured from the physical storage devices in storage pool 756. As used herein, the term vDisk refers to the storage abstraction that is exposed by a component of the virtualization platform, such as a Controller/Service VM (CVM) (e.g., CVM 736) and/or a hypervisor or other storage controller to be used by a user VM (e.g., user VM 714). In particular embodiments, the vDisk may be exposed via iSCSI ("internet small computer system interface") or NFS ("network filesystem") and is mounted as a virtual disk on the user VM. In particular embodiments, vDisks may be organized into one or more volume groups (VGs).

Each host machine 702, 716, 708 may run virtualization software, such as VMWARE ESX(I), MICROSOFT HYPER-V, or REDHAT KVM. The virtualization software includes hypervisors 742, 744, and 746 to create, manage, and destroy user VMs, as well as managing the interactions between the underlying hardware and user VMs. User VMs may run one or more applications that may operate as "clients" with respect to other elements within clustered virtualization environment 700. A hypervisor may connect to network 754. In particular embodiments, a host machine 702, 708, or 716 may be a physical hardware computing device; in particular embodiments, a host machine 702, 708, or 716 may be a virtual machine.

CVMs 736, 738, and 740 are used to manage storage and input/output ("I/O") activities according to particular embodiments. These special VMs may act as the storage controller in some example architectures. Multiple such storage controllers may coordinate within a cluster to form a unified storage controller system. CVMs may run as virtual machines on the various host machines, and work together to form a distributed system that manages all the storage resources in a storage pool, including for example local storage, network-attached storage 710, and cloud storage 706. The CVMs may connect to network 754 directly, or via a hypervisor. Since the CVMs run independent of hypervisors 742, 744, 746, this means that the current approach can be used and implemented within any virtual machine architecture, since the CVMs of particular embodiments can be used in conjunction with any hypervisor from any virtualization vendor. In some examples, CVMs may not be used and one or more hypervisors (e.g., hypervisors 742, 744, and/or 746) may perform the functions described with respect to the CVMs. In some examples, one or more CVMs may not be present, and the hypervisor or other component hosted on the computing nodes may provide the functions attributed to the CVM herein. In analogous manner, in some examples, VMs may not be present and containers may be used additionally or instead.

A host machine may be designated as a leader node within a cluster of host machines. For example, host machine 708 may be a leader node. A leader node may have a software component designated to perform operations of the leader. For example, CVM 738 on host machine 708 may be designated to perform such operations. A leader may be responsible for monitoring or handling requests from other host machines or software components on other host machines throughout the virtualized environment. If a leader fails, a new leader may be designated. In particular embodiments, a management module (e.g., in the form of an agent) may be running on the leader node and/or in communication with the leader node or virtual machines or containers on the leader node. For example, file server managers described herein may be in communication with the leader node in some examples.

Each CVM 736, 738, and 740 exports one or more block devices or NFS server targets that appear as disks to user VMs 714, 718, 722, 726, 730, and 734. These disks are virtual, since they are implemented by the software running inside CVMs 736, 738, and 740. Thus, to user VMs, CVMs appear to be exporting a clustered storage appliance that contains some disks. All user data (including the operating system) in the user VMs may reside on these virtual disks.

Significant performance advantages can be gained by allowing the virtualization system to access and utilize local storage 748, 750, and 752 as disclosed herein. This is because I/O performance is typically much faster when performing access to local storage as compared to performing access to network-attached storage 710 across a network 754. This faster performance for locally attached storage can be increased even further by using certain types of optimized local storage devices, such as SSDs. Further details regarding methods and mechanisms for implementing examples of the virtualization environment illustrated in FIG. 1 are described in U.S. Pat. No. 8,601,473, which is hereby incorporated by reference in its entirety.

As a user VM performs I/O operations (e.g., a read operation or a write operation), the I/O commands of the user VM may be sent to the hypervisor that shares the same server as the user VM. For example, the hypervisor may present to the virtual machines an emulated storage controller, receive an I/O command and facilitate the performance of the I/O command (e.g., via interfacing with storage that is the object of the command, or passing the command to a service that will perform the I/O command). An emulated storage controller may facilitate I/O operations between a user VM and a vDisk. A vDisk may present to a user VM as one or more discrete storage drives, but each vDisk may correspond to any part of one or more drives within storage pool 756. Additionally or alternatively, CVMs 736, 738, 740 may present an emulated storage controller either to the hypervisor or to user VMs to facilitate I/O operations. CVMs 736, 738, and 740 may be connected to storage within storage pool 756. CVM 736 may have the ability to perform I/O operations using local storage 748 within the same host machine 702, by connecting via network 754 to cloud storage 706 or network-attached storage 710, or by connecting via network 754 to local storage 750 or 752 within another host machine 708 or 716 (e.g., via connecting to another CVM 738 or 740). In particular embodiments, any suitable computing system may be used to implement a host machine.

In particular embodiments, the VFS 732 may include a set of File Server Virtual Machines (FSVMs) 704, 712, and 720 that execute on host machines 702, 708, and 716 and process storage item access operations requested by user VMs executing on the host machines 702, 708, and 716. The FSVMs 704, 712, and 720 may communicate with storage controllers provided by CVMs 736, 744, 740 and/or hypervisors executing on the host machines 702, 708, 716 to store and retrieve files, folders, SMB shares, or other storage items on local storage 748, 750, 752 associated with, e.g., local to, the host machines 702, 708, 716. The FSVMs 704, 712, 720 may store and retrieve block-level data on the host machines 702, 708, 716, e.g., on the local storage 748, 750, 752 of the host machines 702, 708, 716. The block-level data may include block-level representations of the storage items (e.g., files, shares). The network protocol used for communication between user VMs, FSVMs, and CVMs via the network 754 may be Internet Small Computer Systems Interface (iSCSI), Server Message Block (SMB), Network Filesystem (NFS), pNFS (Parallel NFS), or another appropriate protocol.

For the purposes of VFS 732, host machine 716 may be designated as a leader node within a cluster of host machines. In this case, FSVM 720 on host machine 716 may be designated to perform such operations. A leader may be responsible for monitoring or handling requests from FSVMs on other host machines throughout the virtualized environment. If FSVM 720 fails, a new leader may be designated for VFS 732.

In particular embodiments, the user VMs may send data to the VFS 732 (e.g., to the FSVMs) using write requests, and may receive data from it using read requests. The read and write requests, and their associated parameters, data, and results, may be sent between a user VM and one or more file server VMs (FSVMs) located on the same host machine as the user VM or on different host machines from the user VM. The read and write requests may be sent between host machines 702, 708, 716 via network 754, e.g., using a network communication protocol such as iSCSI, CIFS, SMB, TCP, IP, or the like. When a read or write request is sent between two VMs located on the same one of the host machines 702, 708, 716 (e.g., between the user VM 714 and the FSVM 704 located on the host machine 702), the request may be sent using local communication within the host machine 702 instead of via the network 754. As described above, such local communication may be substantially faster than communication via the network 754. The local communication may be performed by, e.g., writing to and reading from shared memory accessible by the user VM 714 and the FSVM 704, sending and receiving data via a local "loopback" network interface, local stream communication, or the like.

In particular embodiments, the storage items stored by the VFS 732, such as files, folders, and/or shares may be distributed amongst the storage pool, and may be accessed and/or managed by multiple FSVMs 704, 712, 720. In particular embodiments, when storage access requests are received from the user VMs, the VFS 732 identifies FSVMs 704, 712, 720 at which requested storage items, e.g., folders, files, or portions thereof, are stored, and directs the user VMs to the locations of the storage items. The FSVMs 704, 712, 720 or another component of the host machines, may maintain a storage map, such as a sharding map, that maps names or identifiers of storage items to their corresponding locations. The storage map may be a distributed data structure of which copies are maintained at each host machine and/or FSVM 704, 712, 720 and accessed using distributed locks or other storage item access operations. Alternatively, the storage map may be maintained by an FSVM at a leader node such as the FSVM 720, and the other FSVMs 704 and 712 may send requests to query and update the storage map to the leader FSVM 720. Other implementations of the storage map are possible using appropriate techniques to provide asynchronous data access to a shared resource by multiple readers and writers. The storage map may map names or identifiers of storage items in the form of text strings or numeric identifiers, such as folder names, files names, and/or identifiers of portions of folders or files (e.g., numeric start offset positions and counts in bytes or other units) to locations of the files, folders, or portions thereof. Locations may be represented as names of FSVMs, e.g., "FSVM-1", as network addresses of host machines on which FSVMs are located (e.g., "ip-addr1" or 128.1.1.10), or as other types of location identifiers.

When a user application executing in a user VM 714 on one of the host machines 702 initiates a storage access operation, such as reading or writing data, the user VM 714 may send the storage access operation in a request to one of the FSVMs 704, 712, 720 on one of the host machines 702, 708, 716. A FSVM 712 executing on a host machine 708 that receives a storage access request may use the storage map to determine whether the requested file or folder is located in the storage pool and/or on the FSVM 712. In some examples, if the requested file or folder is located on the FSVM 712, the FSVM 712 executes the requested storage access operation. Otherwise, the FSVM 712 responds to the request with an indication that the data is not on the FSVM 712, and may redirect the requesting user VM 714 to the FSVM on which the storage map indicates the file or folder is located. The client may cache the address of the FSVM on which the file or folder is located, so that it may send subsequent requests for the file or folder directly to that FSVM.

As an example and not by way of limitation, the location of a file or a folder may be pinned to a particular FSVM 704 by sending a file service operation that creates the file or folder to a CVM 736 and/or hypervisor 742 associated with (e.g., located on the same host machine as) the FSVM 704. The CVM 736 subsequently processes file service commands for that file for the FSVM 704 and sends corresponding storage access operations to storage devices associated with the file. The CVM 736 may associate local storage 748 with the file if there is sufficient free space on local storage 748. Alternatively, the CVM 736 may associate a storage device located on another host machine 702, e.g., in local storage 750, with the file under certain conditions, e.g., if there is insufficient free space on the local storage 748, or if storage access operations between the CVM 736 and the file are expected to be infrequent. Files and folders, or portions thereof, may also be stored on other storage devices, such as the network-attached storage (NAS) network-attached storage 710 or the cloud storage 706 of the storage pool 756.

In particular embodiments, a name service 724, such as that specified by the Domain Name System (DNS) Internet protocol, may communicate with the host machines 702, 708, 716 via the network 754 and may store a database of domain name (e.g., host name) to IP address mappings. The domain names may correspond to FSVMs, e.g., fsvm1.domain.com or ip-addr1.domain.com for an FSVM named FSVM-1. The name service 724 may be queried by the user VMs to determine the IP address of a particular host machine 702, 708, 716 given a name of the host machine, e.g., to determine the IP address of the host name ip-addr1 for the host machine 702. The name service 724 may be located on a separate server computer system or on one or more of the host machines 702, 708, 716. The names and IP addresses of the host machines of the VFS 732, e.g., the host machines 702, 708, 716, may be stored in the name service 724 so that the user VMs may determine the IP address of each of the host machines 702, 708, 716, or FSVMs 704, 712, 720. The name of each VFS instance, e.g., each file system such as FS1, FS2, or the like, may be stored in the name service 724 in association with a set of one or more names that contains the name(s) of the host machines 702, 708, 716 or FSVMs 704, 712, 720 of the VFS instance VFS 732. The FSVMs 704, 712, 720 may be associated with the host names ip-addr1, ip-addr2, and ip-addr3, respectively. For example, the file server instance name FS1.domain.com may be associated with the host names ip-addr1, ip-addr2, and ip-addr3 in the name service 724, so that a query of the name service 724 for the server instance name "FS1" or "FS1.domain.com" returns the names ip-addr1, ip-addr2, and ip-addr3. As another example, the file server instance name FS1.domain.com may be associated with the host names fsvm-1, fsvm-2, and fsvm-3. Further, the name service 724 may return the names in a different order for each name lookup request, e.g., using round-robin ordering, so that the sequence of names (or addresses) returned by the name service for a file server instance name is a different permutation for each query until all the permutations have been returned in response to requests, at which point the permutation cycle starts again, e.g., with the first permutation. In this way, storage access requests from user VMs may be balanced across the host machines, since the user VMs submit requests to the name service 724 for the address of the VFS instance for storage items for which the user VMs do not have a record or cache entry, as described below.

In particular embodiments, each FSVM may have two IP addresses: an external IP address and an internal IP address. The external IP addresses may be used by SMB/CIFS clients, such as user VMs, to connect to the FSVMs. The external IP addresses may be stored in the name service 724. The IP addresses ip-addr1, ip-addr2, and ip-addr3 described above are examples of external IP addresses. The internal IP addresses may be used for iSCSI communication to CVMs and/or hypervisors, e.g., between the FSVMs 704, 712, 720 and the CVMs 736, 744, 740 and/or hypervisors 742, 744, and/or 746. Other internal communications may be sent via the internal IP addresses as well, e.g., file server configuration information may be sent from the CVMs to the FSVMs using the internal IP addresses, and the CVMs may get file server statistics from the FSVMs via internal communication as needed.

Since the VFS 732 is provided by a distributed set of FSVMs 704, 712, 720, the user VMs that access particular requested storage items, such as files or folders, do not necessarily know the locations of the requested storage items when the request is received. A distributed file system protocol, e.g., MICROSOFT DFS or the like, may therefore be used, in which a user VM 714 may request the addresses of FSVMs 704, 712, 720 from a name service 724 (e.g., DNS). The name service 724 may send one or more network addresses of FSVMs 704, 712, 720 to the user VM 714, in an order that changes for each subsequent request. These network addresses are not necessarily the addresses of the FSVM 712 on which the storage item requested by the user VM 714 is located, since the name service 724 does not necessarily have information about the mapping between storage items and FSVMs 704, 712, 720. Next, the user VM 714 may send an access request to one of the network addresses provided by the name service, e.g., the address of FSVM 712. The FSVM 712 may receive the access request and determine whether the storage item identified by the request is located on the FSVM 712. If so, the FSVM 712 may process the request and send the results to the requesting user VM 714. However, if the identified storage item is located on a different FSVM 720, then the FSVM 712 may redirect the user VM 714 to the FSVM 720 on which the requested storage item is located by sending a "redirect" response referencing FSVM 720 to the user VM 714. The user VM 714 may then send the access request to FSVM 720, which may perform the requested operation for the identified storage item.

A particular virtualized file server, such as VFS 732, including the items it stores, e.g., files and folders, may be referred to herein as a VFS "instance" and/or a file system and may have an associated name, e.g., FS1, as described above. Although a VFS instance may have multiple FSVMs distributed across different host machines, with different files being stored on FSVMs, the VFS instance may present a single name space to its clients such as the user VMs. The single name space may include, for example, one or more named "shares" and each share may have an associated folder hierarchy in which files are stored. Storage items such as files and folders may have associated names and metadata such as permissions, access control information, size quota limits, file types, files sizes, and so on. As another example, the name space may be a single folder hierarchy, e.g., a single root directory that contains files and other folders. User VMs may access the data stored on a distributed VFS instance via storage access operations, such as operations to list folders and files in a specified folder, create a new file or folder, open an existing file for reading or writing, and read data from or write data to a file, as well as storage item manipulation operations to rename, delete, copy, or get details, such as metadata, of files or folders. Note that folders may also be referred to herein as "directories."

In particular embodiments, storage items such as files and folders in a file server namespace may be accessed by clients such as user VMs by name, e.g., "\Folder-1\File-1" and "\Folder-2\File-2" for two different files named File-1 and File-2 in the folders Folder-1 and Folder-2, respectively (where Folder-1 and Folder-2 are sub-folders of the root folder). Names that identify files in the namespace using folder names and file names may be referred to as "path names." Client systems may access the storage items stored on the VFS instance by specifying the file names or path names, e.g., the path name "\Folder-1\File-1", in storage access operations. If the storage items are stored on a share (e.g., a shared drive), then the share name may be used to access the storage items, e.g., via the path name "\Share-1\Folder-1\File-1" to access File-1 in folder Folder-1 on a share named Share-1.

In particular embodiments, although the VFS instance may store different folders, files, or portions thereof at different locations, e.g., on or associated with different FSVMs, the use of different FSVMs or other elements of storage pool 756 to store the folders and files may be hidden from the accessing clients. The share name is not necessarily a name of a location such as an FSVM or host machine. For example, the name Share-1 does not identify a particular FSVM on which or associated with the location of storage items of the share. The share Share-1 may have portions of storage items stored on three host machines, but a user may simply access Share-1, e.g., by mapping Share-1 to a client computer, to gain access to the storage items on Share-1 as if they were located on the client computer. Names of storage items, such as file names and folder names, are similarly location-independent. Thus, although storage items, such as files and their containing folders and shares, may be stored at different locations, such as different host machines, the files may be accessed in a location-transparent manner by clients (such as the user VMs). Thus, users at client systems need not specify or know the locations of each storage item being accessed. The VFS may automatically map the file names, folder names, or full path names to the locations at which the storage items are stored. As an example and not by way of limitation, a storage item's location may be specified by the name, address, or identity of the FSVM that provides access to the storage item on the host machine on which the storage item is located. A storage item such as a file may be divided into multiple parts that may be located on different FSVMs, in which case access requests for a particular portion of the file may be automatically mapped to the location of the portion of the file based on the portion of the file being accessed (e.g., the offset from the beginning of the file and the number of bytes being accessed).

In particular embodiments, VFS 732 determines the location, e.g., FSVM and/or location in the storage pool, at which to store a storage item when the storage item is created. For example, a FSVM 704 may attempt to create a file or folder using a CVM 736 on the same host machine 702 as the user VM 718 that requested creation of the file, so that the CVM 736 that controls access operations to the file folder is co-located with the user VM 718. In this way, since the user VM 718 is known to be associated with the file or folder and is thus likely to access the file again, e.g., in the near future or on behalf of the same user, access operations may use local communication or short-distance communication to improve performance, e.g., by reducing access times or increasing access throughput. If there is a local CVM on the same host machine as the FSVM, the FSVM may identify it and use it by default. If there is no local CVM on the same host machine as the FSVM, a delay may be incurred for communication between the FSVM and a CVM on a different host machine. Further, the VFS 732 may also attempt to store the file on a storage device that is local to the CVM being used to create the file, such as local storage, so that storage access operations between the CVM and local storage may use local or short-distance communication.

In particular embodiments, if a CVM is unable to store the storage item in local storage of a host machine on which an FSVM resides, e.g., because local storage does not have sufficient available free space, then the file may be stored in local storage of a different host machine. In this case, the stored file is not physically local to the host machine, but storage access operations for the file are performed by the locally-associated CVM and FSVM, and the CVM may communicate with local storage on the remote host machine using a network file sharing protocol, e.g., iSCSI, SAMBA, or the like.

In particular embodiments, if a virtual machine, such as a user VM 714, CVM 736, or FSVM 704, moves from a host machine 702 to a destination host machine 708, e.g., because of resource availability changes, and data items such as files or folders associated with the VM are not locally accessible on the destination host machine 708, then data migration may be performed for the data items associated with the moved VM to migrate them to the new host machine 708, so that they are local to the moved VM on the new host machine 708. FSVMs may detect removal and addition of CVMs (as may occur, for example, when a CVM fails or is shut down) via the iSCSI protocol or other technique, such as heartbeat messages. As another example, a FSVM may determine that a particular file's location is to be changed, e.g., because a disk on which the file is stored is becoming full, because changing the file's location is likely to reduce network communication delays and therefore improve performance, or for other reasons. Upon determining that a file is to be moved, VFS 732 may change the location of the file by, for example, copying the file from its existing location(s), such as local storage 748 of a host machine 702, to its new location(s), such as local storage 750 of host machine 708 (and to or from other host machines, such as local storage 752 of host machine 716 if appropriate), and deleting the file from its existing location(s). Write operations on the file may be blocked or queued while the file is being copied, so that the copy is consistent. The VFS 732 may also redirect storage access requests for the file from an FSVM at the file's existing location to a FSVM at the file's new location.

In particular embodiments, VFS 732 includes at least three File Server Virtual Machines (FSVMs) 704, 712, 720 located on three respective host machines 702, 708, 716. To provide high-availability, there may be a maximum of one FSVM for a particular VFS instance VFS 732 per host machine in a cluster. If two FSVMs are detected on a single host machine, then one of the FSVMs may be moved to another host machine automatically, or the user (e.g., system administrator and/or file server manager) may be notified to move the FSVM to another host machine. The user and/or file server manager may move a FSVM to another host machine using an administrative interface that provides commands for starting, stopping, and moving FSVMs between host machines.

In particular embodiments, two FSVMs of different VFS instances may reside on the same host machine. If the host machine fails, the FSVMs on the host machine become unavailable, at least until the host machine recovers. Thus, if there is at most one FSVM for each VFS instance on each host machine, then at most one of the FSVMs may be lost per VFS per failed host machine. As an example, if more than one FSVM for a particular VFS instance were to reside on a host machine, and the VFS instance includes three host machines and three FSVMs, then loss of one host machine would result in loss of two-thirds of the FSVMs for the VFS instance, which would be more disruptive and more difficult to recover from than loss of one-third of the FSVMs for the VFS instance.

In particular embodiments, users, such as system administrators or other users of the user VMs, may expand the cluster of FSVMs by adding additional FSVMs. Each FSVM may be associated with at least one network address, such as an IP (Internet Protocol) address of the host machine on which the FSVM resides. There may be multiple clusters, and all FSVMs of a particular VFS instance are ordinarily in the same cluster. The VFS instance may be a member of a MICROSOFT ACTIVE DIRECTORY domain, which may provide authentication and other services such as name service.

Figure 2:
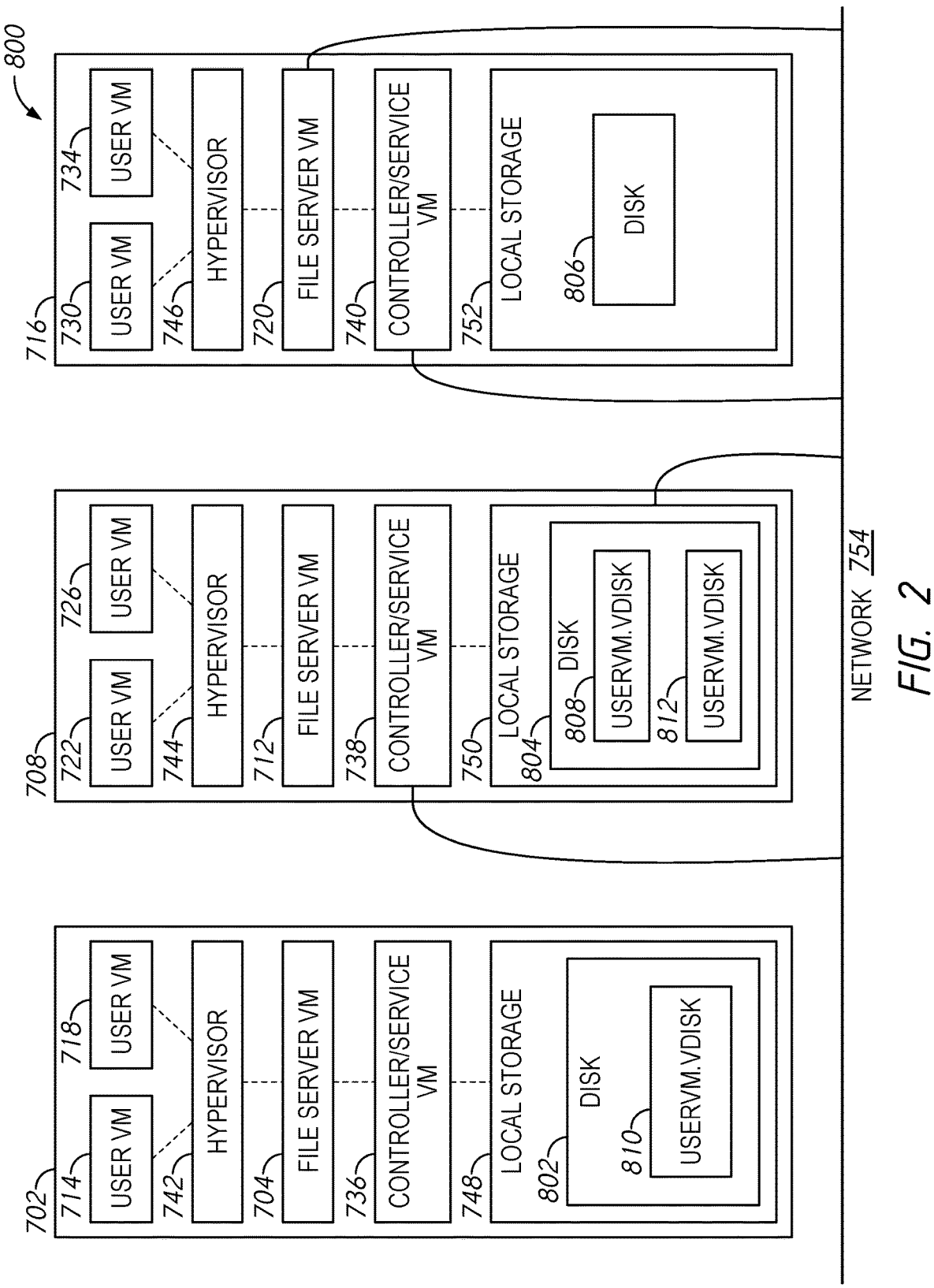
FIG. 2 is a schematic illustration of a clustered virtualization environment 800 arranged in accordance with examples described herein.

FIG. 2 illustrates data flow within a clustered virtualization environment 800 implementing a VFS instance (e.g., VFS 732) in which stored items such as files and folders used by user VMs are stored locally on the same host machines as the user VMs according to particular embodiments. As described above, one or more user VMs and a Controller/Service VM and/or hypervisor may run on each host machine. In some examples, controller/service VMs may not be used, and the hypervisor and/or a container may perform the functions described with reference to controller/service VMs. In some examples, containers may be used instead of or in addition to VMs. As a user VM processes I/O commands (e.g., a read or write operation), the I/O commands may be sent to the hypervisor on the same server or host machine as the user VM. For example, the hypervisor may present to the user VMs a VF S instance, receive an I/O command, and facilitate the performance of the I/O command by passing the command to a FSVM that performs the operation specified by the command. The VFS may facilitate I/O operations between a user VM and a virtualized file system. The virtualized file system may appear to the user VM as a namespace of mappable shared drives or mountable network file systems of files and directories. The namespace of the virtualized file system may be implemented using storage devices in the local storage, such as disks, onto which the shared drives or network file systems, files, and folders, or portions thereof, may be distributed as determined by the FSVMs. The VFS may thus provide features disclosed herein, such as efficient use of the disks, high availability, scalability, and others. The implementation of these features may be transparent to the user VMs. The FSVMs may present the storage capacity of the disks of the host machines as an efficient, highly-available, and scalable namespace in which the user VMs may create and access shares, files, folders, and the like.

As an example, a network share may be presented to a user VM as one or more discrete virtual disks, but each virtual disk may correspond to any part of one or more virtual or physical disks within a storage pool. Additionally or alternatively, the FSVMs may present a VFS either to the hypervisor or to user VMs of a host machine to facilitate I/O operations. The FSVMs may access the local storage via Controller/Service VMs, other storage controllers, hypervisors, or other components of the host machine. As described herein, a CVM 736 may have the ability to perform I/O operations using local storage 748 within the same host machine 702 by connecting via the network 754 to cloud storage or NAS, or by connecting via the network 754 to 750, 752 within another host machine 708, 716 (e.g., by connecting to another CVM 738, 740).

In particular embodiments, each user VM may access one or more virtual disk images stored on one or more disks of the local storage, the cloud storage, and/or the NAS. The virtual disk images may contain data used by the user VMs, such as operating system images, application software, and user data, e.g., user home folders and user profile folders.

For example, FIG. 2 illustrates three virtual machine images 810, 808, 812. The virtual machine image 810 may be a file named UserVM.vmdisk (or the like) stored on disk 802 of local storage 748 of host machine 702. The virtual machine image 810 may store the contents of the user VM 714's hard drive. The disk 802 on which the virtual machine image 810 is "local to" the user VM 714 on host machine 702 because the disk 802 is in local storage 748 of the host machine 702 on which the user VM 714 is located. Thus, the user VM 714 may use local (intra-host machine) communication to access the virtual machine image 810 more efficiently, e.g., with less latency and higher throughput, than would be the case if the virtual machine image 810 were stored on disk 804 of local storage 750 of a different host machine 708, because inter-host machine communication across the network 754 would be used in the latter case. Similarly, a virtual machine image 808, which may be a file named UserVM.vmdisk (or the like), is stored on disk 804 of local storage 750 of host machine 708, and the image 808 is local to the user VM 722 located on host machine 708. Thus, the user VM 722 may access the virtual machine image 808 more efficiently than the virtual machine 718 on host machine 702, for example. In another example, the CVM 740 may be located on the same host machine 716 as the user VM 730 that accesses a virtual machine image 812 (UserVM.vmdisk) of the user VM 730, with the virtual machine image file 812 being stored on a different host machine 708 than the user VM 730 and the CVM 740. In this example, communication between the user VM 730 and the CVM 740 may still be local, e.g., more efficient than communication between the user VM 730 and a CVM 738 on a different host machine 708, but communication between the CVM 740 and the disk 804 on which the virtual machine image 812 is stored is via the network 754, as shown by the dashed lines between CVM 740 and the network 754 and between the network 754 and local storage 750. The communication between CVM 740 and the disk 804 is not local, and thus may be less efficient than local communication such as may occur between the CVM 740 and a disk 806 in local storage 752 of host machine 716. Further, a user VM 730 on host machine 716 may access data such as the virtual disk image 812 stored on a remote (e.g., non-local) disk 804 via network communication with a CVM 738 located on the remote host machine 708. This case may occur if CVM 740 is not present on host machine 716, e.g., because CVM 740 has failed, or if the FSVM 720 has been configured to communicate with 750 on host machine 708 via the CVM 738 on host machine 708, e.g., to reduce computational load on host machine 716.

In particular embodiments, since local communication is expected to be more efficient than remote communication, the FSVMs may store and/or be associated with storage items, such as files or folders, e.g., the virtual disk images, as block-level data on local storage of the host machine on which the user VM that is expected to access the files is located. A user VM may be expected to access particular storage items if, for example, the storage items are associated with the user VM, such as by configuration information. For example, the virtual disk image 810 may be associated with the user VM 714 by configuration information of the user VM 714. Storage items may also be associated with a user VM via the identity of a user of the user VM. For example, files and folders owned by the same user ID as the user who is logged into the user VM 714 may be associated with the user VM 714. If the storage items expected to be accessed by a user VM 714 are not stored on the same host machine 702 as the user VM 714, e.g., because of insufficient available storage capacity in local storage 748 of the host machine 702, or because the storage items are expected to be accessed to a greater degree (e.g., more frequently or by more users) by a user VM 722 on a different host machine 708, then the user VM 714 may still communicate with a local CVM 736 to access the storage items located on the remote host machine 708, and the local CVM 736 may communicate with local storage 750 on the remote host machine 708 to access the storage items located on the remote host machine 708. If the user VM 714 on a host machine 702 does not or cannot use a local CVM 736 to access the storage items located on the remote host machine 708, e.g., because the local CVM 736 has crashed or the user VM 714 has been configured to use a remote CVM 738, then communication between the user VM 714 and local storage 750 on which the storage items are stored may be via a remote CVM 738 using the network 754, and the remote CVM 738 may access local storage 750 using local communication on host machine 708. As another example, a user VM 714 on a host machine 702 may access storage items located on a disk 806 of local storage 752 on another host machine 716 via a CVM 738 on an intermediary host machine 708 using network communication between the host machines 702 and 708 and between the host machines 708 and 716.

Figure 3:
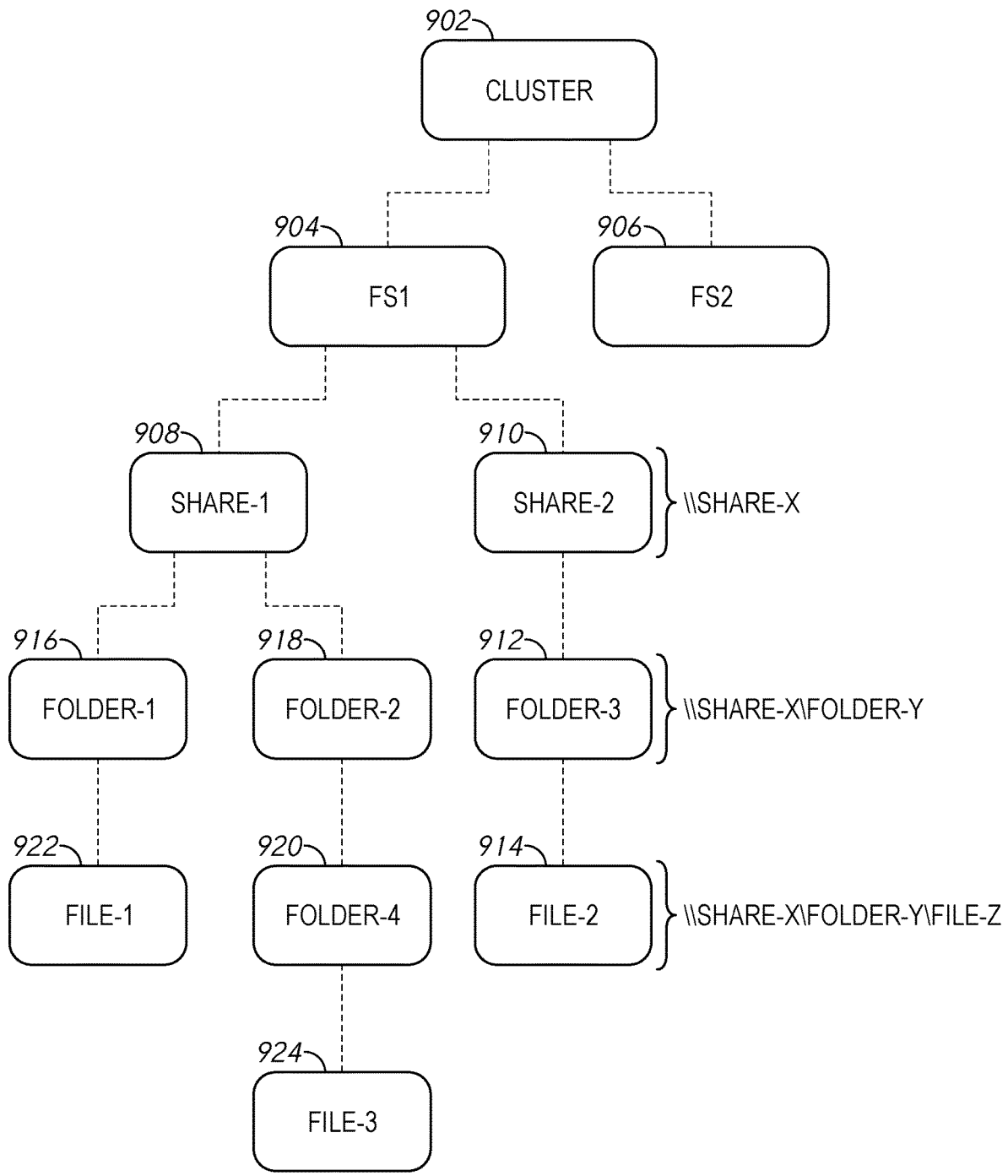
FIG. 3 illustrates an example hierarchical structure of a VFS instance in a cluster according to particular embodiments.

FIG. 3 illustrates an example hierarchical structure of a VFS instance (e.g., a file system) in a cluster (such as a virtualized file server) according to particular embodiments. A Cluster 902 contains two VFS instances, FS1 904 and FS2 906. For example, the cluster 902 may be used to implement and/or may be implemented by any virtualized file server described herein. Each VFS instance as shown in FIG. 3 may be identified by a name such as "\\instance", e.g., "\\FS1" for WINDOWS file systems, or a name such as "instance", e.g., "FS1" for UNIX-type file systems. The VFS instance FS1 904 contains shares, including Share-1 908 and Share-2 910. Shares may have names such as "Users" for a share that stores user home directories, or the like. Each share may have a path name such as \\FS1\Share-1 or \\FS1\Users. As an example and not by way of limitation, a share may correspond to a disk partition or a pool of file system blocks on WINDOWS and UNIX-type file systems. As another example and not by way of limitation, a share may correspond to a folder or directory on a VFS instance. Shares may appear in the file system instance as folders or directories to users of user VMs. Share-1 908 includes two folders, Folder-1 916, and Folder-2 918, and may also include one or more files (e.g., files not in folders). Each folder 916, 918 may include one or more files 922, 924. Share-2 910 includes a folder Folder-3 912, which includes a file File-2 914. Each folder has a folder name such as "Folder-1", "Users", or "Sam" and a path name such as "\\FS1\Share-1\Folder-1" (WINDOWS) or "share-1:/fs1/Users/Sam" (UNIX). Similarly, each file has a file name such as "File-1" or "Forecast.xls" and a path name such as "\\FS1\Share-1\Folder-1\File-1" or "share-1:/fs1/Users/Sam/Forecast.xls".

Figure 4:
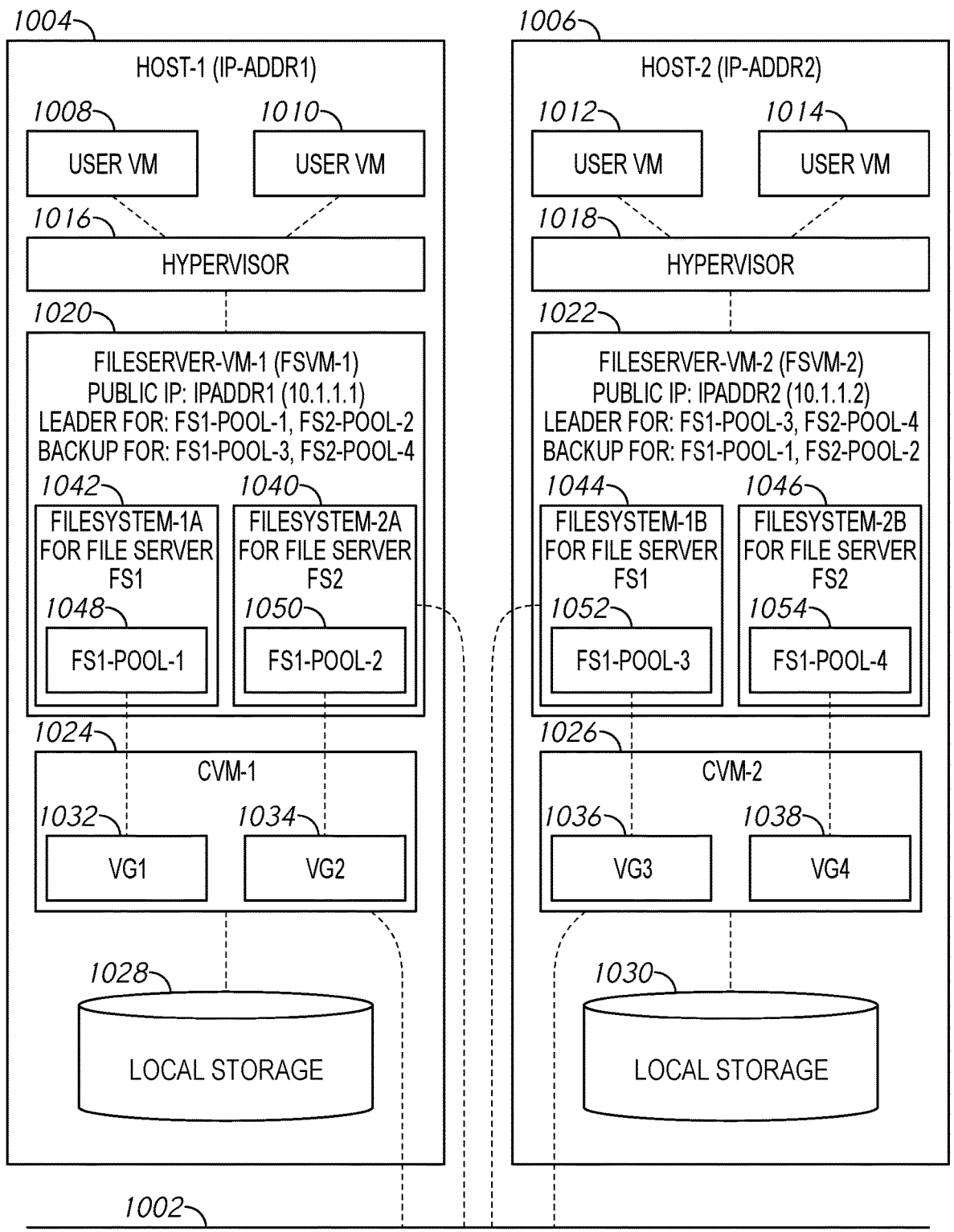
FIG. 4 illustrates two example host machines, each providing file storage services for portions of two VFS instances FS1 and FS2 according to particular embodiments.

FIG. 4 illustrates two example host machines 1004 and 1006, each providing file storage services for portions of two VFS instances FS1 and FS2 according to particular embodiments. The first host machine, Host-1 702, includes two user VMs 1008, 1010, a Hypervisor 1016, a FSVM named FileServer-VM-1 (abbreviated FSVM-1) 1020, a Controller/Service VM named CVM-1 1024, and local storage 1028. Host-1's FileServer-VM-1 1020 has an IP (Internet Protocol) network address of 10.1.1.1, which is an address of a network interface on Host-1 1004. Host-1 has a hostname ip-addr1, which may correspond to Host-1's IP address 10.1.1.1. The second host machine, Host-2 1006, includes two user VMs 1012, 1014, a Hypervisor 1018, a File Server VM named FileServer-VM-2 (abbreviated FSVM-2) 1022, a Controller/Service VM named CVM-2 1026, and local storage 1030. Host-2's FileServer-VM-2 1022 has an IP network address of 10.1.1.2, which is an address of a network interface on Host-2 1006.

In particular embodiments, file systems FileSystem-1A 1042 and FileSystem-2A 1040 implement the structure of files and folders for portions of the FS1 and FS2 file server instances, respectively, that are located on (e.g., served by) FileServer-VM-1 1020 on Host-1 1004. Other file systems on other host machines may implement other portions of the FS1 and FS2 file server instances. The file systems 1042 and 1040 may implement the structure of at least a portion of a file server instance by translating file system operations, such as opening a file, writing data to or reading data from the file, deleting a file, and so on, to disk I/O operations such as seeking to a portion of the disk, reading or writing an index of file information, writing data to or reading data from blocks of the disk, allocating or de-allocating the blocks, and so on. The file systems 1042, 1040 may thus store their file system data, including the structure of the folder and file hierarchy, the names of the storage items (e.g., folders and files), and the contents of the storage items on one or more storage devices, such as local storage 1028. The particular storage device or devices on which the file system data for each file system are stored may be specified by an associated file system pool (e.g., 1048 and 1050). For example, the storage device(s) on which data for FileSystem-1A 1042 and FileSystem-2A, 1040 are stored may be specified by respective file system pools FS1-Pool-1 1048 and FS2-Pool-2 1050. The storage devices for the pool may be selected from volume groups provided by CVM-1 1024 or other component of a host machine, such as volume group VG1 1032 and volume group VG2 1034. Each volume group 1032, 1034 may include a group of one or more available storage devices that are present in local storage 1028 associated with (e.g., by iSCSI communication) the CVM-1 1024. The CVM-1 1024 may be associated with a local storage 1028 on the same host machine 702 as the CVM-1 1024, or with a local storage 1030 on a different host machine 1006. The CVM-1 1024 may also be associated with other types of storage, such as cloud storage, networked storage or the like. Although the examples described herein include particular host machines, virtual machines, file servers, file server instances, file server pools, CVMs, volume groups, and associations there between, any number of host machines, virtual machines, file servers, file server instances, file server pools, CVMs, volume groups, and any associations there between are possible and contemplated.

In particular embodiments, the file system pool 1048 may associate any storage device in one of the volume groups 1032, 1034 of storage devices that are available in local storage 1028 with the file system FileSystem-1A 1042. For example, the file system pool FS1-Pool-1 1048 may specify that a disk device named hd1 in the volume group VG1 1032 of local storage 1028 is a storage device for FileSystem-1A 1042 for file server FS1 on or associated with FSVM-1 1020. A file system pool FS2-Pool-2 1050 may specify a storage device FileSystem-2A 1050 for file server FS2 on FSVM-1 1020. The storage device for FileSystem-2A 1040 may be, e.g., the disk device hd1, or a different device in one of the volume groups 1032, 1034, such as a disk device named hd2 in volume group VG2 1034. Each of the file systems FileSystem-1A 1042, FileSystem-2A 1040 may be, e.g., an instance of the NTFS file system used by the WINDOWS operating system, of the UFS Unix file system, or the like. The term "file system" may also be used herein to refer to an instance of a type of file system, e.g., a particular structure of folders and files with particular names and content.

In one example, referring to FIG. 3 and FIG. 4, an FS1 hierarchy rooted at File Server FS1 904 may be located on (e.g., associated with) FileServer-VM-1 1020 and stored in file system instance FileSystem-1A 1042. That is, the file system instance FileSystem-1A 1042 may store the names of the shares and storage items (such as folders and files), as well as the contents of the storage items, shown in the hierarchy at and below File Server FS1 904. A portion of the FS1 hierarchy shown in FIG. 3, such the portion rooted at Folder-2 918, may be located on and/or associated with FileServer-VM-2 1022 on Host-2 1006 instead of File-Server-VM-1 1020, in which case the file system instance FileSystem-1B 1044 may store the portion of the FS1 hierarchy rooted at Folder-2 918, including Folder-3 912, Folder-4 920 and File-3 924. Similarly, an FS2 hierarchy rooted at File Server FS2 906 in FIG. 3 may be located on FileServer-VM-1 1020 and stored in file system instance FileSystem-2A 1040. The FS2 hierarchy may be split into multiple portions (not shown), such that one portion is located on FileServer-VM-1 1020 on Host-1 1004, and another portion is located on FileServer-VM-2 1022 on Host-2 1006 and stored in file system instance FileSystem-2B 1046.

In particular embodiments, FileServer-VM-1 (abbreviated FSVM-1) 1020 on Host-1 1004 is a leader for a portion of file server instance FS1 and a portion of FS2, and is a backup for another portion of FS1 and another portion of FS2. The portion of FS1 for which FileServer-VM-1 1020 is a leader corresponds to a storage pool labeled FS1-Pool-1 1048. FileServer-VM-1 is also a leader for FS2-Pool-2 1050, and is a backup (e.g., is prepared to become a leader upon request, such as in response to a failure of another FSVM) for FS1-Pool-3 1052 and FS2-Pool-4 1054 on Host-2 1006. In particular embodiments, FileServer-VM-2 (abbreviated FSVM-2) 1022 is a leader for a portion of file server instance FS1 and a portion of FS2, and is a backup for another portion of FS1 and another portion of FS2. The portion of FS1 for which FSVM-2 1022 is a leader corresponds to a storage pool labeled FS1-Pool-3 1052. FSVM-2 1022 is also a leader for FS2-Pool-4 1054, and is a backup for FS1-Pool-1 1048 and FS2-Pool-2 1050 on Host-1 1004.

In particular embodiments, the file server instances FS1, FS2 provided by the FSVMs 1020 and 1022 may be accessed by user VMs 1008, 1010, 1012 and 1014 via a network file system protocol such as SMB, CIFS, NFS, or the like. Each FSVM 1020 and 1022 may provide what appears to client applications on user VMs 1008, 1010, 1012 and 1014 to be a single file system instance, e.g., a single namespace of shares, files and folders, for each file server instance. However, the shares, files, and folders in a file server instance such as FS1 may actually be distributed across multiple FSVMs 1020 and 1022. For example, different folders in the same file server instance may be associated with different corresponding FSVMs 1020 and 1022 and CVMs 1024 and 1026 on different host machines 1004 and 1006. In other example, all FSVMs may be associated with the entire storage pool in some examples.

The example file server instance FS1 904 shown in FIG. 3 has two shares, Share-1 908 and Share-2 910. Share-1 908 may be located on FSVM-1 1020, CVM-1 1024, and local storage 1028. Network file system protocol requests from user VMs to read or write data on file server instance FS1 904 and any share, folder, or file in the instance may be sent to FSVM-1 1020. FSVM-1 1020 (or another component, such as a hypervisor in some examples) may determine whether the requested data, e.g., the share, folder, file, or a portion thereof, referenced in the request, is located on FSVM-1, and FSVM-1 is a leader for the requested data. If not, FSVM-1 may respond to the requesting User-VM with an indication that the requested data is not covered by (e.g., is not located on or served by) FSVM-1. Otherwise, the requested data is covered by (e.g., is located on or served by) FSVM-1, so FSVM-1 may send iSCSI protocol requests to a CVM that is associated with the requested data. Note that the CVM associated with the requested data may be the CVM-1 1024 on the same host machine 702 as the FSVM-1, or a different CVM on a different host machine 1006, depending on the configuration of the VFS. In this example, the requested Share-1 is located on FSVM-1, so FSVM-1 processes the request. To provide for path availability, multipath I/O (MPIO) may be used for communication with the FSVM, e.g., for communication between FSVM-1 and CVM-1. The active path may be set to the CVM that is local to the FSVM (e.g., on the same host machine) by default. The active path may be set to a remote CVM instead of the local CVM, e.g., when a failover occurs.

Continuing with the data request example, the associated CVM is CVM 1024, which may in turn access the storage device associated with the requested data as specified in the request, e.g., to write specified data to the storage device or read requested data from a specified location on the storage device. In this example, the associated storage device is in local storage 1028, and may be an HDD or SSD. CVM-1 1024 may access the HDD or SSD via an appropriate protocol, e.g., iSCSI, SCSI, SATA, or the like. CVM 110*a* may send the results of accessing local storage 1028, e.g., data that has been read, or the status of a data write operation, to CVM 1024 via, e.g., SATA, which may in turn send the results to FSVM-1 1020 via, e.g., iSCSI. FSVM-1 1020 may then send the results to user VM via SMB through the Hypervisor 1016.

Share-2 910 may be located on FSVM-2 1022, on Host-2. Network file service protocol requests from user VMs to read or write data on Share-2 may be directed to FSVM-2 1022 on Host-2 by other FSVMs. Alternatively, user VMs may send such requests directly to FSVM-2 1022 on Host-2, which may process the requests using CVM-2 1026 and local storage 1030 on Host-2 as described above for FSVM-1 1020 on Host-1.

A file server instance such as FS1 904 in FIG. 3 may appear as a single file system instance (e.g., a single namespace of folders and files that are accessible by their names or pathnames without regard for their physical locations), even though portions of the file system are stored on different host machines. Since each FSVM may provide a portion of a file server instance, each FSVM may have one or more "local" file systems that provide the portion of the file server instance (e.g., the portion of the namespace of files and folders) associated with the FSVM.

Figure 5:
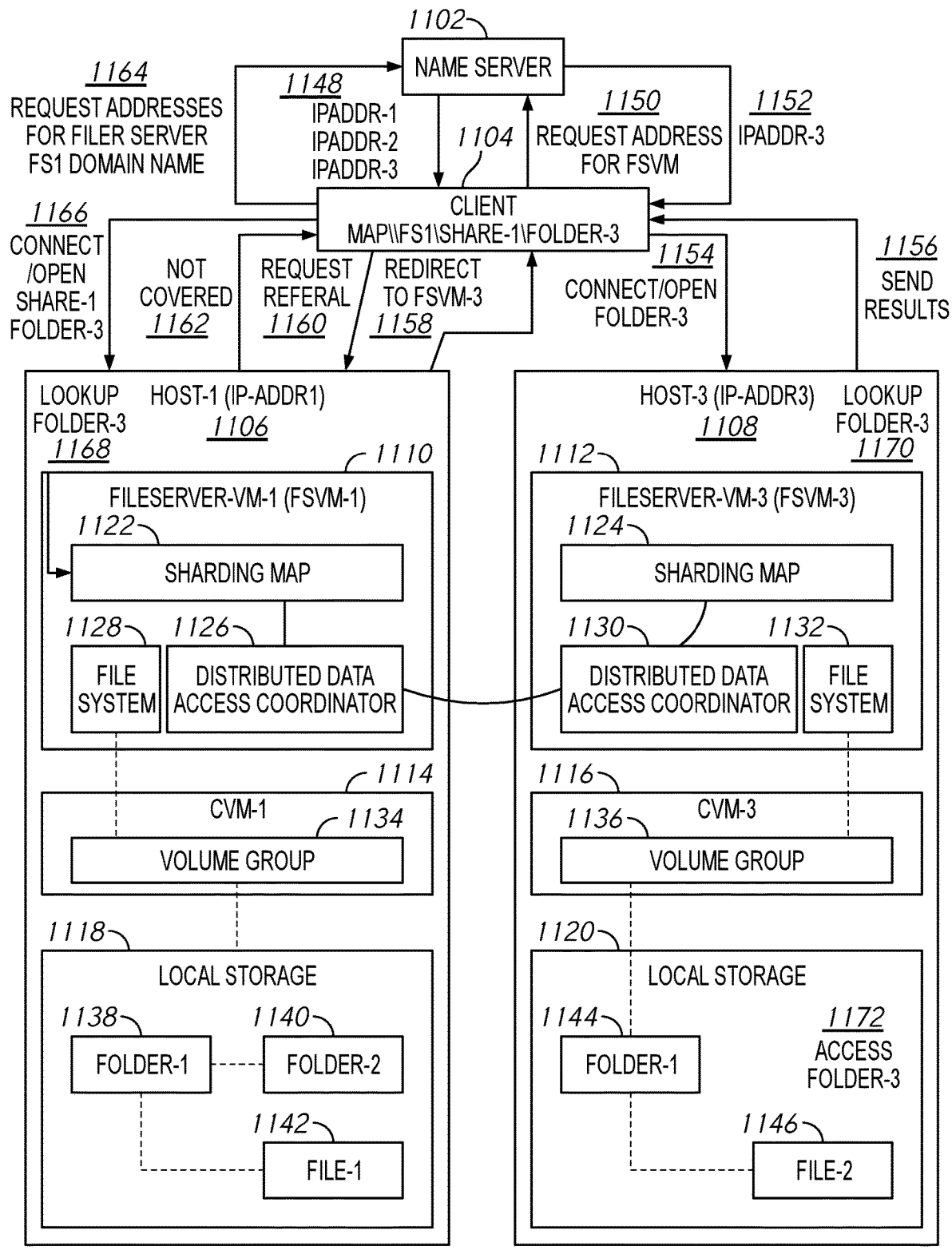
FIG. 5 illustrates example interactions between a client and host machines on which different portions of a VFS instance are stored according to particular embodiments.

FIG. 5 illustrates example interactions between a client 1104 and host machines 1106 and 1108 on which different portions of a VFS instance are stored according to particular embodiments. A client 1104, e.g., an application program executing in one of the user VMs and on the host machines of a virtualized file server described herein requests access to a folder \\FS1.domain.name\Share-1\Folder-3. The request may be in response to an attempt to map \\FS1.domain.name\Share-1 to a network drive in the operating system executing in the user VM followed by an attempt to access the contents of Share-1 or to access the contents of Folder-3, such as listing the files in Folder-3.

FIG. 5 shows interactions that occur between the client 1104, FSVMs 1110 and 1112 on host machines 1106 and 1108, and a name server 1102 when a storage item is mapped or otherwise accessed. The name server 1102 may be provided by a server computer system, such as one or more of the host machines 1106, 1108 or a server computer system separate from the host machines 1106, 1108. In one example, the name server 1102 may be provided by an ACTIVE DIRECTORY service executing on one or more computer systems and accessible via the network. The interactions are shown as arrows that represent communications, e.g., messages sent via the network. Note that the client 1104 may be executing in a user VM, which may be co-located with one of the FSVMs 1110 and 1112. In such a co-located case, the arrows between the client 1104 and the host machine on which the FSVM is located may represent communication within the host machine, and such intra-host machine communication may be performed using a mechanism different from communication over the network, e.g., shared memory or inter process communication.

In particular embodiments, when the client 1104 requests access to Folder-3, a VFS client component executing in the user VM may use a distributed file system protocol such as MICROSOFT DFS, or the like, to send the storage access request to one or more of the FSVMs. To access the requested file or folder, the client determines the location of the requested file or folder, e.g., the identity and/or network address of the FSVM on which the file or folder is located. The client may query a domain cache of FSVM network addresses that the client has previously identified (e.g., looked up). If the domain cache contains the network address of an FSVM associated with the requested folder name \\FS1.domain.name\Share-1\Folder-3, then the client retrieves the associated network address from the domain cache and sends the access request to the network address, starting at step 1164 in some examples.

In particular embodiments, at step 1164, the client may send a request for a list of addresses of FSVMs to a name server 1102. The name server 1102 may be, e.g., a DNS server or other type of server, such as a MICROSOFT domain controller (not shown), that has a database of FSVM addresses. At step 1148, the name server 1102 may send a reply that contains a list of FSVM network addresses, e.g., ip-addr1, ip-addr2, and ip-addr3, which correspond to the FSVMs in this example. At step 1166, the client 1104 may send an access request to one of the network addresses, e.g., the first network address in the list (ip-addr1 in this example), requesting the contents of Folder-3 of Share-1. By selecting the first network address in the list, the particular FSVM to which the access request is sent may be varied, e.g., in a round-robin manner by enabling round-robin DNS (or the like) on the name server 1102. The access request may be, e.g., an SMB connect request, an NFS open request, and/or appropriate request(s) to traverse the hierarchy of Share-1 to reach the desired folder or file, e.g., Folder-3 in this example.

At step 1168, FileServer-VM-1 1110 may process the request received at step 1166 by searching a mapping or lookup table, such as a sharding map 1122, for the desired folder or file. The map 1122 maps stored objects, such as shares, folders, or files, to their corresponding locations, e.g., the names or addresses of FSVMs. The map 1122 may have the same contents on each host machine, with the contents on different host machines being synchronized using a distributed data store as described below. For example, the map 1122 may contain entries that map Share-1 and Folder-1 to the File Server FSVM-1 1110, and Folder-3 to the File Server FSVM-3 1112. An example map is shown in Table 1 below. While the example of FIG. 5 is depicted and described with respect to the FSVM processing the request, in some examples, one or more other components of a virtualized system may additionally or instead process the request (e.g., a CVM and/or a hypervisor).

| Stored Object | Location |
|---|---|
| Folder-1 | FSVM-1 |
| Folder-2 | FSVM-1 |
| File-1 | FSVM-1 |
| Folder-3 | FSVM-3 |
| File-2 | FSVM-3 |

In particular embodiments, the map 1122 or 1124 may be accessible on each of the host machines. The maps may be copies of a distributed data structure that are maintained and accessed at each FSVM using a distributed data access coordinator 1126 and 1130. The distributed data access coordinator 1126 and 1130 may be implemented based on distributed locks or other storage item access operations. Alternatively, the distributed data access coordinator 1126 and 1130 may be implemented by maintaining a master copy of the maps 1122 and 1124 at a leader node such as the host machine 1108, and using distributed locks to access the master copy from each FSVM 1110 and 1112. The distributed data access coordinator 1126 and 1130 may be implemented using distributed locking, leader election, or related features provided by a centralized coordination service for maintaining configuration information, naming, providing distributed synchronization, and/or providing group services (e.g., APACHE ZOOKEEPER or other distributed coordination software). Since the map 1122 indicates that Folder-3 is located at FSVM-3 1112 on Host-3 1108, the lookup operation at step 1168 determines that Folder-3 is not located at FSVM-1 on Host-1 1106. Thus, at step 1162 the FSVM-1 1110 (or other component of the virtualized system) sends a response, e.g., a "Not Covered" DFS response, to the client 1104 indicating that the requested folder is not located at FSVM-1. At step 1160, the client 1104 sends a request to FSVM-1 for a referral to the FSVM on which Folder-3 is located. FSVM-1 uses the map 1122 to determine that Folder-3 is located at FSVM-3 on Host-3 1108, and at step 1158 returns a response, e.g., a "Redirect" DFS response, redirecting the client 1104 to FSVM-3. The client 1104 may then determine the network address for FSVM-3, which is ip-addr3 (e.g., a host name "ip-addr3.domain.name" or an IP address, 10.1.1.3). The client 1104 may determine the network address for FSVM-3 by searching a cache stored in memory of the client 1104, which may contain a mapping from FSVM-3 to ip-addr3 cached in a previous operation. If the cache does not contain a network address for FSVM-3, then at step 1150 the client 1104 may send a request to the name server 1102 to resolve the name FSVM-3. The name server may respond with the resolved address, ip-addr3, at step 1152. The client 1104 may then store the association between FSVM-3 and ip-addr3 in the client's cache.

In particular embodiments, failure of FSVMs may be detected using the centralized coordination service. For example, using the centralized coordination service, each FSVM may create a lock on the host machine on which the FSVM is located using ephemeral nodes of the centralized coordination service (which are different from host machines but may correspond to host machines). Other FSVMs may volunteer for leadership of resources of remote FSVMs on other host machines, e.g., by requesting a lock on the other host machines. The locks requested by the other nodes are not granted unless communication to the leader host machine is lost, in which case the centralized coordination service deletes the ephemeral node and grants the lock to one of the volunteer host machines and, which becomes the new leader. For example, the volunteer host machines may be ordered by the time at which the centralized coordination service received their requests, and the lock may be granted to the first host machine on the ordered list. The first host machine on the list may thus be selected as the new leader. The FSVM on the new leader has ownership of the resources that were associated with the failed leader FSVM until the failed leader FSVM is restored, at which point the restored FSVM may reclaim the local resources of the host machine on which it is located.

At step 1154, the client 1104 may send an access request to FSVM-3 1112 at ip-addr3 on Host-3 1108 requesting the contents of Folder-3 of Share-1. At step 1170, FSVM-3 1112 queries FSVM-3's copy of the map 1124 using FSVM-3's instance of the distributed data access coordinator 1130. The map 1124 indicates that Folder-3 is located on FSVM-3, so at step 1172 FSVM-3 accesses the file system 1132 to retrieve information about Folder-3 1144 and its contents (e.g., a list of files in the folder, which includes File-2 1146) that are stored on the local storage 1120. FSVM-3 may access local storage 1120 via CVM-3 1116, which provides access to local storage 1120 via a volume group 1136 that contains one or more volumes stored on one or more storage devices in local storage 1120. At step 1156, FSVM-3 may then send the information about Folder-3 and its contents to the client 1104. Optionally, FSVM-3 may retrieve the contents of File-2 and send them to the client 1104, or the client 1104 may send a subsequent request to retrieve File-2 as needed.

Examples described herein include file server managers which may manage multiple virtualized file servers (e.g., multiple file systems). The multiple virtualized file servers managed by a file server manager may be hosted by multiple computing node clusters (e.g., in multiple virtualization environments). The file server manager may be in communication with each of the multiple virtualized file servers. In this manner, a file server manager may provide a single pane of glass management interface to help manage and orchestrate file platform and service specific operations from a single location (e.g., a single logon and/or single user interface). File server managers may accordingly implement policies and conduct other operations based on data from multiple virtualized file servers in communication with the file server manager.

In various examples described herein, file server managers may be used to configure and manage share based replication of one or more virtualized file servers. For example, the file server manager may be configurable to select shares from a source virtualized file server to be replicated to a destination virtualized file server. The file server manager may further include replication policies controlling various aspects of share based replication. In some examples, file server managers may implement active-active share based replication, such that a backed-up virtualized file server (e.g., a destination virtualized file server) may be accessed and utilized relatively quickly upon failure of a primary virtualized file server (e.g., a source virtualized file server). The file server manager may also, in some embodiments, implement fail-back to a source virtualized file server after a fail-over to a destination file server. File server managers may accordingly implement share based replication and/or backup of a virtualized file server.

Various examples of share based replication and disaster recovery may provide a short recovery time, allowing for continuous availability of data after fail over to a recovery site. For example, configuration of active directory and domain name system entries may facilitate client access redirection from a failed file server to a backup file server after fail over. In the event of a planned or unplanned loss of service at a file server, corresponding shares at a backup or standby file server may be activated, and client connection requests for the file server may be redirected to the backup file server by updating address information for the file server at an active directory server or a domain name server. Accordingly, failover may occur quickly and with few noticeable changes to clients connecting to the backup file server.

Figure 6:
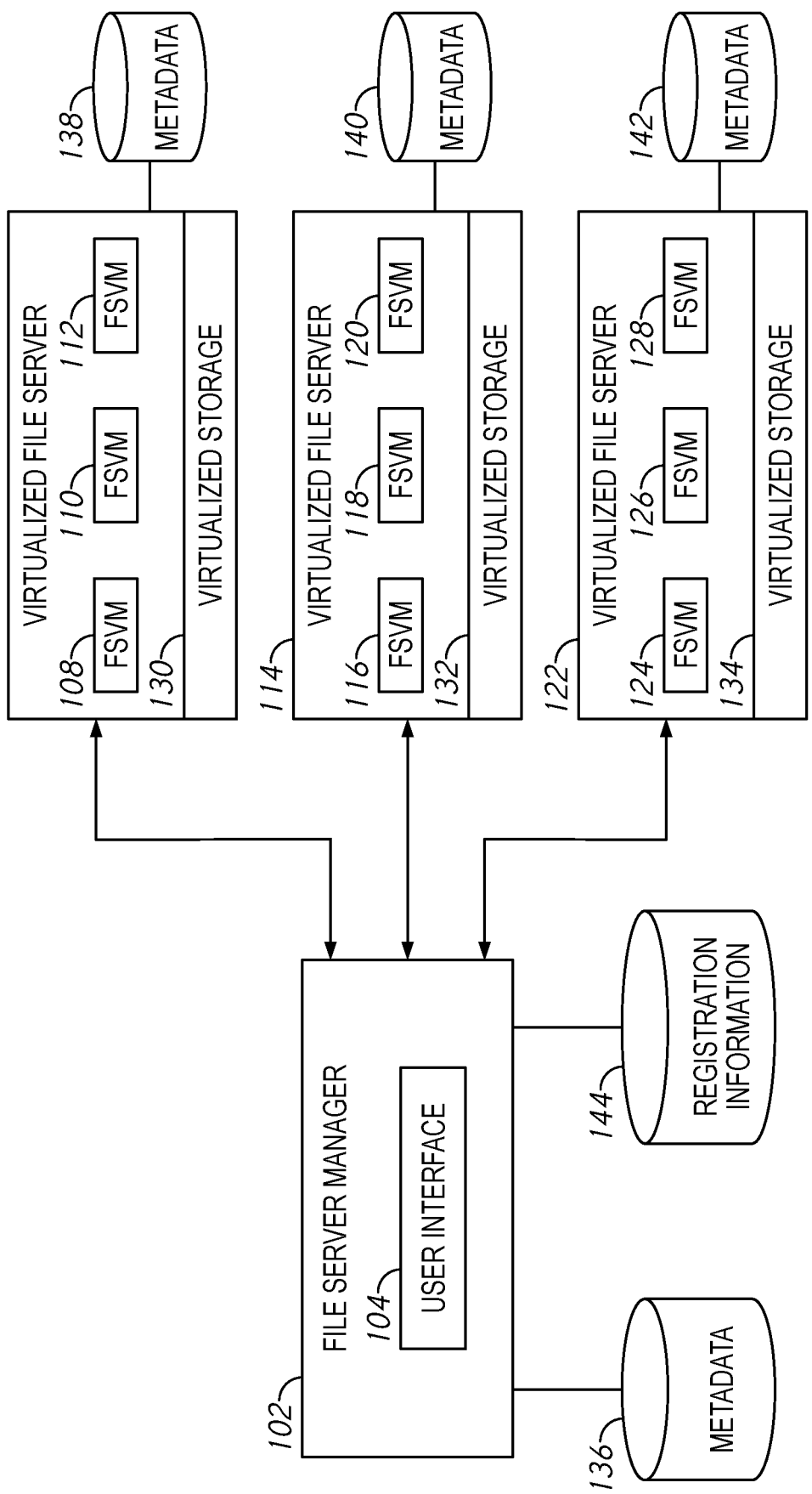
FIG. 6 is a schematic illustration of a system arranged in accordance with examples described herein.

FIG. 6 is a schematic illustration of a system arranged in accordance with examples described herein. The system of FIG. 6 includes file server manager 102. The file server manager 102 may provide user interface 104. The file server manager 102 may be in communication with memory and/or storage for metadata 136 and registration information 144. The system of FIG. 6 further includes virtualized file server 106, virtualized file server 114, and virtualized file server 122. The virtualized file server 106, 114, and/or 122 may be implemented by any virtualized file servers described herein, including those described with respect to FIGS. 1-5. The virtualized file server 106, virtualized file server 114, and virtualized file server 122 may each be in communication with the file server manager 102 (e.g., over one or more networks). Each of the virtualized file server 106, virtualized file server 114, and virtualized file server 122 may be hosted in a same and/or different virtualization environment. Each of the virtualized file server 106, virtualized file server 114, and virtualized file server 122 may include a cluster of computing nodes hosting a cluster of file server virtual machines (FSVM). For example, the virtualized file server 106 includes FSVM 108, FSVM 110, and FSVM 112. The virtualized file server 114 includes FSVM 116, FSVM 118, and FSVM 120. The virtualized file server 122 includes FSVM 124, FSVM 126, and FSVM 128. Each of the virtualized file server 106, virtualized file server 114, and virtualized file server 122 may include virtualized storage. For example, the virtualized file server 106 may include virtualized storage 130, the virtualized file server 114 may include virtualized storage 132, and the virtualized file server 122 may include virtualized storage 134. Moreover, each of the virtualized file server 106, virtualized file server 114, and virtualized file server 122 may include storage and/or memory for storing metadata. The virtualized file server 106 may store metadata 138. The virtualized file server 114 may store metadata 140. The virtualized file server 122 may store metadata 142.

The components shown in FIG. 6 are exemplary only. Additional, fewer, and/or different components may be used in other examples. For example, three virtualized file servers are depicted in FIG. 6, however any number may be used and may be in communication with the file server manager 102.

Examples of systems described herein may accordingly include one or more virtualized file servers, such as virtualized file server 106, virtualized file server 114, and virtualized file server 122 in FIG. 6. A virtualized file server may represent a logical entity in the system. Virtualized file servers described herein may be hosted in generally any virtualization environment (e.g., on generally any virtualization platform). The virtualization environment and/or platform generally refers to the storage resources that have been virtualized by the virtualized file server and the compute resources (e.g., computing nodes with processor(s)) used to manage the virtualized storage. For example, the virtualized file server 106 may be hosted on a different virtualization environment than the virtualized file server 114 and/or than the virtualized file server 122. Nonetheless, in some examples one or more virtualized file servers in communication with a file server manager may be hosted in a same virtualization environment. Examples of virtualization environments include, for example, on premises installations of one or more computing nodes and storage devices. Examples of virtualization environment include one or more cloud computing systems (e.g., Amazon Web Services, MICROSOFT AZURE). Although not shown explicitly in FIG. 6, virtualization environments and/or virtualized file servers may include additional components including, but not limited to, one or more hypervisors, storage controllers, operating systems, and/or container orchestrators (e.g., Kubernetes). The multiple virtualized file servers in communication with a file server manager described herein may in some examples be located in different geographic locations (e.g., different buildings, states, cities, or countries).

A virtualized file server may include a cluster of virtual machines and/or other virtualized entities (e.g., containers), which may be referred to as file server virtual machines (FSVMs). In some examples, each of the file server virtual machines of a cluster may be implemented on different computing nodes forming a computing node cluster. For example, the FSVM 108, FSVM 110, and FSVM 112 of virtualized file server 106 may each be implemented on separate computing nodes of a computing node cluster used by the virtualized file server 106. Similarly, the FSVM 116, FSVM 118, and FSVM 120 may each be implemented on separate computing nodes of a computing node cluster used by the virtualized file server 114. Similarly, the FSVM 124, FSVM 126, and FSVM 128 may each be implemented on separate computing nodes of a computing nodes cluster. In some examples, a cluster of FSVMs may be implemented on a cloud computing system.

The FSVMs may operate to provide a file system on the storage resources of the virtualized file server. The file system may have a single namespace and may store data in accordance with filenames and/or directories. The FSVMs may accordingly support one or more file system protocols, such as NFS and/or SMB. A virtualized file server (such as virtualized file server 106, virtualized file server 114, and/or virtualized file server 122) may translate file system protocol requests for one or more files and/or directories (e.g., a file path) into one or more storage requests to access the data corresponding to the file, directory, and/or file path. Any of a variety of components of the virtualized file server may be used to perform the translation (e.g., one or more FSVMs, one or more hypervisors, and/or one or more storage controllers). The translation may be performed using a map (e.g., a shard map) relating the location of the data to the file name, share, directory, and/or file path.

Virtualized file servers described herein may include virtualized storage. For example, the virtualized file server 106 may include virtualized storage 130. The virtualized file server 114 may include virtualized storage 132. The virtualized file server 122 may include virtualized storage 134. The virtualized storage may generally include any number or kind of storage devices—for example, network attached storage, local storage of one or more computing nodes forming the virtualized file server, and/or cloud storage. Storage devices may be implemented using, for example one or more memories, hard disk drives, solid state drives. The virtualized storage for a particular virtualized file server may be referred to as a storage pool. The virtualized storage may store one or more shares. Generally, the virtualized storage may refer to a storage pool which may include any of a variety of storage devices. In some examples, the virtualized file server(s) may be implemented in a hyperconverged architecture. For example, the storage pool may include local storage devices of the computing nodes used to host the virtualized file server. For example, virtualized storage 130 may include a storage pool. One or more shares of a file system provided by the virtualized file server 106 may be distributed across storage device of the storage pool, including local storage devices of one or more computing nodes on which the FSVM 108, FSVM 110, and/or FSVM 112 reside. In some examples, each file server virtual machine (FSVM) may manage (e.g., host) a corresponding share or portion of a share. A map may store associations between shares and files, directories, and/or file paths.

Virtualized file servers described herein may include metadata. For example, virtualized file server 106 may include metadata 138. The virtualized file server 114 may include metadata 140. The virtualized file server 122 may include metadata 142. The metadata may be stored, for example, in the virtualized storage and/or other storage location accessible to the virtualized file server. The metadata may in some examples be distributed across the storage pool of a virtualized file server. In some examples, the metadata may be stored in a database accessible to and/or hosted by the virtualized file server. Metadata stored by a virtualized file server may include, for example, authentication information for the virtualized file server and/or virtual machines in the virtualized file server, authorization information for the virtualized file server and/or virtual machines in the virtualized file server, configuration information for the virtualized file server and/or virtual machines in the virtualized file server, end point information (e.g., supported API calls and/or endpoints), a number of shares stored in the virtualized storage of the virtualized file server, a protocol supported by each share and/or FSVM (e.g., NFS and/or SMB), identities of the shares stored in the virtualized storage of the virtualized file server, a number of file server virtual machines (FSVMs) present in the virtualized file server, a number of files and/or directories hosted by the virtualized file server, compute resources available and/or used at the virtualized file server, storage resources available and/or used at the virtualized file server, or other metadata regarding the virtualized file server. The metadata may be maintained by the virtualized file server, for example, the metadata may be updated as the number of shares, FSVMs, storage resources and/or compute resources change.

Examples described herein may include a file server manager, such as file server manager 102 of FIG. 6. A file server manager may be in communication with multiple virtualized file servers. For example, the file server manager 102 may be in communication with virtualized file server 106, virtualized file server 114, and virtualized file server 122. In this manner, the file server manager 102 may allow for access to, maintenance of, and/or management of multiple virtualized file servers (e.g., multiple file systems). An enterprise may have many virtualized file servers that are desired to be managed—for example, different geographic locations of the enterprise may maintain separate file systems and/or implement different privacy or other data policies. In some examples, different departments or entities within an organization may maintain respective virtualized file servers. An administrator or other entity associated with the enterprise, such as an IT manager, may advantageously view, access, and/or manage multiple virtualized file servers using the file server manager (e.g., file server manager 102). The file server manager may communicate with each virtualized file server using any of a variety of connections, including one or more networks. In some examples, a same network may be used to communicate between the file server manager and multiple virtualized file servers. In some examples, multiple networks may be used.

File server managers, such as file server manager 102 of FIG. 6 may be implemented using one or more computing devices. In some example, an administrative computing system may be used. The administrative computing system may include, for example, one or more processors and non-transitory computer readable media encoded with instructions for performing the file server manager operations described herein. In some examples, the file server manager may be implemented using a computing device different than the computing devices (e.g., computing nodes) used to implement the virtualized file server(s) with which the file server manager is in communication. In some examples, the file server manager may be hosted on one of the computing nodes forming a part of a virtualized file server in communication with the file server manager. File server managers, such as file server manager 102, may be hosted on premises systems in some examples, and/or on cloud computing systems in some examples.

Examples of file server managers described herein may provide one or more user interfaces, such as user interface 104 of FIG. 6. The user interface may allow a user (e.g., a human administrator and/or another computer process) to view information regarding multiple virtualized file servers, to communicate with multiple virtualized file servers, to manage multiple virtualized file servers, and generally to offer a single pane of glass interface to the multiple virtualized file servers in communication with the file server manager. The user interface may be implemented, for example, using one or more display(s) and one or more input and/or output device(s) (e.g., mouse, keyboard, touchscreen, etc.). In some examples, user interface 104 of file server manager 102 may be used to depict one or more of the virtualized file server 106, virtualized file server 114, and/or virtualized file server 122. For example, the identity and number of shares used by the virtualized file servers may be displayed. In some examples, the number and identity of computing nodes and/or FSVMs in each of the virtualized file servers may be displayed. Other attributes of the virtualized file servers may additionally or instead be displayed using a user interface of a file server manager. The data used in the display may wholly and/or partially be obtained from the registration information and/or metadata synchronized with one or more of the virtualized file servers.

Examples of file server managers described herein may store registration information, such as registration information 144 of FIG. 6. The registration information 144 may include information regarding each virtualized file server in communication with the file server manager. The registration information may include information used to manage, communicate with, and/or otherwise interact with the virtualized file server. Examples of registration information include a name of the virtualized file server, an identification of the virtualization environment hosting the virtualized file server, credentials for one or more FSVMs in the virtualized file server, IP addresses or other addresses for the virtualized file server, FSVMs in the virtualized file server, or other components of the virtualized file server. During setup of a system including a file server manager, the virtualized file servers may be registered with the file server manager, and may provide registration information to the file server manager. The registration information may be stored by the file server manager, such as in registration information 144, which may be a database in some examples. The registration information may be stored on a memory and/or other storage device accessible to the file server manager.

Examples of file server managers described herein may include metadata, such as metadata 136. The metadata may be synchronized to the metadata of multiple virtualized file servers in communication with the file server manager. For example, the metadata 136 may be synchronized with metadata 138, metadata 140, and metadata 142. For example, the metadata 136 at any given time may include metadata 138, metadata 140, and metadata 142. Synchronization may be maintained over time—the metadata of multiple virtualized file servers may periodically (e.g., at regular and/or irregular intervals) synchronize with the metadata store of the file server manager. In this manner, the file server manager 102 may maintain an updated storage of metadata associated with each of virtualized file server 106, virtualized file server 114, and virtualized file server 122. The metadata may be accessed by the file server manager and used to manage, communicate with, and/or otherwise interact with the virtualized file servers.

While the metadata 136 and registration information 144 are depicted separately in FIG. 6, they may be wholly and/or partially stored on a same storage device in some examples. The metadata 136 may be stored, for example, in a database. The registration information 144 may be stored, for example, in a database. Any of a variety of database synchronization techniques may be used to synchronize the metadata of the file server manager with the metadata of multiple virtualized file servers.

During operation, a file server manager described herein may register, such as by receiving a registration for, one or more virtualized file servers. For example, a virtualized file server (e.g., using an FSVM, a hypervisor, and/or another component of the virtualized file server), may transmit a registration (e.g., registration information) to the file server manager. In some examples, the file server manager may request such a registration by transmitting a request to register to the virtualized file server. In some examples, such as when the file server manager is hosted on a cluster and/or within a same system as the virtualized file server, an automatic registration may occur. For example, the registration process may include determining (e.g., from one or more IP addresses used), that a virtualized file server is hosted on a same domain as a file server manager. In other examples, virtualized file servers which are not hosted on a same domain as a file server manager may nonetheless register with the file server manager. In the example of FIG. 6, the file server manager 102 may request registration from virtualized file server 106, virtualized file server 114, and virtualized file server 122. For example, a system administrator may enter an IP address, name, or other identifier to request a registration from virtualized file server 106, virtualized file server 114, and/or virtualized file server 122. In some examples, a system administrator or other user or component may transmit a registration from virtualized file server 106, virtualized file server 114, and/or virtualized file server 122, which registration may or may not be responsive to a request. In some examples, the operating system of one or more computing nodes of the virtualized file server hosting an FSVM may provide a registration request to the file server manager. The registration may include registration information which file server manager 102 may store in registration information 144.

The file server manager may synchronize metadata of registered file servers such that up to date metadata of the registered file server may be accessible to the file server manager. For example, the metadata 136 may synchronize with metadata 138, metadata 140, and metadata 142 of FIG. 6. Any and/or all types of metadata of the virtualized file server may be synched with a file server manager. For example, a number and identity of shares of each virtualized file server may be synchronized with the file server manager. In some examples, compute and/or storage resource usage may additionally or instead be synchronized between a virtualized file server and the file server manager. Sharding or other maps and/or portions thereof may be synchronized between a virtualized file server and the file server manager. Other metadata may be synchronized additionally or instead.

During operation, file server managers described herein, such as file server manager 102 of FIG. 6 may receive a management request for a particular virtualized file server. The management request may be received, for example by a client which may be hosted on a client system, on a system also hosting the file server manager, and/or on a system hosting all or a portion of one of the virtualized file servers in communication with the file server manager. In some examples, the management request may be implemented using an API call. In this manner, a file server manager may provide an API endpoint to receive API calls for one or more virtualized file servers. Examples of management requests include requests for accessing, managing, and/or maintaining the virtualized file server. For example, a management request may be a request to add and/or subtract one or more FSVMs, add and/or subtract one or more shares in the storage, and/or upgrade one or more FSVMs.

The file server manager may format the received management request for the virtualization environment (e.g., virtualization platform) used to host the requested virtualized file server. For example, the file server manager may access the registration information 144 to identify a virtualization environment for a virtualized file server identified in the management request. The management request may then be formatted in a manner used by the virtualized environment. In some examples, the formatted management request may be implemented as an API call, with the API call specific to the virtualization environment of the target virtualized file server. In this manner, clients or other users providing management requests to the file server manager may not require knowledge of the virtualized environment hosting the virtualized file server. The file server manager may format the request in the manner used to communicate with the appropriate virtualization environment. This may provide flexibility in system design and usage, as multiple virtualization environments may be used, and virtualized file servers may in some examples be relocated from one virtualized environment to another without a need to update management requests being provided to the file server manager. Instead, an updated identification of the virtualized environment may be stored in registration information 144 and/or metadata 136.

During operation, the file server manager may utilize information from the registration to implement the management request. For example, access credentials provided during registration may be used to access one or more FSVMs and/or other components of the virtualized file server (e.g., hypervisor, other virtual machine(s) and/or container(s)) and implement the management request. In some examples, the management request may be provided to a particular FSVM. In some examples, the management request may be provided to an FSVM of the virtualized file server that is designated as a leader, and the leader FSVM may communicate the management request to an appropriate FSVM of the virtualized file server.

In some examples, file server managers described herein, such as file server manager 102 of FIG. 6, may be used to implement one or more cross-file server policies. A cross-file server policy may generally refer to a policy that accesses and/or utilizes more than one file server in implementing the policy. For example, one virtualized file server may be used (e.g., designated) as a destination file server and another virtualized file server may be used (e.g., designated) as a source file server. For example, the file server manager 102 may designate virtualized file server 106 as a source file server and virtualized file server 114 as a destination file server. The file server manager 102 may then utilize virtualized file server 106 to replicate, backup, provide redundancy for, or otherwise receive data from virtualized file server 106. For example, the file server manager 102 may implement a replication policy from virtualized file server 106 to virtualized file server 114. Without the presence of file server manager 102 in some examples, the virtualized file server 106 may have been used to implement a replication policy to virtualized file server 114 directly. However, utilizing file server manager 102 provides for central cross-server management and avoids a need for individual file servers to communicate with one another directly.

Examples of file server managers and file server replication which may be used are also described in U.S. application Ser. No. 17/581,562, filed Jan. 21, 2022 and entitled "Share-based file server replication for disaster recovery," which application is hereby incorporated by reference in its entirety for any purpose.

Figure 7:
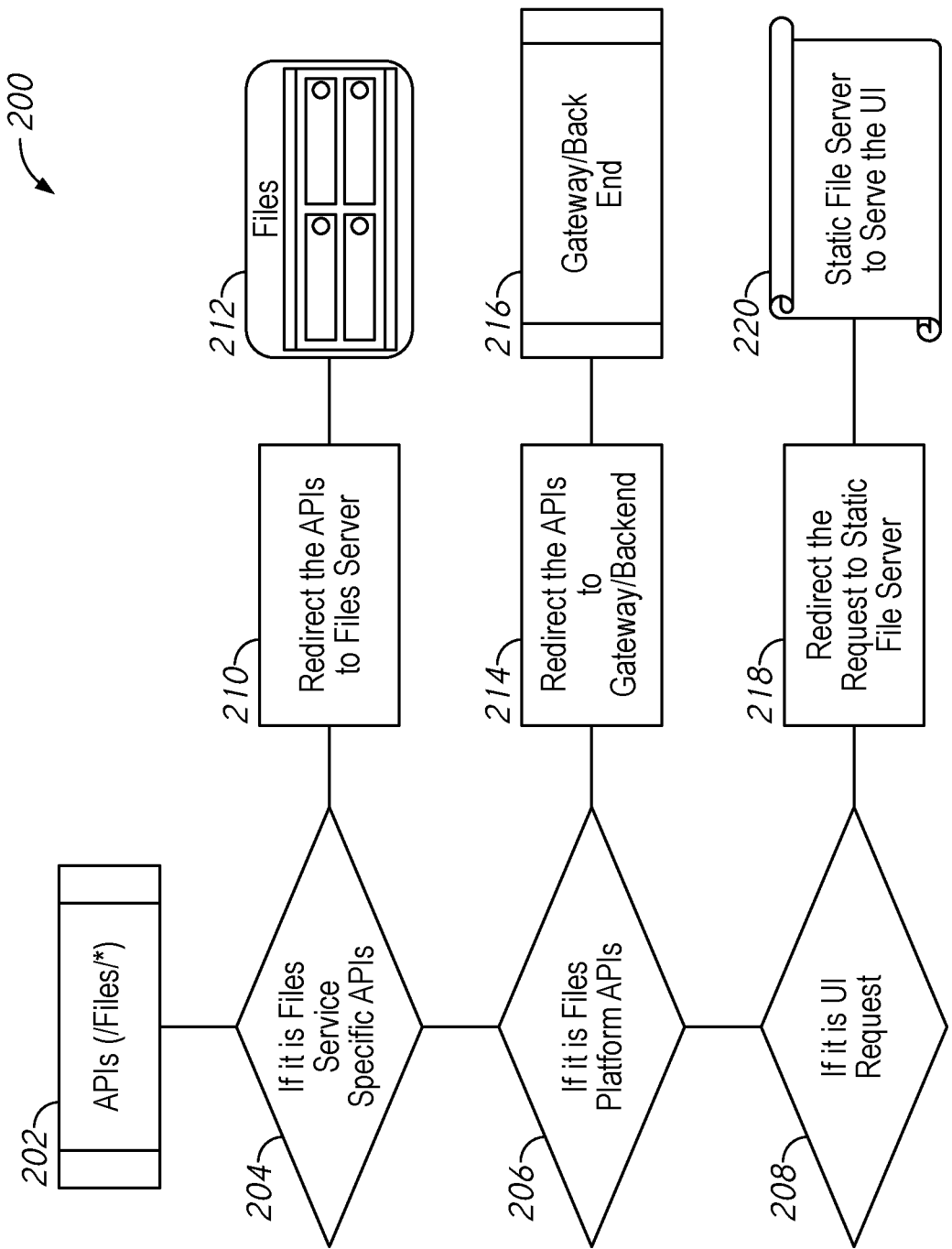
FIG. 7 is a flowchart depicting a method of processing requests received at a file server manager arranged in accordance with examples described herein.

FIG. 7 is a flowchart depicting a method of processing requests received at a file server manager arranged in accordance with examples described herein. The flowchart 200 depicts management requests that may be provided to a file server manager as one or more API calls, such as API call 202. The flowchart 200 includes evaluating the type of management request—is it files service specific in block 204, is it files platform specific in block 206, is it a UI request in block 208. Responsive to a determination the management request is files service specific in block 204, the flowchart 200 indicates the API may be redirected to a virtualized file server in block 210, and may be provided, for example, to virtualized file server 212. Responsive to a determination the management request is files platform specific in block 206, the request may be directed to a gateway or backend in block 214, such as gateway 216. Responsive to a determination the management request is a UI request, it may be redirected to a file server in block 218, such as file server 220, which may be a virtualized file server. The blocks and components of flowchart 200 are exemplary, and the blocks and component may occur in different orders in some examples, and additional and/or fewer blocks or components may be used in some examples.

The method depicted by flowchart 200 may be implemented by file server managers described herein, such as by file server manager 102 of FIG. 6.

In block 202, an API call 202 may be received, which may also be referred to as a management request. The API call 202 may be implemented, for example, using a REST API. The API call 202 may be received from an administrator (e.g., using an interface to a file server manager, such as user interface 104 of FIG. 6). The API call 202 may be received from a computing system (e.g., a client computing system) in communication with a file server manager described herein. In some examples the request may come from an automation script that may be executing on, for example a computing system in communication with the file server manager and/or on the file server manager itself. In some examples, the API call may be received from (e.g., may be sent by) a virtualized file server in communication with the file server manager, such as virtualized file servers 106, virtualized file server 114, and/or virtualized file server 122 of FIG. 6. The API call may be received from a virtual machine and/or container. For example, the API call may be received from a user virtual machine and/or container which may be hosted on a same computing node of as one of the FSVMs of the virtualized file server. The API call may be used to implement a management request as described herein. The API call may not be specific to the type of platform (e.g., virtualization platform) hosting a virtualized file server. In this manner, the API call may be agnostic to platform type. The file server manager may accordingly provide an API endpoint for management requests directed to one or more virtualized file servers.

The file server manager may evaluate the management request received, e.g., API call 202. For example, the file server manager 102 may receive API call 202 and may evaluate it to determine how to direct the API call. The management request may be evaluated to determine its intended destination. For example, the file server manager 102 may evaluate a management request to determine if it is files service specific (e.g., in block 204), if it is directed toward a files platform (e.g., block 206), and/or if it is a UI request (e.g., block 208). The evaluation may be based, for example, on identifying that the content of the request pertains to files services, files platform, and/or UI. The evaluation may be based, for example, on identifying a destination of the request.

If the management request (e.g., API call 202) is determined to be a files service specific request in block 204, the request may be redirected to the appropriate virtualized file server in block 210. Examples of files service specific requests include requests to create a share, create or revise one or more user quotas for the virtualized file server, monitor a number of users connected to a virtualized file server, or blocking one or more particular users of the virtualized file server. Files service specific requests may not need to be translated for the particular virtualization platform of the virtualized file server, because in some examples they may requests which are received and/or processed by one or more file server virtual machines (FSVMs) or another component of the virtualized file server (e.g., hypervisor, daemon, or other service). In redirecting to a virtualized file server, the file server manager may in some examples format the request in a manner suitable for the virtualized file server, such as the virtualized file server 212. In some examples, the file server manager may format the request in a manner suitable for a particular version of file server virtual machine operating in the requested virtualized file server. In some examples, the file server manager may receive a request for a virtualized file server that the particular version of file server virtual machine used may not support. The file server manager may identify the version of file server virtual machine (e.g., by accessing metadata and/or registration information) and may replace the unsupported request with a supported request able to be received and processed by the version of file server virtual machine in operation.

If the management request (e.g., API call 202) is determined to be a files platform request (e.g., create one or more FSVMs, scale-in the virtualized file server, scale-out the virtualized file server, add storage to the virtualized file server), then management request may be redirected to a gateway or backend for the appropriate virtualized file server in block 214, such as gateway 216. In redirecting the request, the file server manager may format the request for the particular virtualization platform (e.g., virtualization environment) on which the virtualized file server is hosted. For example, the management request may be formatted for the compute and storage resources used in a particular environment such as a NUTANIX platform, an AMAZON WEB SERVICES platform, a MICROSOFT AZURE platform, etc. The file server manager may access a database or other stored location to determine the platform hosting the requested virtualized file server (e.g., registration information 144 in FIG. 6). Based on the identity of the platform, the management request may be formatted for the platform (e.g., by utilizing platform-specific API calls in some examples). In this manner, an administrator or other user may manipulate a virtualized file server—e.g., to expand the virtualized file server—without requiring knowledge on behalf of the administrator of what platform is hosting the virtualized file server.

If the management request (e.g., API call 202) is determined to be a UI request, it may be redirected to a file server in block 218, such as file server 220, which may be a virtualized file server. UI requests may include, for example, requests to view the current compute resource usage, storage resources usage, number of shares, identity of shares, and/or files or directories hosted by a particular virtualized file server. In redirecting the request to a file server in block 218, the file server manager may format the request in a manner particular to the file server and/or the UI of the file server.

Accordingly, using methods such as depicted in flowchart 200 of FIG. 7, file server managers described herein may receive and redirect management requests, such as API calls. The API calls may be selected and/or formatted in a manner particular to a virtualized file server and/or a virtualization environment.

Figure 8:
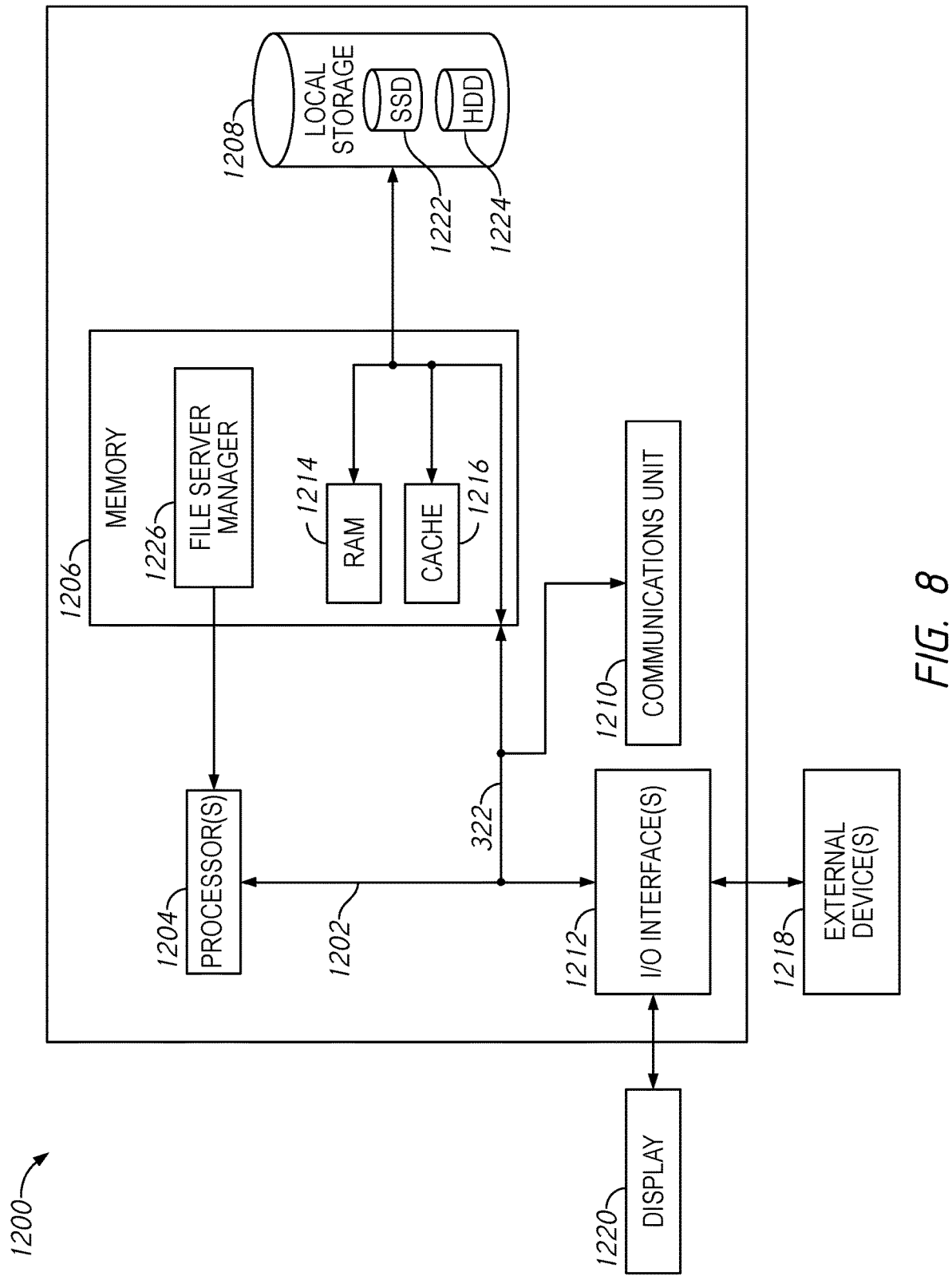
FIG. 8 is a schematic illustration of a computing system arranged in accordance with examples described herein.

FIG. 8 depicts a block diagram of components of a computing system in accordance with examples described herein. It should be appreciated that FIG. 8 provides only an illustration of one implementation and does not imply any limitations with regard to the environments in which different embodiments may be implemented. Many modifications to the depicted environment may be made. The computing system may be used to implement and/or may be implemented by any file server manager, admin system, and/or host machine described herein. The components shown in FIG. 8 are exemplary only, and it is to be understood that additional, fewer, and/or different components may be used in other examples.

The computing node 1200 includes one or more communications fabric(s) 1202, which provide communications between one or more processor(s) 1204, memory 1206, local storage 1208, communications unit 1210, and/or I/O interface(s) 1212. The communications fabric(s) 1202 can be implemented with any architecture designed for passing data and/or control information between processors (such as microprocessors, communications and network processors, etc.), system memory, peripheral devices, and any other hardware components within a system. For example, the communications fabric(s) 1202 can be implemented with one or more buses.

The memory 1206 and the local storage 1208 may be computer-readable storage media. In the example of FIG. 12, the memory 1206 includes random access memory RAM 1214 and cache 1216. In general, the memory 1206 can include any suitable volatile or non-volatile computer-readable storage media. In this embodiment, the local storage 1208 includes an SSD 1222 and an HDD 1224. The memory 1206 may include executable instructions for providing a file server manager 1226. In other examples, the memory 1206 may include executable instructions for providing other software components described herein. The instructions for providing a file server manager 1226 may be used to implement and/or implemented by file server managers described herein.

Various computer instructions, programs, files, images, etc. may be stored in local storage 1208 and/or memory 1206 for execution by one or more of the respective processor(s) 1204 via one or more memories of memory 1206. In some examples, local storage 1208 includes a magnetic HDD 1224. Alternatively, or in addition to a magnetic hard disk drive, local storage 1208 can include the SSD 1222, a semiconductor storage device, a read-only memory (ROM), an erasable programmable read-only memory (EPROM), a flash memory, or any other computer-readable storage media that is capable of storing program instructions or digital information.

The media used by local storage 1208 may also be removable. For example, a removable hard drive may be used for local storage 1208. Other examples include optical and magnetic disks, thumb drives, and smart cards that are inserted into a drive for transfer onto another computer-readable storage medium that is also part of local storage 1208.

Communications unit 1210, in some examples, provides for communications with other data processing systems or devices. For example, communications unit 1210 may include one or more network interface cards. Communications unit 1210 may provide communications through the use of either or both physical and wireless communications links.

I/O interface(s) 1212 may allow for input and output of data with other devices that may be connected to computing node 1200. For example, I/O interface(s) 1212 may provide a connection to external device(s) 1218 such as a keyboard, a keypad, a touch screen, and/or some other suitable input device. External device(s) 1218 can also include portable computer-readable storage media such as, for example, thumb drives, portable optical or magnetic disks, and memory cards. Software and data used to practice embodiments of the present invention can be stored on such portable computer-readable storage media and can be loaded onto and/or encoded in memory 1206 and/or local storage 1208 via I/O interface(s) 1212 in some examples. I/O interface(s) 1212 may connect to a display 1220. Display 1220 may provide a mechanism to display data to a user and may be, for example, a computer monitor.

In various examples described herein, an admin system may be utilized to implement replication of a file server. Replication and disaster recovery may facilitate share-level data replication and disaster recovery. In the event of a planned or unplanned loss of service, write access can be restored to protected shares by failing-over to a recovery site file server. Protection policies may indicate failover details, including the primary location, recovery location, and replication schedule. Rather than having a single protection policy for an entire file server, unique policies may be configured for different shares without tracking or without regard to where, physically, the shares are stored within the file system.

Data replication may be provided from a source file server to a remote file server, which may be used for failover in case of failure of the source file server. The admin system may be used to configure replication policies by, for example, selecting shares from the source file server to be replicated to the destination file server. Replication policies may further include, in various examples, selecting a replication schedule (e.g., replication frequency) for the selected shares. The source file server may be replicated by replicating each share independently based on the replication schedule. The data replication may be based on file system datastream send and receive technology. The first replication may be a full replication using a base snapshot. Subsequent replication may transfer only a data difference between the last snapshot and a new snapshot.

Replication described herein may include maintaining the standby or destination file server such that the destination file server accepts client connections and serves data over NFS and/or SMB protocols in read only. For example, the destination file server may be used to read data from the file system. However, before a failover or activation, the destination file server may not be used to write data to the file system. In case of a failure of the primary or source file server, or other failover trigger, failover may occur by updating settings of the destination file server to accept read and write requests, which may shorten recovery time when contrasted with a typical active-passive scenario. The replication methods described herein may provide failover and failback workflows to orchestrate recovery of the primary file server. In some examples, additional workflows may allow the destination file server to take over the identity of the primary file server.

The replication described herein may use a task based framework. A task framework may allow for tracking progress of work done (e.g., whether individual tasks have been started, completed, or exited with an error). Tasks may be used to handle user triggered operations that take a long time and are handled asynchronously. For example, a failover workflow may be a task. The replication described herein may use a job framework in addition to the task based framework. A job may be similar to a task, where a job represents a unit of system generated action. The job framework may allow for tracking progress of system generated periodic work. For example, replication may be a job.

Examples of systems described herein may allow for a replication process that includes SSR and/or other additional snapshots, in addition to replication snapshots, that provide share-level disaster recovery on, virtualized file servers, such as disaster recovery of a primary location on a disaster recovery location utilizing an additional SSR snapshot.

Figure 9:
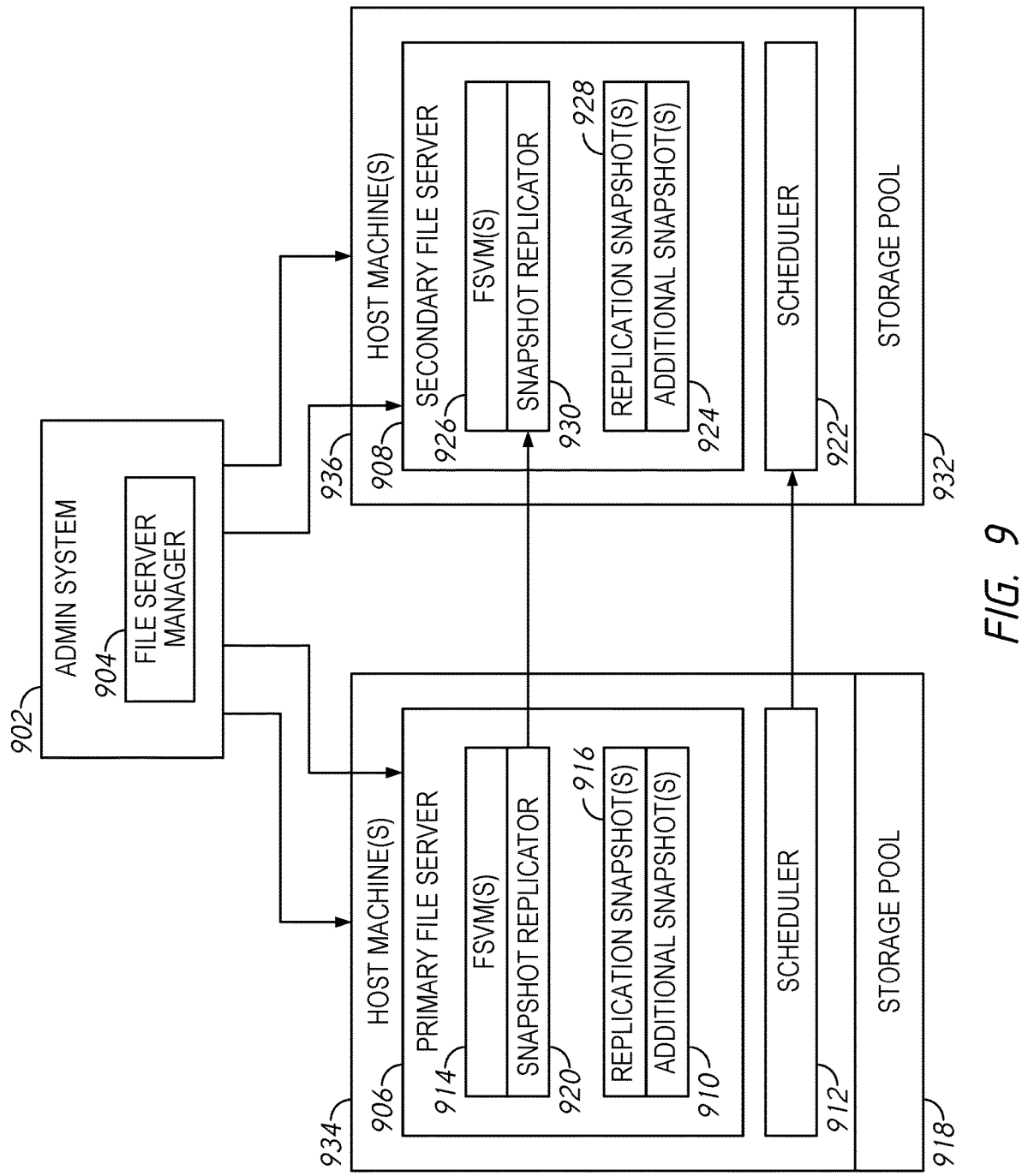
FIG. 9 is a schematic illustration of a system arranged in accordance with examples described herein.

FIG. 9 is a schematic illustration of a system arranged in accordance with examples described herein. The system shown in FIG. 9 may be used to perform disaster recovery for a virtualized file server. In particular, the system shown in FIG. 9 may be used to migrate both replication snapshots and additional snapshots (e.g., SSR snapshots, backup snapshots, etc.) to a secondary virtualized file server (e.g., a disaster recovery location). The generation and migration may be performed using a replication engine, and a scheduler, and may provide for share-level disaster recovery.

The system of FIG. 9 includes admin system 902 which may include file server manager 904. The admin system 902 may be in communication with one or both of host machine(s) 934 and/or host machine(s) 936. The admin system 902 may be in communication with one or both of primary file server 906 and/or secondary file server 908. The system of FIG. 9 includes a primary file server 906 which may be hosted by host machine(s) 934. The system of FIG. 9 further includes secondary file server 908 which may be hosted by host machine(s) 936. The host machine(s) 934 may further host scheduler 912. The host machine(s) 396 may further host scheduler 922.

The primary file server 906 may manage access to storage items (e.g., shares) stored in storage pool 918. The secondary file server 908 may manage access to storage items (e.g., shares) stored in storage pool 932. The primary file server 906 may include one or more file server virtual machines, FSVM(s) 914. The primary file server 906 may include snapshot replicator 920, replication snapshot(s) 916, and additional snapshot(s) 910. The secondary file server 908 may include snapshot replicator 930, replication snapshot(s) 928, and additional snapshot(s) 924. The components shown in FIG. 9 are by way of example. Additional, fewer, and/or alternative components may be used in other examples.

The primary file server 906 and/or secondary file server 908 may be implemented using one or more virtualized file servers described herein, such as those described with reference to FIGS. 1-8. For example, the primary file server 906 may be hosted on one or more host machine(s) 934. The primary file server 906 may include a plurality of virtualized computing instances, such as one or more virtual machines, containers, or combinations thereof. The virtualized computing instances may form a cluster of virtualized computing instances. Each of the virtualized computing instances may present a namespace of storage items for a file system. The storage items may be distributed in storage pool 918. For example, each host machine(s) 934 may host at least one file server virtual machine—e.g., at least one of FSVM(s) 914. Each of the FSVM(s) 914 may manage access requests for storage items in the storage pool 918 (e.g., files, folders, and/or shares), where the access requests are provided to the FSVM(s) 914 using a path name and/or in accordance with a file system protocol. The FSVM(s) 914, which may be implemented using virtual machine(s), container(s), daemons, or other virtualized computing instances, may each present a namespace of storage items in the storage pool 918 to one or more clients. The clients may include, for example, user VMs executing on one or more of the host machine(s) 934. The storage pool 918 may include network storage, cloud storage, and local storage devices of one or more of the host machine(s) 934. In this manner, the primary file server 906 may be implemented in a hyperconverged architecture.

In an analogous manner, the secondary file server 908 may be hosted on one or more host machine(s) 936. The secondary file server 908 may include a plurality of virtualized computing instances, such as one or more virtual machines, containers, or combinations thereof. The virtualized computing instances may form a cluster of virtualized computing instances. Each of the virtualized computing instances may present a namespace of storage items for a file system. The storage items may be distributed in storage pool 932. Each host machine(s) 936 may host at least one file server virtual machine—e.g., at least one of FSVM(s) 926. Each of the FSVM(s) 926 may manage access requests for storage items in the storage pool 932 (e.g., files, folders, and/or shares), where the access requests are provided to the FSVM(s) 926 using a path name and/or in accordance with a file system protocol. The FSVM(s) 926, which may be implemented using virtual machine(s), container(s), daemons, or other virtualized computing instances, may each present a namespace of storage items in the storage pool 932 to one or more clients. The clients may include, for example, user VMs executing on one or more of the host machine(s) 936. The storage pool 932 may include network storage, cloud storage, and local storage devices of one or more of the host machine(s) 936. In this manner, the secondary file server 908 may be implemented in a hyperconverged architecture.

Generally, in examples described herein, the secondary file server 908 may be a fail-over file server to continue operation of the primary file server 906 in the event of a fail-over event (e.g., a whole or partial failure of the primary file server 906, and/or a planned fail-over). Accordingly, the secondary file server 908 may be hosted on different host machines than the primary file server 906. Moreover, the host machines used to host the secondary file server 908 may be generally in a location which aids in failure resistance. For example, the host machine(s) 936 may be located in a different site, room, city, country, height, or location than the host machine(s) 934. The secondary file server 908 may generally be a replica of the primary file server 906.

The admin system 902 and file server manager 904 may be implemented, for example, using any admin system and/or file server manager (e.g., files manager) described herein, such as those described with reference to FIGS. 1-8. While a single admin system 902 and file server manager 904 are shown in FIG. 9, multiple such systems may be present in some examples (e.g., one in communication with primary file server 906 and one with secondary file server 908). The file server manager 904 may provide multi-file server policies, such as a disaster recovery policy for primary file server 906 and/or secondary file server 908. The admin system 902 and/or file server manager 904 may communicate with the primary file server 906 and/or the secondary file server 908 using API gateways provide by the primary file server 906 and/or secondary file server 908. In this manner, API requests may be provided from the admin system 902 and/or file server manager 904 to the primary file server 906 and/or secondary file server 908. There may be API requests, for example, to communicate replication snapshots, additional snapshots, or both, from the primary file server 906 to the secondary file server 908.

In some examples, the primary file server 906 and secondary file server 908 may be in communication with an active directory server (not shown in FIG. 9). The communication with the active directory server may occur using an API gateway of the primary file server 906 and secondary file server 908, respectively. The primary file server 906 and secondary file server 908 may be in communication with a same active directory server in some examples.

In some examples, the system of FIG. 9 may implement share-level replication for disaster recovery. Share-level replication generally refers to a replication of a share (or one or more shares) of a file system hosted on a primary file server, replicated to a secondary file server for use in disaster recovery response to, for example, a disaster (e.g., data loss, etc.) event. Share-level replication enables replication and/or retention policies, etc., to be set and implemented on a per-share basis for, for example, a file system. The share-based disaster recovery system makes use of a shared snapshot at the primary and secondary (e.g., remote, disaster recovery) locations, and the replication snapshot may be periodically (or otherwise) replicated. In some examples, the replication snapshot may be may be updated. In some examples, the updating may include updating the one or more tags assigned to the shared snapshot. In some examples, the updating may include updating a retention policy corresponding to the replication snapshot. In some examples, the updating may include updating other portions of the shared snapshot as discussed herein. Accordingly, the file server manager 904 may communicate a share-level replication policy to primary file server 906 and/or secondary file server 908 to be implemented at least using tags corresponding to replication and/or additional snapshots, as discussed herein.

The host machine(s) 934 and/or another computing system may host a snapshot replicator 920. The snapshot replicator 920 may be utilized to perform share-level snapshot replication. For example, on a primary site, such as primary file server 906, snapshot replicator 920 may generate a first replication snapshot at a first time. The first replication snapshot may be correspond to a particular share within the primary file server, and may indicative of a state of the share at the particular point in time at which the snapshot was generated. In some examples, the first replication snapshot is an exact copy of a given volume of data of the particular share to which it corresponds at the first time. On the primary file server 906, snapshot replicator 920 may generate a second replication snapshot at a second time subsequent the first time. In some examples, the second replication snapshot is an exact copy of a given volume of data of the share to which it corresponds at the second time. Snapshot replicator 920 may also generate (and/or identify) one or more additional snapshots. In some examples, at least one of the one or more additional snapshots 910 is generated at a time subset the first time, but prior to the second time. In some embodiments, the additional snapshots may include self-service restore snapshots, backup snapshots, and/or additional and/or alternative snapshots. In some examples, a replication snapshot 916 comprises one or more additional snapshots 910.

Snapshot replicator 920 of primary file server 906 may further be configured to assign a tag one or more replication snapshots and/or one or more additional snapshots. In some embodiments, the tag assigned to the one or more replication snapshots and/or the one or more additional snapshots may include information, such as but not limited to retention information, identification information, timestamp information, or combinations thereof. A scheduler, such as scheduler 912 may be configured to handle the replication policies assigned to one or more of the snapshots by the snapshot replicator 920. For example, snapshot replicator 920 may be configured to handle replication snapshots, SSR snapshots, backup snapshots, and/or additional and/or alternative snapshots generated and/or identified by snapshot replicator 920. In some examples, and as described herein, a scheduler, such as scheduler 912 of FIG. 9 may be configured to handle retention of additional snapshots at primary file server 906. In some examples, and as described herein, a scheduler, such as scheduler 922 of FIG. 9 may be configured to handle retention of additional snapshots at secondary file server 908. As should be appreciated, each file server and/or each location (e.g., primary location, disaster recovery location, additional and/or alternative locations) each, in some examples, having a scheduler, may be configured to handle retention of additional snapshots, separate and/or irrespective of how other schedulers handle retention at their respective locations.

Snapshot replicator 920 may further be configured to migrate (e.g., replicate, transmit, etc.) the generated replication snapshot and/or additional snapshots to the secondary file server 908.

Similar to the host machine(s) 934 discussed herein, the host machine(s) 936 and/or another computing system may host a snapshot replicator 930. The snapshot replicator 930 may be utilized to perform share-level snapshot replication. As should be appreciated, the tags assigned to each of the snapshots at the primary file server 906 by snapshot replicator 920 may be primary file server-specific. For example, upon migration and/or replication of the snapshots from the primary file server 906 to the secondary file server 908, snapshot replicator 930 may be configured to assign new tags to the replication snapshots 928 and additional snapshots 924. In some embodiments, the new tags assigned by snapshot replicator 930 may be secondary file server-specific. In some embodiments, the tags are assigned during a promotion stage, and in some embodiments, the tags comply with various retention policies, among other policies. In some embodiments, after migration of the replication snapshot 920 and additional snapshot 910 from the primary file server 906 to the secondary file server 908, disaster recovery policies with SSR enabled shares will start replicating the additional SSR snapshots 930. The snapshots (additional or otherwise) which are not replicable will be marked accordingly (e.g., with assigned tags, etc.) so that they will be skipped during replication.

In some embodiments, upon receiving a replication snapshot of a share of a file system at a disaster recovery location, the snapshot replicator 930 may be configured to identify one or more additional snapshots 924, as a particular type of additional snapshot, such as an SSR snapshot and/or a backup snapshot. In some embodiments, the identification may be based at least on based on the tag associated with the process used to create the additional snapshot. In some embodiments, the snapshot replicator 930 may further be configured to extract the additional snapshot for use by another instance of the process at the secondary file server 908. For example, in response to a disaster event, another instance of the process may utilize the additional snapshot 924 at the secondary file server 908 to recover lost and/or corrupted data at a share-level.

In some examples, an additional snapshot (e.g., SSR or backup snapshot), such as additional snapshot 910 may be the same as a replication snapshot, such as replication snapshot 916. For example, this may occur when an SSR snapshot may be taken at a same time as a replication snapshot, and accordingly may be identical. In such cases, the single snapshot may be tagged as both a replication and an SSR snapshot by snapshot replicator 920, and may be used for both purposes. In such cases, only one snapshot (tagged as both SSR additional and replication) may need to be replicated to secondary file server 908.

In some examples, the primary file server 906, the secondary file server 908, or both, may each comprise a scheduler retention thread (not shown in FIG. 9). In some examples, a scheduler retention thread may be configured to monitor and/or purge the SSR additional snapshot 924 as per a retention policy. In some examples, the scheduler retention thread may be in communication with but separate from a scheduler, such as schedulers 912 and 922 of FIG. 9. In some examples, the scheduler retention thread may be in communication with but coupled to and/or included in a scheduler, such as schedulers 912 and 922 of FIG. 9. In some examples, the replication snapshot 928 and/or the additional snapshot 924 may be used to recover one or more shares in response to a disaster event. While share-level recovery is primarily discussed throughout, it should be appreciated that additional and/or alternative levels of recovery (e.g., application level, block level, file system level, folder level, etc.) are contemplated to be within the scope of this disclosure, and that primary discussion of share-level disaster recovery is in no way limiting.

As should further be appreciated, while the primary file server may comprise a primary file location, and the secondary file server may comprise a disaster recovery location. In some examples, and as discussed herein, the primary file server and the secondary file server may or may not be co-located.

Figure 10:
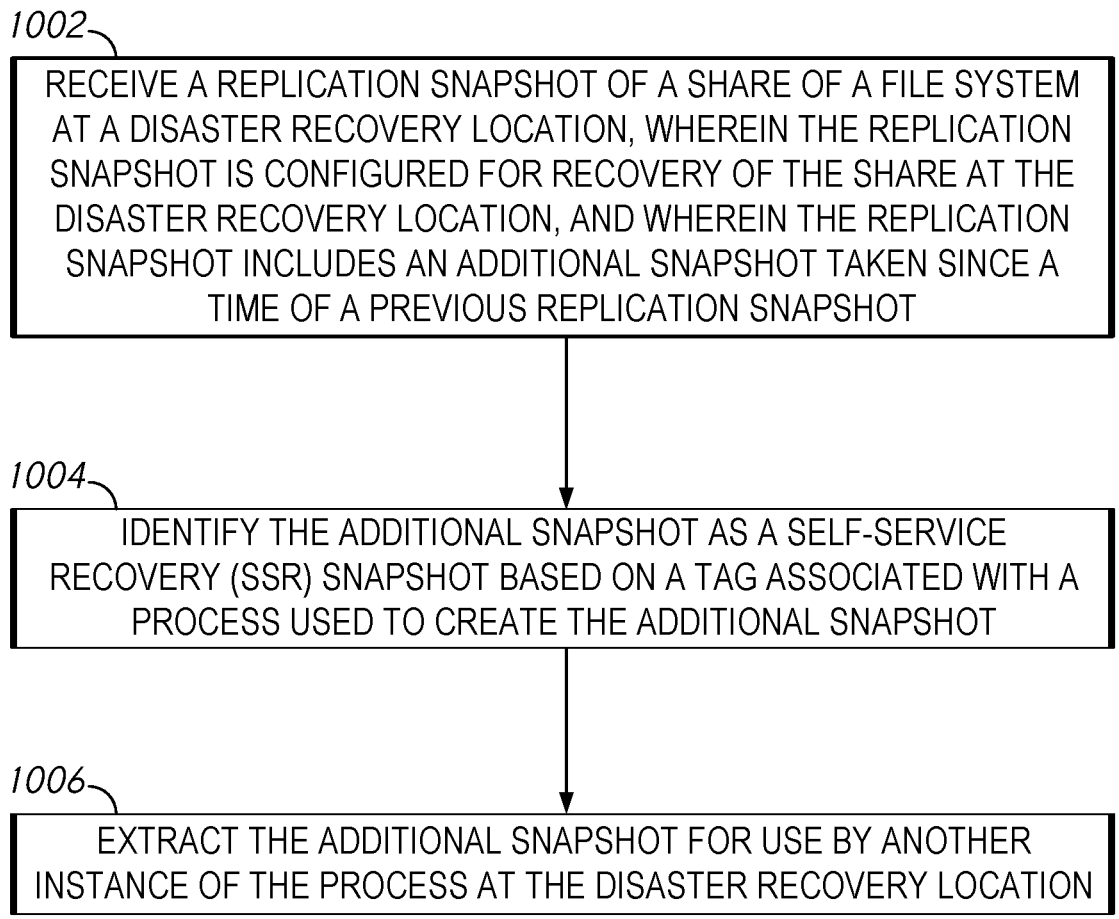
FIG. 10 is a flowchart depicting an example process for file system disaster recovery using replication snapshots and additional snapshots, including SSR snapshots and backup (CFT) snapshots, in accordance with examples described herein.

FIG. 10 is a flowchart depicting an example process for file system disaster recovery using replication snapshots and additional snapshots, including SSR snapshots and backup (CFT) snapshots, in accordance with examples described herein. The blocks of FIG. 10 are exemplary—additional, fewer, or different blocks may be used in other examples, and the blocks may be re-ordered in some examples.

In block 1002, a replication snapshot (e.g., 916 of FIG. 9) of a share of a file system may be received (e.g., 928 of FIG. 9) at a disaster recovery location, such as secondary file server 908 of FIG. 9. In some examples, the replication snapshot may be configured for recovery of the share at the disaster recovery location. In some examples, the replication snapshot may include one or more additional snapshots taken since a time of a previous snapshot (e.g., 910 and/or 924 of FIG. 9). In some examples, the replication snapshot and the additional snapshot, received at the disaster recovery location, may be generated at a primary location, such as primary file server 906 of FIG. 9. In some examples, the replication snapshot and the additional snapshot, received at the disaster recovery location, may be generated (e.g., replicated) by a replication engine, such as snapshot replicator 920 of FIG. 9. In some examples, the additional snapshot may be an SSR snapshot, a backup snapshot, or other type of snapshot. As should be appreciated, and as described throughout, replication snapshots may be generated by disaster recovery processes described herein for the purpose of replicating all or portions of the virtualized file server to a secondary site. In some examples, a replication engine, such as snapshot replicator 920 of FIG. 9, may be configured to manage replication of snapshots, such as replication snapshots and/or additional snapshots.

In some examples, the replication snapshot 928 at the disaster recovery location may comprise a first retention policy, and the additional snapshot 924 at the disaster recovery location may comprise a second snapshot. In some examples, the first retention policy may be different from the second retention policy. In some examples, the first retention policy may be the same as the second retention policy. In some examples, the retention policy for the replication snapshot 928 at the disaster recovery location may be different than a disaster retention policy associated with the replication snapshot 916 at the primary location. In some examples, the retention policy for the replication snapshot 928 at the disaster recovery location may be the same as the disaster retention policy associated with the replication snapshot 916 at the primary location.

In some examples, the retention policy for the additional snapshot 924 at the disaster recovery location may be different than a disaster retention policy associated with the additional snapshot 910 at the primary location. In some examples, the retention policy for the additional snapshot 924 at the disaster recovery location may be the same as the disaster retention policy associated with the additional snapshot 910 at the primary location. In some examples, the replication snapshot 928 at the disaster recovery location may include more than one additional snapshot 924. In some examples, each additional snapshot 924 may comprise different retention policies. In some examples, all the additional snapshots may comprise the same retention policies. In some examples, each of additional snapshots 924 may comprise retention policies, some being the same and some being different than the others. In some examples, the retention policies may be manually configurable, automatically configurable, or a combination thereof.

In some examples, the process used to generate the additional snapshot 910 at the primary location is a self-service restore process utilized by a replication engine. In some examples, a replication engine (e.g., snapshot replicator 920 of FIG. 9) located at the primary location (e.g., primary file server 906 of FIG. 9) may generate the additional snapshot.

In block 1004, the additional snapshot 924 is identified as a self-service recovery (SSR) snapshot. In some examples, the identification is based on a tag associated with process used to create the additional snapshot. In some examples, the replication engine 920 may be further configured to tag the additional snapshot 910 at the primary location. The tag may comprise information, such as but not limited to retention information, identification information, timestamp information, or combinations thereof. In some examples, the tag assists the disaster recovery system in the manageability of the snapshots. In some examples, upon migration (e.g., transmission, replication) of the replication snapshot 928 and the additional snapshot 924 to the disaster recovery location, a replication engine 930 located at the disaster recovery location may be configured to tag the replication snapshot 928 and additional snapshot 924.

In some examples, the tags associated with the replication snapshot 916 and the additional snapshot 910 at the primary location may be different from the tags associated with the replication snapshot 928 and the additional snapshot 924 at the disaster recovery location. In some examples, the tags associated with the replication snapshot 916 and the additional snapshot 910 at the primary location may be the same as the tags associated with the replication snapshot 928 and the additional snapshot 924 at the disaster recovery location. As should be appreciated, tags may comprise retention information, such as how long to maintain the snapshot at the disaster recovery location, how often to generate additional snapshots (e.g., hourly, daily, weekly, monthly, etc.), and when (or if) to purge the snapshots from memory, in some examples, making room for additional and/or more current replication and additional snapshots. In some examples, the additional snapshot 910 is the same as the replication snapshot 916. For example, an additional snapshot 910 (e.g., an SSR snapshot) may be taken (e.g., created) at the same time as a replication snapshot 916. In such cases, a single snapshot may be tagged as both a replication snapshot 916 and an additional (e.g., an SSR) snapshot 910, and used for both purposes. In such cases, only a single snapshot may need to be replicated to the disaster recovery location. In such cases, the single snapshot may be tagged with one or with more than one retention policies. In some examples, tags assigned to one or more snapshots may be indicative of information additional and/or alternative to retention policies. For example, tagging may be used to bypass policy rules. In some examples, tagging may be used to override policy rules. In some examples, tagging may be used to serve more than one purpose, such as providing retention policy information as well as bypass and/or override information.

In block 1006, the additional snapshot 924 is extracted for use by another instance of the process at the disaster recovery location 908. In some examples, a scheduler retention thread (not shown in FIG. 9) may be configured to monitor and purge the SSR snapshot 924 as per a retention policy. In some examples, the primary location 906, the disaster recovery location 908, or both, may each comprise a scheduler retention thread (neither shown in FIG. 9). In some examples, the scheduler retention thread may be in communication with but separate from a scheduler, such as schedulers 912 and 922 of FIG. 9. In some examples, the replication snapshot 928 and/or the additional snapshot 924 may be used to recover one or more shares in response to a disaster event. While share-level recovery is primarily discussed throughout, it should be appreciated that additional and/or alternative levels of recovery (e.g., application level, block level, file system level, folder level, etc.) are contemplated to be within the scope of this disclosure, and that primary discussion of share-level disaster recovery is in no way limiting.

Accordingly, by enabling additional snapshots, including self-service recovery (SSR) snapshot migration in addition to replication snapshot migration to a disaster recovery location, share-level disaster recovery on, for example, virtualized file servers, is provided. For example, replication and additional snapshots of the primary file server 906 of FIG. 9 may be migrated to a secondary file server 908 of FIG. 9 and tagged with retention policy information, providing for share-level disaster recovery with configurable retention.

Various features described herein may be implemented in hardware, software executed by a processor, firmware, or any combination thereof. If implemented in software (e.g., in the case of the methods described herein), the functions may be stored on or transmitted over as one or more instructions or code on a computer-readable medium. Computer-readable media includes both non-transitory computer storage media and communication media including any medium that facilitates transfer of a computer program from one place to another. A non-transitory storage medium may be any available non-transitory medium that can be accessed by a general purpose or special purpose computer. By way of example, and not limitation, non-transitory computer-readable media can comprise RAM, ROM, electrically erasable programmable read only memory (EEPROM), or optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor.

From the foregoing it will be appreciated that, although specific embodiments have been described herein for purposes of illustration, various modifications may be made while remaining with the scope of the claimed technology. Thus, the disclosure is not limited to the examples and designs described herein except as by the appended claims, and is to be accorded the broadest scope consistent with the principles and novel features disclosed herein.

Examples described herein may refer to various components as "coupled" or signals as being "provided to" or "received from" certain components. It is to be understood that in some examples the components are directly coupled one to another, while in other examples the components are coupled with intervening components disposed between them. Similarly, signal may be provided directly to and/or received directly from the recited components without intervening components, but also may be provided to and/or received from the certain components through intervening components.

What is claimed is:

1. At least one non-transitory computer readable medium encoded with executable instructions which, when executed, cause a system to perform operations comprising:
receive a replication snapshot of a share of a file system at a disaster recovery location, wherein the replication snapshot is configured for recovery of the share at the disaster recovery location, and wherein the replication snapshot includes an additional snapshot taken since a time of a previous replication snapshot;
identify the additional snapshot as a self-service recovery (SSR) snapshot based on a tag associated with a process used to create the additional snapshot; and
extract the additional snapshot for use by another instance of the process at the disaster recovery location.

2. The non-transitory computer readable medium of claim 1, wherein the replication snapshot and the additional snapshot are generated at a primary location.

3. The non-transitory computer readable medium of claim 2, wherein the process used to create the additional snapshot is a self-service restore process.

4. The non-transitory computer readable medium of claim 1, wherein the another instance of the process at the disaster recovery location used to identify the additional snapshot is another self-service restore processes.

5. The non-transitory computer readable medium of claim 1, wherein the replication snapshot received at the disaster recovery location comprises a primary retention policy.

6. The non-transitory computer readable medium of claim 5, wherein the additional snapshot identified at the disaster recovery location comprises a secondary retention policy, different from the primary retention policy, wherein the primary and secondary retention policies are manually configurable, automatically configurable, or combinations thereof, and wherein the primary and secondary retention policies are SSR retention policies.

7. The non-transitory computer readable medium of claim 1, wherein the tag associated with the identified additional snapshot corresponds to retention information, identification information, timestamp information, or combinations thereof.

8. The non-transitory computer readable medium of claim 1, wherein the replication snapshot includes the additional snapshot included in one or more additional snapshots, each of the one or more additional snapshots taken since the time of the previous replication snapshot.

9. The non-transitory computer readable medium of claim 1, wherein a file server comprises a plurality of virtualized computing instances, each of the plurality of virtualized computing instances configured to present a namespace of storage items of the file system.

10. The non-transitory computer readable medium of claim 9, wherein the file server comprises a plurality of host machines, each host machine configured to host at least one of a plurality of virtualized computing instances.

11. The non-transitory computer readable medium of claim 9, wherein the replication snapshot of the file server includes snapshots of the plurality of virtualized computing instances.

12. The non-transitory computer readable medium of claim 10, wherein at least one of the plurality of virtualized computing instances is configured to manage access requests for a storage item of the file system.

13. The non-transitory computer readable medium of claim 12, wherein the storage item is stored in a storage pool, the storage pool including local storage devices of at least one of the plurality of host machines.

14. A method comprising:
generating a replication snapshot of a share of a file system at a first location, wherein the replication snapshot comprises one or more additional snapshots, each taken since a time of a previous replication snapshot;
transmitting the replication snapshots, including the one or more additional snapshots, to a second location; and
extracting a first additional snapshot, from the replication snapshot, at the second location, for use by an instance of a process at the second location, wherein the extracting is based at least on a tag associated with the process used to create the first additional snapshot.

15. The method of claim 14, wherein the first location is a primary location, and wherein the second location is a disaster recovery location.

16. The method of claim 15, wherein the replication snapshot is configured for recovery of the share at the disaster recovery location.

17. The method of claim 14, further comprising identifying the first additional snapshot as a self-service recovery (SSR) snapshot, wherein the identifying is based on the tag, and wherein the identified first additional snapshot is extracted for use by the instance of the process at the second location.

18. The method of claim 14, wherein the process used to create the first additional snapshot is a self-service restore process.

19. The method of claim 14, wherein the replication snapshot received at the second location comprises a primary retention policy.

20. The method of claim 19, wherein each of the one or more additional snapshots, including the first additional snapshot, comprises a secondary retention policy, different from the primary retention policy, wherein the primary and secondary retention policies are manually configurable, automatically configurable, or combinations thereof, and wherein the primary retention policy is a primary SSR retention policy, and wherein the secondary retention policy is a secondary SSR retention policy.

21. The method of claim 14, wherein a file server includes a plurality of host machines, and wherein each of the host machines is configured to host at least one of a plurality of virtualized computing instances.

22. The method of claim 21, wherein the file server includes a storage pool, and wherein the storage pool includes a local storage device of at least one of the host machines.

23. The method of claim 22, wherein the plurality of virtualized computing instances are configured to manage access requests for a storage item of the file system.

24. A system comprising:
a primary file server, the primary file server including:
a virtualized computing instance configured to form a cluster with other virtualized computing instances, the virtualized computing instance further configured to present a namespace of storage items;
a storage pool, the storage pool accessible to the virtualized computing instance and configured to store the namespace of storage items, wherein the virtualized computing instance is configured to manage access requests for a particular storage item in the namespace of storage items; and
a secondary file server, the secondary file server configured to host a replication snapshot of a share of a file system of the primary file server, and at least one additional snapshot identifiable as a self-service recovery (SSR) snapshot based on a tag and taken since a time of a previous replication snapshot, wherein the replication snapshot is configured for recovery of the share at the secondary file server.

25. The system of claim 24, wherein the replication snapshot comprises the at least one additional snapshot, and wherein the secondary file server is further configured to identify the at least one additional snapshot as the self-service recovery (SSR) snapshot based on the tag associated with a process used to create the at least one additional snapshot.

26. The system of claim 24, wherein the secondary file server is further configured to extract the at least one additional snapshot for use by another instance of the process at the secondary file server.

27. The system of claim 24, wherein the primary file server includes a primary location and herein the secondary file server comprises a disaster recovery location, wherein the primary file server is different from the secondary file server.

28. The system of claim 24, wherein the replication snapshot and the at least one additional snapshot are generated at the primary file server.

29. The system of claim 28, wherein the process used to create the at least one additional snapshot is a self-service restore process.

30. The system of claim 24, wherein a replication snapshot comprises a primary retention policy and the additional snapshot comprises a secondary retention policy different from the primary retention policy, wherein the primary and secondary policies are SSR retention policies.

31. The system of claim 25, wherein the tag associated with the at least one additional snapshot corresponds to retention information, identification information, timestamp information, or combinations thereof.

32. The system of claim 24, wherein the primary file server comprises a plurality of host machines, and wherein each of the plurality of host machines is configured to host at least one of the virtualized computing instances.

33. The system of claim 32, wherein the storage pool includes at least one local storage device of the plurality of host machines.

* * * * *